United States Patent
Tuba et al.

(10) Patent No.: US 10,619,003 B2
(45) Date of Patent: Apr. 14, 2020

(54) FUNCTIONALIZED LINEAR AND CYCLIC POLYOLEFINS

(71) Applicant: CALIFORNIA INSTITUTE OF TECHNOLOGY, Pasadena, CA (US)

(72) Inventors: Robert Tuba, Veresegyhaz (HU); Robert H. Grubbs, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/860,906

(22) Filed: Jan. 3, 2018

(65) Prior Publication Data

US 2018/0127539 A1 May 10, 2018

Related U.S. Application Data

(62) Division of application No. 14/915,822, filed as application No. PCT/US2014/054158 on Sep. 4, 2014, now Pat. No. 9,890,239.

(60) Provisional application No. 62/035,962, filed on Aug. 11, 2014, provisional application No. 62/035,955, filed on Aug. 11, 2014, provisional application No.
(Continued)

(51) Int. Cl.
 C08G 61/08 (2006.01)
 C08G 61/12 (2006.01)
 C08L 65/00 (2006.01)

(52) U.S. Cl.
 CPC ............. *C08G 61/08* (2013.01); *C08G 61/12* (2013.01); *C08L 65/00* (2013.01); C08G 2261/142 (2013.01); C08G 2261/1422 (2013.01); *C08G 2261/3321* (2013.01); C08G 2261/3342 (2013.01); *C08G 2261/418* (2013.01);
(Continued)

(58) Field of Classification Search
 CPC ............ C08G 61/06; C08G 2261/3321; C08G 2261/418; C08F 10/14; C08F 4/42
 See application file for complete search history.

(56) References Cited

U.S. PATENT DOCUMENTS 3,816,382 A * 6/1974 Streck .................... C08G 61/08
526/90
3,952,070 A 4/1976 Nowak et al.
(Continued)

FOREIGN PATENT DOCUMENTS

CA 2292584 A1 1/1999
CN 102020739 * 4/2011
(Continued)

OTHER PUBLICATIONS

Translation of Zhengyun, CN 102020739 (2011) (Year: 2011).*
(Continued)

*Primary Examiner* — Robert C Boyle
(74) *Attorney, Agent, or Firm* — J.A. Lindeman & Co. PLLC

(57) ABSTRACT

This invention relates to methods and compositions for preparing linear and cyclic polyolefins. More particularly, the invention relates to methods and compositions for preparing functionalized linear and cyclic polyolefins via olefin metathesis reactions. Polymer products produced via the olefin metathesis reactions of the invention may be utilized for a wide range of materials applications. The invention has utility in the fields of polymer and materials chemistry and manufacture.

3 Claims, 15 Drawing Sheets

Related U.S. Application Data

62/035,307, filed on Aug. 8, 2014, provisional application No. 61/873,701, filed on Sep. 4, 2013.

(52) U.S. Cl.
CPC . *C08G 2261/419* (2013.01); *C08G 2261/724* (2013.01); *C08G 2261/80* (2013.01)

(56) References Cited

U.S. PATENT DOCUMENTS

| | | | |
|---|---|---|---|
| 3,963,792 | A | 6/1976 | Takeshita |
| 5,312,940 | A | 5/1994 | Grubbs et al. |
| 5,342,909 | A | 8/1994 | Grubbs et al. |
| 5,977,393 | A | 11/1999 | Grubbs et al. |
| 6,284,852 | B1 | 9/2001 | Lynn et al. |
| 6,410,666 | B1 | 6/2002 | Grubbs et al. |
| 6,486,279 | B2 | 11/2002 | Lynn et al. |
| 6,552,139 | B1 | 4/2003 | Herrmann et al. |
| 6,613,910 | B2 | 9/2003 | Grubbs et al. |
| 6,635,768 | B1 | 10/2003 | Herrmann et al. |
| 6,787,620 | B2 | 9/2004 | Herrmann et al. |
| 7,294,717 | B2 | 11/2007 | Herrmann et al. |
| 7,378,528 | B2 | 5/2008 | Herrmann et al. |
| 7,652,145 | B2 | 1/2010 | Herrmann et al. |
| 7,671,224 | B2 | 3/2010 | Winde et al. |
| 7,687,635 | B2 | 3/2010 | Verpoort et al. |
| 2003/0055262 | A1 | 3/2003 | Grubbs et al. |
| 2005/0014916 | A1* | 1/2005 | Sakamoto ............ C07D 233/02 526/172 |
| 2005/0043541 | A1* | 2/2005 | Walter ................. C07F 15/0046 548/101 |
| 2005/0113540 | A1 | 5/2005 | Weaver et al. |
| 2006/0293526 | A1 | 12/2006 | Koehler et al. |
| 2007/0043188 | A1 | 2/2007 | Schaubroeck et al. |
| 2008/0293905 | A9 | 11/2008 | Schaubroeck et al. |
| 2009/0170692 | A1 | 7/2009 | Ying et al. |
| 2009/0264672 | A1 | 10/2009 | Abraham et al. |
| 2010/0210515 | A1 | 8/2010 | Nash et al. |
| 2012/0296035 | A1* | 11/2012 | Tsunogae ................. B60C 1/00 524/576 |
| 2014/0370318 | A1 | 12/2014 | Stephen et al. |

FOREIGN PATENT DOCUMENTS

| | | |
|---|---|---|
| EP | 1598384 A1 | 11/2005 |
| EP | 1757613 B1 | 1/2011 |
| EP | 1577282 B1 | 6/2011 |
| JP | H03200806 A | 9/1991 |
| WO | 02/079208 A2 | 10/2002 |
| WO | 03/011455 A1 | 2/2003 |
| WO | 2004/013198 A2 | 2/2004 |
| WO | 2008/066306 A1 | 6/2008 |
| WO | 2010/037550 A1 | 4/2010 |
| WO | 2011/069134 A2 | 6/2011 |

OTHER PUBLICATIONS

International Search Report and Written Opinion of International Application No. PCT/US2014/054158, dated Nov. 25, 2014.
International Preliminary Report on Patentability of International Application No. PCT/US2014/054158, dated Mar. 17, 2016.
Pubchem CID 548949, Mar. 27, 2005, pp. 1-3 (online), retrieved on Oct. 15, 2014 from the internet <URL:https://pubchem.ncbi.nlm.nih.gov/summary/summary.cgi?cid=548949>; p. 1, formula.
Allen et al., "Well-Defined Silica-Supported Olefin Metathesis Catalysts," Org. Let. 2009, vol. 11, No. 6, pp. 1261-1264.
Bielawski et al., "An "Endless" Route to Cyclic Polymers," Science, 2002, vol. 297, pp. 2041-2044.
Bielawski et al., "Synthesis of Cyclic Polybutadiene via Ring-Opening Metathesis Polymerization: The Importance of Removing Trace Linear Contaminants," J. Am. Chem. Soc., 2003, 125, pp. 8424-8425.
A. Blencowe and G. Qiao "Ring-Opening Metathesis Polymerization with the Second Generation Hoveyda-Grubbs Catalyst: An Efficient Approach toward High-Purity Functionalized Macrocyclic Oligo(cyclooctene)s," J. Am. Chem. Soc., 2013, 135, pp. 5717-5725.
Boydston et al., "Cyclic Ruthenium-Alkylidene Catalysts for Ring-Expansion Metathesis Polymerization," J. Am. Chem. Soc., 2008, 130, pp. 12775-12782.
Hillmyer et al., "Ring-Opening Metathesis Polymerization of Functionalized Cyclooctenes by a Ruthenium-Based Metathesis Catalyst," Macromolecules 1995, 28, pp. 6311-6316.
Marinescu et al., "Ethenolysis Reactions Catalyzed by Imido Alkylidene Monoaryloxide Monopyrrolide (MAP) Complexes of Molybdenum," J. Am. Chem. Soc., 2009, 131, pp. 10840-10841 and supporting information S1-S41.
S. Monfette and D. Fogg "Equilibrium Ring-Closing Metathesis," Chem. Rev. 2009, 109, pp. 3783-3816.
S. Ramakrishnan and T.C. Chung "Poly(5-hydroxyoctenylene) and Its Derivatives: Synthesis via Metathesis Polymerization of an Organoborane Monomer," Macromolecules 1990, 23, pp. 4519-4524.
Roe et al., "Two-directional ring-opening cross-metathesis," Chem. Commun., 2009, pp. 4399-4401.
Scherman et a., "Synthesis of Well-Defined Poly((vinyl alcohol)2-alt-methylene) via Ring-Opening Metathesis Polymerization," Macromolecules 2002, 35, pp. 5366-5371.
Scholl et al., "Synthesis and Activity of a New Generation of Ruthenium-Based Olefin Metathesis Catalysts Coordinated with 1,3-Dimesityl-4,5-dihydroimidazol-2-ylidene Ligands," Org. Let. 1999, vol. 1, No. 6, pp. 953-956.
Schwab et al., "Synthesis and Applications of RuC12(=CHR')PR3)2: The Influence of the Alkylidene Moiety on Metathesis Activity," J. Am. Chem. Soc., 1996, 118, pp. 100-110.
R. Tuba and R. Grubbs "Ruthenium catalyzed equilibrium ring-opening metathesis polymerization of cyclopentene," Polym. Chem., 2013, 4, pp. 3959-3962.
D. Valenti and K. Wagener "Direct Synthesis of Well-Defined Alcohol-Functionalized Polymers via Acyclic Diene Metathesis (ADMET) Polymerization," Macromolecules 1998, 31, pp. 2764-2773.
Xia et al., "Ring-Expansion Metathesis Polymerization: Catalyst-Dependent Polymerization Profiles," J. Am. Chem. Soc., 2009, 131, pp. 2670-2677.
Xia et al., "Synthesis and Direct Imaging of Ultrahigh Molecular Weight Cyclic Brush Polymers," Angew. Chem. Int. Ed. 2011, 50, pp. 5882-5885.
Zhang et al., "Gels Based on Cyclic Polymers," J. Am. Chem. Soc., 2011, 133, pp. 4140-4148.
Partial Supplementary European Search Report in EP Application No. 14842763.6, dated Mar. 28, 2017.
Buschhaus et al., "Transformations of Cyclic Olefins Mediated by Tungsten Nitrosyl Complexes," Organometallics, 2008, 27, pp. 4724-4738.
Alois Fuerstner and Klaus Langemann, "Macrocycles by Ring-Closing Metathesis," Synthesis, Jul. 1997, vol. 7, pp. 792-803.
K.J. Ivin and J.C. Mol, "Ring-Opening Metathesis Polymerization: General Aspects," in "Olefin Metathesis and Metathesis Polymerization," 1997, Academic Press, pp. 224-231.
Arnon Shani "Studies of the CIS, CIS-Cyclodeca-1,6-Diene System," Israel Journal of Chemistry, vol. 13, No. 1., 1975, pp. 35-52.

* cited by examiner

1 : $R^{A1*}$ = H

2 : $R^{A1*}$ = OH

3 : $R^{A1*}$ = H: polypentenamer

4 : $R^{A1*}$ = OH: poly(vinylalcohol-*alt*-propenylene)

5

6

7

X: H, Br
8

12: n = 3; m = 11
13: n = 11; m = 3
14: n = 11; m = 6

MALDI-TOF spectra peak table for linear hydroxyl functionalized polypentenamer (4).

| n | z | M/Z $_{Measured}$ | M/Z $_{Calculated}$ |
|---|---|---|---|
| 12 | 1 | 1042.4 | 1042.7 |
| 14 | 1 | 1210.0 | 1210.8 |
| 16 | 1 | 1377.7 | 1378.9 |
| 18 | 1 | 1545.4 | 1547.0 |
| 20 | 1 | 1714.1 | 1715.2 |
| 25 | 1 | 2133.5 | 2135.5 |
| 30 | 1 | 2552.5 | 2555.8 |

MALDI-TOF spectra peak table for cyclic hydroxyl functionalized polypentenamer (15).

| n | z | M/Z Measured | M/Z Calculated |
|---|---|---|---|
| 12 | 1 | 1014.3 | 1014.7 |
| 14 | 1 | 1182.7 | 1182.8 |
| 16 | 1 | 1350.6 | 1350.9 |
| 18 | 1 | 1518.2 | 1519.0 |
| 20 | 1 | 1686.3 | 1687.1 |
| 25 | 2 | 1062.2 | 1056.7 |
| 31 | 2 | 1314.6 | 1308.9 |
| 49 | 2 | 2070.1 | 2065.4 |

FUNCTIONALIZED LINEAR AND CYCLIC POLYOLEFINS

RELATED APPLICATIONS

This application is a Divisional of U.S. application Ser. No. 14/915,822, filed Mar. 1, 2016; which is a National Phase application of PCT/US2014/054158, filed Sep. 4, 2014; which claims priority to U.S. Provisional Application No. 61/873,701, filed Sep. 4, 2013, U.S. Provisional Application No. 62/035,307, filed Aug. 8, 2014, U.S. Provisional Application No. 62/035,955, filed Aug. 11, 2014, and U.S. Provisional Application No. 62/035,962, filed Aug. 11, 2014, the contents of each are incorporated herein by reference.

STATEMENT REGARDING FEDERALLY SPONSORED RESEARCH AND DEVELOPMENT

This invention was made with government support under Grant No. DE-FG02-08ER15933 awarded by the Department of Energy. The U.S. Government has certain rights in this invention.

TECHNICAL FIELD

The present invention relates to methods and compositions for preparing linear and cyclic polyolefins. More particularly, the invention relates to methods and compositions for preparing functionalized linear and cyclic polyolefins via olefin metathesis reactions. Polymer products produced via the olefin metathesis reactions of the invention may be utilized for a wide range of materials applications. The invention has utility in the fields of polymer and materials chemistry and manufacture.

BACKGROUND

The trans-polypentenamer has unique relevance among the synthetic rubbers since it has similar physical properties to natural rubber. Polypentenamer additives have a propitious effect on the tire properties and have been studied extensively for this application. They can be synthesized by equilibrium ring-opening metathesis polymerization (ROMP) using well-defined ruthenium catalyst systems. This unique feature of the equilibrium polymerization opens a way for the synthesis of durable, environmentally friendly elastomers where tires can not only be synthesized but also readily recycled by the same transition metal catalyst system.

Linear polyhydroxy polymers have found use in the food packaging and in biomedical and pharmaceutical industries. Here we are also reporting a synthetic methodology where polyhydroxy polypentenamers can be synthesized with acyclic diene metathesis polymerization (ADMET) or ROMP reactions. The polarity of the polymer can be easily fine tuned with the co-polymerization with cyclopentenes.

Copolymers of polyvinyl alcohol (PVA) are widely used as adhesives in coatings and packaging materials because of their excellent barrier properties towards hydrocarbons and gases. Moreover, these hydrophilic synthetic resins have many biomedical applications. The concentration of hydroxyl groups along the polymer chain determines its polarity, and thus the barrier properties of the polymer. Ethylene-(vinyl alcohol) (EVOH) copolymers with higher vinyl alcohol content have better barrier properties. Additionally, tuning of the polarity of PVA copolymers used in drug delivery applications can control targeted drug release. For example, the 5-fluorouracil (5-FU) anticancer agent release can be easily controlled by modifying the vinyl alcohol and ethylene proportions in the copolymer. These polymer matrices can be used as tunable implanted delivery systems in cancer chemotherapy.

There are a number of reported synthetic procedures for such polymers; however, syntheses of highly controlled and well-defined alternating polymers are rare (see Li, Z.; Lv, A.; Li, L.; Deng, X.; Zhang, L.; Du, F.; Li, Z. *Polymer* 2013, 54, 3841; Valenti, D.; Wagener, K. *Macromolecules* 1998, 31, 2764). A variety of polymerization techniques for the synthesis of PVA copolymers have been reported previously: ruthenium-catalyzed ROMP (see Scherman, O.; Kim, H.; Grubbs, R. *Macromolecules* 2002, 35, 5366), cationic group-transfer polymerization (see Mori, Y.; Sumi, H.; Hirabayashi, T.; Inai, Y.; Yokota, K. *Macromolecules* 1994, 27, 1051), palladium-catalyzed ethylene-vinyl acetate copolymerization (Ito, S.; Munakata, K.; Nakamura, A.; Nozaki, K. *Journal of the American Chemical Society* 2009, 131, 14606), and free radical polymerization (see Sato, T.; Okaya, T. *Makromolekulare Chemie-Macromolecular Chemistry and Physics* 1993, 194, 163).

Synthesis of PVA copolymers via ruthenium-catalyzed ring-opening metathesis polymerization (ROMP) or acyclic diene metathesis polymerization (ADMET) reactions have been reported. Hillmyer reported the synthesis of linear hydroxyl-functionalized polyoctenamers via ruthenium metathesis catalyst initiated ROMP of hydroxy functionalized cyclooctene (COE) (see Hillmyer, M.; Laredo, W.; Grubbs, R. *Macromolecules* 1995, 28, 6311). An alternative way to linear hydroxyl functionalized polyoctenamers is the ROMP of borane substituted COE with early transition metals followed by oxidation (see Ramakrishnan, S.; Chung, T. *Macromolecules* 1990, 23, 4519). Recently Li et al. reported the ADMET of two vinyl acetate-containing symmetrical □□ω-diene monomers (see Li, Z.; Lv, A.; Li, L.; Deng, X.; Zhang, L.; Du, F.; Li, Z. *Polymer* 2013, 54, 3841). Wagener et al. synthesized well-defined ethylene-vinyl alcohol copolymers via ADMET of the corresponding symmetrical □□ω-diene monomers and also introduced primary, secondary and tertiary hydroxyl groups in precise intervals into the polyolefin chain. Well-defined ethylene-vinyl alcohol copolymers were obtained following hydrogenation using this method (see Valenti, D.; Wagener, K. *Macromolecules* 1998, 31, 2764). Scherman et al. reported the synthesis of poly(vinylalcohol$_2$-alt-methylene) via the ROMP of a "temporary" strained cis-4-cyclopentene-1,3-diol and two post-polymerization modifications, both under forcing conditions (FIG. 1) (see Scherman, O.; Kim, H.; Grubbs, R. *Macromolecules* 2002, 35, 5366).

The ADMET of acetyl group protected 1,6-heptadiene-4-ol has been investigated at relatively high temperature (60° C.); it was found that the reaction stops at the ring-closed intermediate and the subsequent ROMP step did not occur (see Li, Z.; Lv, A.; Li, L.; Deng, X.; Zhang, L.; Du, F.; Li, Z. *Polymer* 2013, 54, 3841. The ROMP of cis-4-cyclopentene-1,3-diol is not feasible due to the low ring strain energy of the cyclopentene ring (2.29 kcal/mol) (see Scherman, O.; Kim, H.; Grubbs, R. *Macromolecules* 2002, 35, 5366). Preliminary thermodynamic investigations and theoretical ring strain energy calculations revealed, however, that the non-protected 3-cyclopentene-1-ol (2) has moderate strain energy that is slightly higher than that of cyclopentene (1), which is known to polymerize in equilibrium ROMP.

Strategies which would produce highly-polar, well-defined PVA alternating copolymers via one-pot equilibrium olefin metathesis reactions such as the ROMP of 3-cyclopenten-1-ol (2) and the ADMET of 1,6-heptadiene-4-ol (10), have not yet been investigated.

Cyclic polymers exhibit a number of unique properties in comparison to their linear analogues such as increased hydrodynamic radii, functional group density, lower viscosity, and higher thermal stability, resulting in better performance in their applications. Moreover, the lack of chain ends characteristic of cyclic topologies could have significant ramifications for material applications. For example, linear polymer end groups are thought to contribute to the overheating of tires, significantly reducing tire adhesion and carcass durability. Cyclic polymers are thus expected to at least partially mitigate these issues and improve tire performance. Polypentenamers are a particularly attractive system to compare linear and cyclic topologies due to both similarities with natural rubber (see G. Natta, I. Bassi, *Journal of Polymer Science Part C-Polymer Symposium* 1967, 2551) and synthetic accessibility. Although in the past couple of decades a number of new cyclopolymer synthetic techniques have been developed, cyclopolypentenamer synthetic rubbers have not yet been synthesized.

Therefore, despite the advances achieved in the art, a continuing need exists for further improvements and for new polymer materials.

SUMMARY

The present invention is directed to addressing one or more of the aforementioned concerns. Herein, we report compositions and methods for preparation of linear and cyclic polyolefins. The ring opening metathesis polymerization (ROMP) of 3-cyclopenten-1-ol (2) in the presence of a metathesis catalyst provided poly(vinylalcohol-alt-propenylene) (4). The acyclic diene metathesis (ADMET) polymerization of 1,6-heptadien-4-ol (10) in the presence of a metathesis catalyst also provided poly(vinylalcohol-alt-propenylene) (4). Poly(vinylalcohol-alt-propenylene) (4) was hydrogenated to provide poly(vinylalcohol-alt-propylene) (11). The ROMP of 3-cyclopenten-1-ol (2) and cyclopentene (1) in the presence of a metathesis catalyst provided a polymer (16). The simultaneous ADMET of 1,6-heptadien-4-ol (10) and ROMP of cyclopentene (1) in the presence of a metathesis catalyst also provided a polymer (16). Cyclopolypentenamers were prepared by polymerization of cyclopentene (1) in the presence of a silica supported metathesis catalyst. A hydroxyl-functionalized cyclopolypentenamer was prepared by polymerization of 3-cyclopenten-1-ol (2) in the presence of a silica supported metathesis catalyst. The ring strain energy of cyclopentene and a series of substituted cyclopentenes were calculated using computational methods. The activation energy and entropy of ROMP were experimentally measured and calculated by computational methods.

DETAILED DESCRIPTION

Terminology and Definitions

Figure 1:
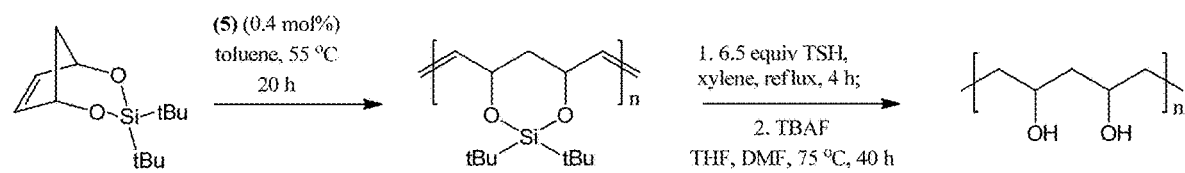
FIG. 1 depicts the synthesis of poly(vinylalcohol$_2$-alt-methylene) (see Scherman, O.; Kim, H.; Grubbs, R. *Macromolecules* 2002, 35, 5366).

Unless otherwise indicated, the invention is not limited to specific reactants, substituents, catalysts, reaction conditions, or the like, as such may vary. It is also to be understood that the terminology used herein is for the purpose of describing particular embodiments only and is not to be interpreted as being limited.

As used in the specification and the appended claims, the singular forms "a," "an," and "the" include plural referents unless the context clearly dictates otherwise. Thus, for example, reference to "an α-olefin" includes a single α-olefin as well as a combination or mixture of two or more α-olefins, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl, and the like. Generally, although again not necessarily, alkyl groups herein contain 1 to about 12 carbon atoms. The term "lower alkyl" refers to an alkyl group of 1 to 6 carbon atoms, and the specific term "cycloalkyl" refers to a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" refers to an alkenyl group of 2 to 6 carbon atoms, and the specific term "cycloalkenyl" refers to a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" refers to an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein refers to an alkyl group bound through a single, terminal ether linkage; that is, an "alkoxy" group may be represented as —O-alkyl where alkyl is as defined above. A "lower alkoxy" group refers to an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, without limitation, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, —(CO)-aralkyl, —(CO)-alkaryl, —(CO)-alkenyl, or —(CO)-alkynyl, and the term "acyloxy" refers to substituents having the formula —O(CO)-alkyl, —O(CO)-aryl, —O(CO)-aralkyl, —O(CO)-alkaryl, —O(CO)-alkenyl, —O(CO)-alkynyl wherein "alkyl," "aryl," "aralkyl," "alkaryl," "alkenyl," and "alkynyl" are as defined above.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic.

The terms "halo" and "halogen" are used in the conventional sense to refer to a chloro, bromo, fluoro, or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated, and unsaturated species, such as alkyl groups, alkenyl groups, alkynyl groups, aryl groups, and the like. The term "lower hydrocarbyl" intends a hydrocarbyl group of 1 to 6 carbon atoms, preferably 1 to 4 carbon atoms, and the term "hydrocarbylene" refers to a divalent hydrocarbyl moiety containing 1 to about 30 carbon atoms, preferably 1 to about 24 carbon atoms, most preferably 1 to about 12 carbon atoms, including linear, branched, cyclic, saturated, and unsaturated species. The term "lower hydrocarbylene" refers to a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and heteroatom-containing hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus, or silicon, typically nitrogen, oxygen, or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include without limitation alkoxyaryl, alkylsulfanyl-substituted alkyl, N-alkylated amino alkyl, and the like. Examples of heteroaryl substituents include without limitation pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups include without limitation pyrrolidino, morpholino, piperazino, piperidino, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO—), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl (—(CO)—N($C_1$-$C_{24}$ alkyl)($C_5$-$C_{24}$ aryl), thiocarbamoyl (—(CS)—NH$_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), di-N—($C_1$-$C_{24}$ alkyl), N—($C_5$-$C_{24}$ aryl)-substituted thiocarbamoyl (—(CS)—N($C_1$-$C_{24}$ alkyl)($C_5$-$C_{24}$ aryl), carbamido (—NH—(CO)—NH$_2$), cyano (—C≡N), cyanato (—O—C≡N), thiocyanato (—S—C≡N), isocyanate (—N=C=O), thioisocyanate (—N=C=S), formyl (—(CO)—H), thioformyl (—(CS)—H), amino (—NH$_2$), mono-($C_1$-$C_{24}$ alkyl)-substituted amino (—NH($C_1$-$C_{24}$ alkyl), di-($C_1$-$C_{24}$ alkyl)-substituted amino (—N($C_1$-$C_{24}$ alkyl)$_2$), mono-($C_5$-$C_{24}$ aryl)-substituted amino (—NH($C_5$-$C_{24}$ aryl), di-($C_5$-$C_{24}$ aryl)-substituted amino (—N($C_5$-$C_{24}$ aryl)$_2$), $C_2$-$C_{24}$ alkylamido (—NH—(CO)-alkyl), $C_6$-$C_{24}$ arylamido (—NH—(CO)-aryl), imino (—CR=NH where R includes without limitation hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR=N(alkyl), where R includes without limitation hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR=N(aryl), where R includes without limitation hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$—OH), sulfonato (—SO$_2$—O—), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_1$-$C_{24}$ monoalkylaminosulfonyl (—SO$_2$—N(H) alkyl), $C_1$-$C_{24}$ dialkylaminosulfonyl (—SO$_2$—N(alkyl)$_2$), $C_5$-$C_{24}$ arylsulfonyl (—SO$_2$-aryl), boryl (—BH$_2$), borono (—B(OH)$_2$), boronato (—B(OR)$_2$ where R includes without limitation alkyl or other hydrocarbyl), phosphono (—P(O)(OH)$_2$), phosphonato (—P(O)(O$^-$)$_2$), phosphinato (—P(O)(O—)), phospho (—PO$_2$), and phosphino (—PH$_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl).

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one hydrogen atom bound to a carbon (or other) atom is replaced with one or more functional groups such as those described hereinabove. The term "functional group" is meant to include any functional species that is suitable for the uses described herein.

In addition, the aforementioned functional groups may, if a particular group permits, be further substituted with one or more additional functional groups or with one or more hydrocarbyl moieties such as those specifically mentioned above. Analogously, the above-mentioned hydrocarbyl moieties may be further substituted with one or more functional groups or additional hydrocarbyl moieties as noted above.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The terms polydispersity index (abbreviated PDI) and molecular mass dispersity (abbreviated D) are used interchangeably herein and refer to the ratio $M_w/M_n$ where $M_w$ is the weight-average molar mass and $M_n$ is the number-average molar mass.

Functionalized Linear Polyolefins

Herein, we report a simple and efficient procedure for the ruthenium-catalyzed ROMP and ADMET polymerization of a new vinyl alcohol copolymer, poly(vinylalcohol-alt-propenylene) (4), (i.e., a polyhydroxy polypentenamer), having a high content of precisely-spaced vinyl alcohol functionalities.

In addition, preliminary tests have been completed for the synthesis of cross-linked polypentenamer. During the course of cyclopentene (1) (2.26 mmol) polymerization in the presence of 2nd generation Grubbs catalyst (0.00518 mmol) at 0° C., a dilute norbornadiene solution (0.0116 mmol) was added drop wise in 0.8 mL toluene under argon atmosphere. The observed gelation time was significantly shorter (85 min) than for the norbornadiene free (110 min) polymerization reaction. The solubility of the cross-linked polypentenamer was significantly lower. The GPC results showed significant molecular weight increase (4940 kDa; 397 kDa for non-cross-linked) with reasonable PDI values (1.47).

ROMP.

Figure 2:
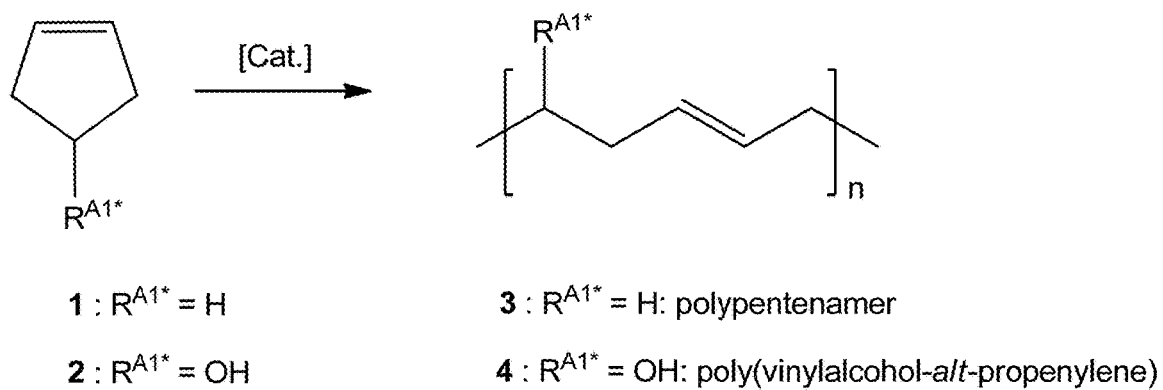
FIG. 2 depicts the ring-opening metathesis polymerization (ROMP) of cyclopentene (1) and 3-cyclopenten-1-ol (2).

In general, ROMP reactions are equilibrium reactions driven by the release of ring strain in the cycloolefin monomer(s). Cyclopentene (1) has been shown to possess sufficient ring strain energy for ROMP giving a highly temperature dependent cyclopentene-polypentenamer equilibrium mixture (FIG. 2). The molybdenum- and tungsten-catalyzed ring opening metathesis polymerization of cyclopentene (1) was first investigated by Natta and Dall'Asta (see Natta, G.; Dallasta, G.; Donegani, G.; Mazzanti, G. *Angewandte Chemie-International Edition* 1964, 3, 723). As expected for an equilibrium polymerization, ROMP of cyclopentene (1) using $WCl_6/Al(C_2H_5)Cl_2$ catalysts revealed that the monomer equilibrium concentration is not affected by the catalyst activity and that a lower reaction temperature gave higher polymer yields (see Ofstead, E.; Calderon, N. *Makromolekulare Chemie* 1972, 154, 21). The thermodynamic data of the equilibrium polymerization have been reported by Calderon as $\Delta H=-4.4$ kcal·mol$^{-1}$; $\Delta S=-14.9$ cal·mol$^{-1}$·K$^{-1}$ (see Calderon, N.; Hinrichs, R. *Chemtech* 1974, 4, 627).

Figure 3:
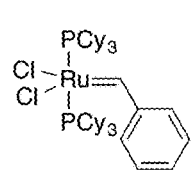
FIG. 3 depicts examples of Ru-based catalysts used for cyclopentene and functionalized cyclopentene ROMP.
Figure 3:
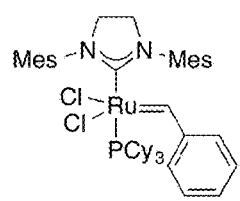
Figure 3:
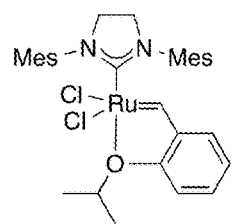
Figure 3:
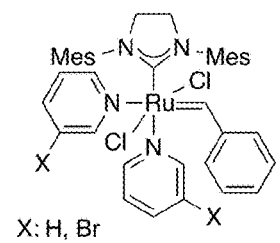

We had recently investigated the equilibrium ROMP of cyclopentene (1) using stable, well-defined ruthenium catalyst systems (5), (6) and (8) (FIG. 3). The thermodynamic parameters were determined: $\Delta H=-5.6$ kcal·mol$^{-1}$; $\Delta S=-18.5$ cal·mol$^{-1}$·K$^{-1}$ (see Tuba, R.; Grubbs, R. *Polymer Chemistry* 2013, 4, 3959). The equilibrium concentration of cyclopentene (1) due to the negative and moderately large $\Delta S$ was shown to be extremely temperature dependent.

Similarly to earlier reported molybdenum and tungsten systems, it was found that catalyst activity influences the equilibration time, but not polymer yield; reaction temperature was the only variable shown to influence the ratio of monomer-polymer equilibrium concentrations.

Figure 4:
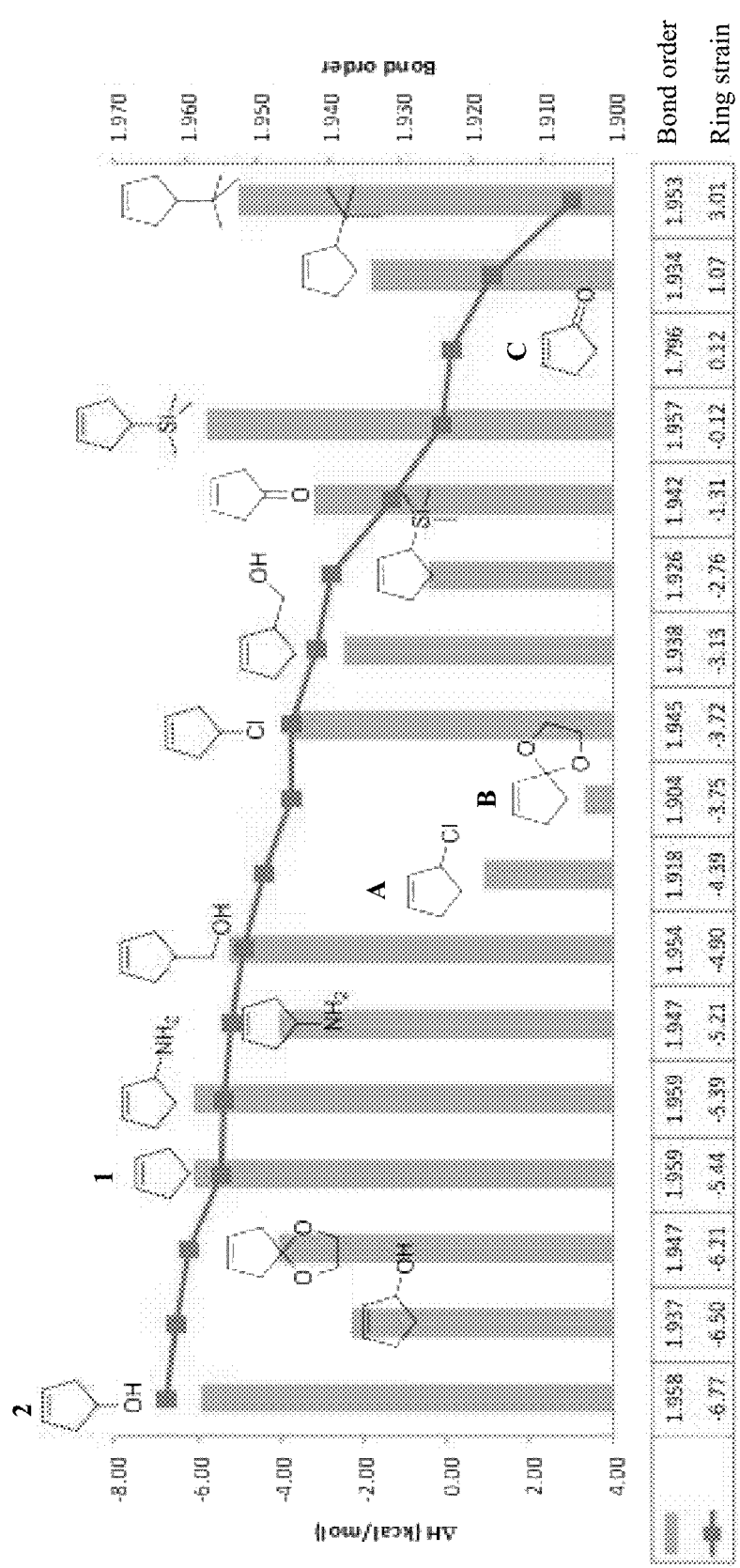
FIG. 4 depicts DFT calculations for functionalized cyclopentene derivatives, ring strain energy in kcal/mol (squares) and bond order (columns).

Following our previous work on the ROMP of cyclopentene (1), our attention turned to functionalized cyclopentene monomers. Preliminary theoretical calculations using density functional theory (DFT) were performed to predict the ring strain energies and bond orders of cyclopentene derivatives with various functionalities. These values were used to predict the tendency of functionalized cyclopentene monomers to participate in Ru-catalyzed equilibrium ROMP reactions. According to the DFT calculations, 3-cyclopentene-1-ol (2) has a slightly higher ring strain energy (−6.77 kcal/mol) than cyclopentene (1) (−5.44 kcal/mol), while the bond order remained the same (1.958 and 1.959) (FIG. 4). Therefore, it was anticipated that the hydroxyl-functionalized cyclopentene (2) would be a suitable monomer for equilibrium ROMP. The suitability of 3-cyclopentene-1-ol (2) in ROMP was supported additionally by the reported ring opening metathesis (ROM) reaction of 3-cyclopentene-1-ol (2) with ethyl acrylate, affording the ROM product in moderate yield (see Roe, S.; Legeay, J.; Robbins, D.; Aggarwal, P.; Stockman, R. *Chemical Communications* 2009, 4399).

Catalyst (7) was used for the preliminary polymerization tests ([1 or 2]=2.2 M, catalyst (7)=0.22 mol %, THF). As predicted by the thermodynamic data, the monomer equilibrium concentration at room temperature was remarkably lower for 3-cyclopentene-1-ol (2) (20%) than for monomer cyclopentene (1) (50%). Other functionalized cycloolefins with lower ring strain, such as 2-cyclopenten-1-one ethylene ketal (B) (−3.75 kcal/mol) and 2-cyclopenten-1-one (C) (0.12 kcal/mol) under similar reaction conditions did not undergo ROMP (FIG. 4). 3-chloro-1-cyclopentene derivative (A), with relatively similar ring strain energy to cyclopentene (1), was expected to undergo ROMP efficiently (FIG. 4). However, monomer 3-chloro-1-cyclopentene (A) rapidly decomposed even at low temperatures (−20° C.) on standing, presumably due to the liberation of hydrochloric acid and the subsequent cationic polymerization of cyclopentadiene.

Thermodynamic Studies for the Equilibrium ROMP of Monomer Cyclopentene (1) and 3-Cyclopentene-1-Ol (2).

In general, the reaction was carried out in an NMR tube in THF-d$_8$ solution using catalyst (6) or (7) at 10 to 40° C. and monitored by $^1$H NMR spectroscopy. The monomer concentration was determined according to the ratio of the olefinic signals, hence the monomer peak at $\delta=5.56$ ppm was replaced by a new signal at $\delta=5.46$ ppm for the polymer. The catalyzed equilibrium ROMP of monomers cyclopentene (1) and 3-cyclopentene-1-ol (2) using ruthenium complex (6) and (7) are summarized in Table 1. When the reaction was carried out at 0° C., precipitation was observed, which solubilized upon increasing the reaction temperature to 10° C. For 3-cyclopentene-1-ol (2), after 60 minutes, a 90% monomer conversion was observed with both catalysts (89.8% for (6) and 90.5% (7)). These values are 15% greater than for the ROMP of cyclopentene (1) carried out under similar conditions (Table 1, entry 1). Even at 30° C. the polymerization of monomer 3-cyclopentene-1-ol (2) resulted in 79.5% (6) and 79.8% (7) conversion (Table 1, entry 8 and 7), while monomer cyclopentene (1) presented a much lower conversion of 50.0% (6) and 57.4% (7) (Table 1, entry 8 and 7) under analogous conditions. Above 30° C., decomposition of catalyst (7) was observed. However, the comparable investigation with catalyst (6) at 40° C. showed a further decrease in monomer conversion to 74.4% from the 79.5% conversion at 30° C. (Table 1, entry 9).

Figure 5:
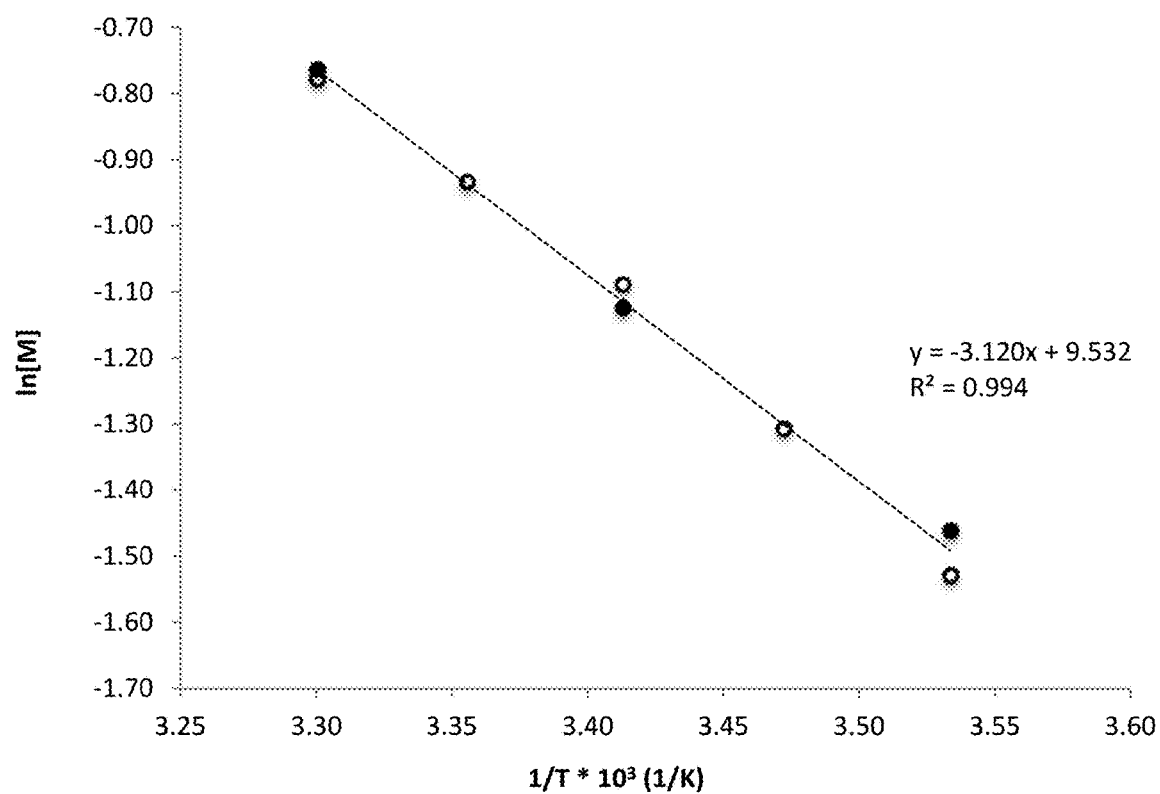
FIG. 5 depicts the thermodynamics of equilibrium ROMP of monomer 3-cyclopentene-1-ol (2). THF-d$_8$; [2]=2.28 M; 0.23 mol % catalyst 6 (•) and 7 (□). t$_r$=1 h (VT-$^1$H NMR; 10, 15, 20, 25, 30° C.).

Catalysts (6) and (7) displayed similar thermodynamic profiles for the ROMP of monomer cyclopentene (1) and 3-cyclopentene-1-ol (2), and catalyst (7) provided a shorter equilibrium time, as expected (FIG. 5). The activation enthalpy (ΔH) measured for monomer 3-cyclopentene-1-ol (2) using complex (7) (ΔH=−6.2 kcal/mol) was lower by 0.8 kcal/mol than previously measured for monomer cyclopentene (1) (ΔH=−5.4 kcal/mol). This result corresponds to 21% lower monomer equilibrium concentration for 3-cyclopentene-1-ol (2) than cyclopentene (1) under analogous reaction conditions at room temperature. A minor difference of 0.2 cal·mol$^{-1}$·K$^{-1}$ between the ring-opening polymerization entropies (ΔS) of the two monomers was discerned (monomer cyclopentene (1) ΔS=−18.5 cal·mol$^{-1}$·K$^{-1}$ and monomer 3-cyclopentene-1-ol (2) ΔS=−18.7 cal·mol$^{-1}$·K$^{-1}$) (see Tuba, R.; Grubbs, R. *Polymer Chemistry* 2013, 4, 3959).

TABLE 1

| Entry | t (° C.) | Catalyst | [1] (M) | Conversion 1 (%) | [2] (M) | Conversion 2 (%) |
|---|---|---|---|---|---|---|
| 1 | 10 | 7 | 0.544 | 74.8 | 0.217 | 90.5 |
| 2 | 10 | 6 | 0.540 | 75.1$^a$ | 0.232 | 89.9 |
| 3 | 15 | 7 | 0.629 | 70.9 | 0.271 | 88.1 |
| 4 | 20 | 7 | 0.711 | 67.1 | 0.337 | 85.2 |
| 5 | 20 | 6 | 0.733 | 66.2$^a$ | 0.325 | 85.7 |
| 6 | 25 | 7 | 0.816 | 62.2 | 0.394 | 82.7 |
| 7 | 30 | 7 | 0.920 | 57.4 | 0.460 | 79.8 |
| 8 | 30 | 6 | 1.085 | 50.0$^a$ | 0.466 | 79.5 |
| 9 | 40 | 6 | — | — | 0.582 | 74.4 |

Conversions and equilibrium concentrations of cyclopentene (1) and 3-cyclopentene-1-ol (2) at different reaction temperatures. Polymerization conditions were THF-d$_8$ solvent (for VT-$^1$H NMR analysis),
[1] = 2.17M,
[2] = 2.28M, and 0.23 mol % catalysts (6) and (7). A reaction time (t$_r$) of 1 hour was sufficient for each entry to reach equilibrium and was kept consistent for all entries. (VT-$^1$H NMR; 5, 10, 15, 20, 25, 30, 40° C.).
$^a$Tuba, R.; Grubbs, R. *Polymer Chemistry* 2013, 4, 3959.

Preparative Synthesis and Characterization of Poly(Vinylalcohol-Alt-Propenylene) (4) Via ROMP and ADMET.

Monomer 3-cyclopentene-1-ol (2) was polymerized using catalyst (7) in THF at room temperature for 60 min. Upon addition of the pale yellow liquid 3-cyclopentene-1-ol (2) to the green catalyst (7) solution, the mixture became orange and viscous. Then ethyl vinyl ether was added and the reaction mixture was poured into n-hexane, which afforded an orange solid precipitate with 76% isolated yield that was practically insoluble in non-polar solvents such as toluene or n-hexane, but completely soluble in methanol and moderately soluble in THF. GPC test showed relatively lower molecular weight (M$_n$=3.8 kDa; PDI: 1.57) compared to the polypentenamer observed at similar condition (M$_n$=15.4 kDa; PDI: 2.07) presumably due to the limited solubility of the OH functionalized polymer in THF.

$^1$H NMR and $^{13}$C NMR spectroscopy were used to confirm the formation of poly(vinylalcohol-alt-propenylene) (4). In the $^1$H NMR spectrum of polymer (4), a slight upfield shift (ΔS=0.10 ppm) in the olefinic protons was observed as compared to its monomer, 3-cyclopentene-1-ol (2). This phenomenon was previously observed for cyclopentene (1) and polypentenamer (3) (ΔS=0.30 ppm). In comparing the chemical shifts of the olefinic protons for monomer cyclopentene (1) (5.65 ppm) and 3-cyclopentene-1-ol (2) (5.56 ppm), a slight upfield shift for the OH-substituted cyclopentene was observed. Interestingly, the chemical shifts for the polymers were reversed. The olefinic protons in poly(vinylalcohol-alt-propenylene) (4) (5.46 ppm) were shifted slightly downfield compared to polypentenamer (3) (5.35 ppm). The cis:trans olefinic bond ratio analysis was performed by quantitative $^{13}$C NMR spectroscopy and indicated a 20:80 cis:trans selectivity, which is similar to the cis:trans ratio reported for polymer (3) (18:82) when polymerized using catalyst (6) (Tuba, R.; Grubbs, R. *Polymer Chemistry* 2013, 4, 3959).

Figure 6:
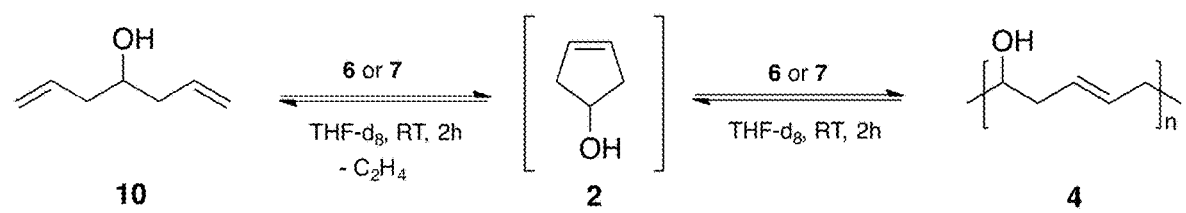
FIG. 6 depicts the synthesis of polymer (4) from 1,6-heptadien-4-ol (10) by ADMET polymerization, [10]=2.30 M, 27° C., catalyst (6)=0.22 mol %, THF-d$_8$, t$_r$=1 h.

To establish an alternative way to prepare polymer (4), we explored the acyclic diene metathesis polymerization (ADMET) (see Wagener, K.; Boncella, J.; Nel, J. *Macromolecules* 1991, 24, 2649) of 1,6-heptadien-4-ol (10). The reaction was performed in an open vial in the glove box at ambient reaction temperature (27° C.). A vial was charged with catalyst (6), THF-d$_8$ and then monomer 1,6-heptadien-4-ol (10), which was added in one portion. Immediate ethylene evolution was observed. In one hour the $^1$H NMR spectroscopic analysis of the reaction mixture showed the presence of starting material 1,6-heptadien-4-ol (10) (10.7%), ring closed product 3-cyclopentene-1-ol (2) (17.9%) and polymer (4) (71.5%) (FIG. 6). The ADMET of 1,6-heptadiene-4-ol (10) results in the formation of polyhydroxy polypentenamers (4) (FIG. 6). Theoretical calculations indicated that the ring strain energy of 3-cyclopentene-1-ol (2) (6.8 kcal/mol) is higher than those for cyclopentene (1) (5.4 kcal/mol; experimentally measured 5.6 kcal/mol) thus the higher monomer conversion observed was expected at room temperature. It has been observed that at room temperature the yield for 1,6-heptadiene-4-ol (10) (and thus for 3-cyclopentene-1-ol (2)) is 78% meanwhile at the same condition for cyclopentene (1) only 55%. The polyhydroxy polypentenemer (4) is highly polar and highly soluble in methanol, THF and sparingly soluble in water as opposed to polypentenamer (3) which is highly apolar and soluble mainly in apolar solvents such as pentene or toluene.

To demonstrate that the methodology can be applied on preparative scale, ADMET of 1,6-heptadien-4-ol (10) was carried out using catalyst (7) on a 1.4 g scale to afford polymer (4) in good yield (85%). Considering the polymer properties the molecular weight observed were as low as M$_n$=2.79 kDa (PDI: 1.38), similarly to those for polymer synthesized by ROMP of 3-cyclopentene-1-ol (2). The matrix assisted laser desorption ionization time-of-flight (MALDI-TOF) mass spectroscopy analysis of well-defined poly(vinylalcohol-alt-propenylene) (4) produced by ADMET has shown a typical step-growth polymer pattern (see Klee, J. *European Journal of Mass Spectrometry* 2005, 11, 591) and the polymer molecular weights agree with the theoretically calculated CH$_2$ end group containing polymers.

Figure 7:
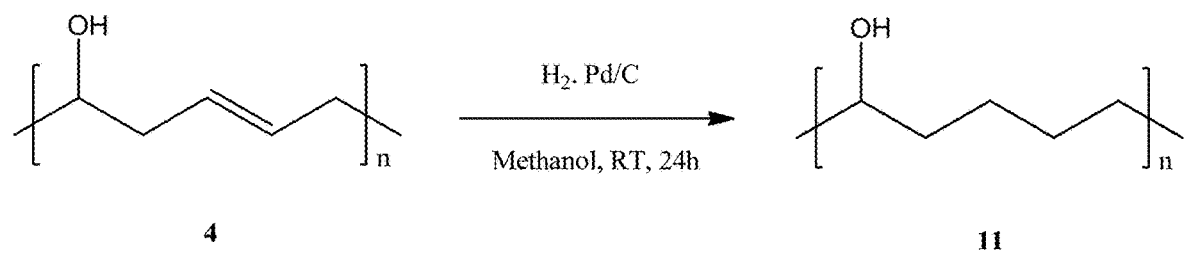
FIG. 7 depicts the synthesis of poly(vinylalcohol-alt-propenylene) (11) by the hydrogenation of polymer (4).

Hydrogenation of the polymer (4) (synthesized by ADMET) backbone was carried out using palladium on carbon followed by atmospheric hydrogen exposure at room temperature (FIG. 7). Upon completion, the reaction mixture was suspended in hot methanol, filtered, and the solvent was removed under reduced pressure to afford poly(vinylalcohol-alt-propylene) (11) (see Li, Z.; Lv, A.; Li, L.; Deng, X.; Zhang, L.; Du, F.; Li, Z. *Polymer* 2013, 54, 3841) as a white powder in 73% yield. $^1$H NMR and $^{13}$C NMR spectroscopy were used to characterize the polymer (11): the olefinic peaks of polymer (4) at δ=5.56 ppm ($^1$H NMR) and δ=130.3 ppm ($^{13}$C NMR) were replaced in the hydrogenated polymer with new signals at δ=1.34 ppm ($^1$H NMR) and δ=30.8 ppm ($^{13}$C NMR).

Three sets of carbon resonances were observed in the $^{13}$C NMR spectra in CD$_3$OD. The signals consist of two peaks for methylene and one broad peak for the methine carbons. The tacticity of PVA homopolymers can be investigated by NMR spectrometry and the assignments of finely resolved $^{13}$C NMR has been reported by several research groups (see Yoshitaka, N.; Nakano, T.; Okamoto, Y.; Gotoh, Y.; Nagura, M. *Polymer* 2001, 42, 9679; Katsuraya, K.; Hatanaka, K.; Matsuzaki, K.; Amiya, S. *Polymer* 2001, 42, 9855). As the peaks are heavily overlapping in the methine carbon region, the polymer tacticity was analyzed based on the adjacent methylene carbon chemical shifts. Amiya reported that the chemical shift data for methylene carbon follows the trend: $\delta_{rr} > \delta_{m} > \delta_{mm}$ (see Katsuraya, K.; Hatanaka, K.; Matsuzaki, K.; Amiya, S. *Polymer* 2001, 42, 9855). By analogy of the methylene region (30.9 and 30.8 ppm) is suggestive higher m dyad tacticity for polymer (4) synthesized by ADMET.

ROMP Copolymerization of 3-Cyclopentene-1-Ol (2) with Cyclopentene (1).

Figure 9:
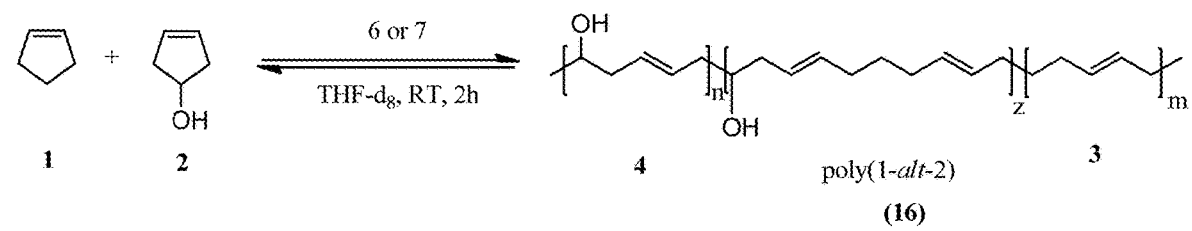
FIG. 9 depicts the equilibrium copolymerization reaction (ROMP) of cyclopentene (1) and 3-cyclopenten-1-ol (2); [1]=1.13 M, [2]=1.14 M, RT, catalyst (6) or (7)=0.22 mol %, THF-d$_8$ to provide copolymer (16).

Monomers cyclopentene (1) and 3-cyclopentene-1-ol (2) were copolymerized using catalyst (7) in THF-d$_8$ and the reaction was monitored by $^1$H NMR spectroscopy (FIG. 9). The overall monomer conversion was 68%, which is close to the average conversions of the monomers (1 and 2) (70%) when they are homopolymerized at 30° C. (Table 1, Entry 7). A new peak was observed at 5.41 ppm in addition to those for (3) (5.35 ppm) and (4) (5.46 ppm) homopolymers. This peak was assigned to an alternating copolymer unit (FIG. 9). As the reaction time was extended there were no changes observed in the monomer equilibrium concentrations or in the ratio of the integrals of the polymer olefinic peaks. This was also observed by $^{13}$C NMR: two new peaks appeared at 128.9 ppm and 133.5 ppm in addition to the homopolymer dyads (3) (131.8 ppm) and (4) (130.8 ppm). Adding the reaction mixture to n-hexane caused the polymer to precipitate. According to the quantitative $^{13}$C NMR investigation, the polymer (16) is composed of approximately 50% alternating dyads, 25% homo-dyads of (3), and 25% homo-dyads of (4) consistent with a random monomer incorporation into the polymer (16).

Simultaneous ADMET and ROMP.

Figure 8:
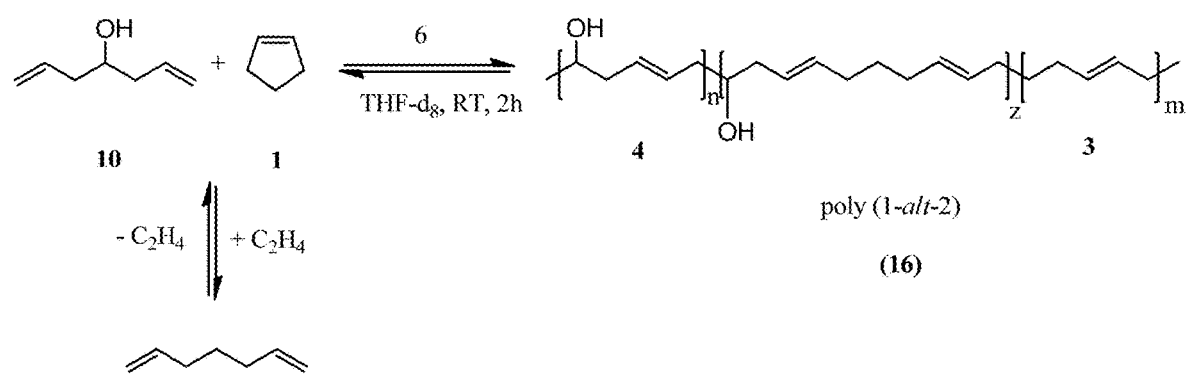
FIG. 8 depicts the synthesis of copolymers (16) with the one pot ADMET-ROMP copolymerization of 1,6-heptadien-4-ol (10) and cyclopentene (1).

Following the ROMP copolymerization tests, the simultaneous ADMET 1,6-heptadien-4-ol (10) and ROMP cyclopentene (1) (FIG. 8) was examined. As it is demonstrated in (FIG. 8) the copolymerization of 1,6-heptadiene-4-ol (10) with cyclopentene (1) can be performed in one pot with the combination of ADMET and ROMP reactions. Experiments were carried out in an open vial in the glovebox using similar reaction conditions and (3) and (4) copolymer formation was observed with similar component compositions. In the $^1$H NMR spectra in the —CH═ region three main peaks can be observed: 5.51 ppm: polyhydroxy polypentenamer block unit; 5.46 ppm: alternating polymer; 5.46: polypentenamer block unit. The polarity of the formed polymer (16) can be fine-tuned by the combination of the added monomers. Interestingly, it was observed that the ethylene released during ADMET reacts with cyclopentene (1) giving 1,6-heptadiene (FIG. 8) in low yield. The reaction of cyclopentene (1) with ethylene to give 1,6-heptadiene has been previously reported (see Marinescu, S.; Schrock, R.; Muller, P.; Hoveyda, A. *Journal of the American Chemical Society* 2009, 131, 10840).

In summary, the convenient one-pot polymerization and copolymerization of cyclopentene (1) and non-protected 3-cyclopentene-1-ol (2) using the well-defined ruthenium metathesis catalysts (6) and (7) have been demonstrated. Well-defined poly(vinylalcohol-alt-propenylene) (4) was synthesized via equilibrium ROMP or ADMET using non-protected 3-cyclopentene-1-ol (2) and 1,6-heptadiene-4-ol (10). The thermodynamics of the reaction have been investigated and the activation enthalpy and entropy were determined to be: $\Delta H=-6.2$ kcal·mol$^{-1}$ and $\Delta S=-18.7$ cal·mol$^{-1}$·K$^{-1}$. These values are slightly higher than those measured for cyclopentene (1) ($\Delta H=-5.6$ kcal·mol$^{-1}$; $\Delta S=-18.5$ cal·mol$^{-1}$·K$^{-1}$). This was expressed in lower monomer 3-cyclopentene-1-ol (2) equilibrium concentrations at similar reaction condition (30° C.: [1]=1.09 M (conversion: 50%); [2]=0.46 M (conversion: 80%)). The observed thermodynamic parameters were supported by computational studies. The calculated ring strain energy for cyclopentene (1) (−5.4 kcal·mol$^{-1}$) and 3-cyclopentene-1-ol (2) (−6.8 kcal·mol$^{-1}$) were comparable with the observed activation enthalpies for their equilibrium ROMP reaction of 3-cyclopentene-1-ol (2). The cis:trans olefinic bond ratio analysis indicated a 20:80 cis:trans selectivity, which was similar to polypentenamer (3) (18:82) synthesized by catalyst (6). The hydrogenation of poly(vinylalcohol-alt-propenylene) (4) resulted in poly(vinylalcohol-alt-propylene) (11) in high yield. According to the $^{13}$C NMR analysis higher m dyad tacticity could be determined for polymer (4) synthesized by ADMET.

Due to the similar ring strain energies of cyclopentene (1) and 3-cyclopentene-1-ol (2), the equilibrium copolymerization resulted in a polymer having randomly distributed dyads. In general it meant that the polymer formed contained approximately 50% alternating polymer, 25% (3) and 25% (4) homo-polymer dyads as expected for a random polymerization.

Chemical processes producing biopolymers (e.g., drug delivery agents or artificial tissues) with adjustable polarities are of considerable interest. Well-defined PVA copolymers with fine-tuned polarity can be prepared by copolymerization of monomers 3-cyclopentene-1-ol (2) or 1,6-heptadien-4-ol (10) with monomer cyclopentene (1). The ruthenium-based metathesis catalysts (6) and (7) were demonstrated to be efficient catalytic tools for the one-pot production of PVA copolymers such as poly(vinylalcohol-alt-propenylene) (4) and poly(vinylalcohol-alt-propylene) (11). We anticipate that these novel well-defined PVA copolymer synthetic strategies will be general for a wide variety of barrier and biomaterial synthesis.

Cyclic Polyolefins

Linear polypentenamers are synthesized by ring opening metathesis polymerization (ROMP) of cyclopentene using tungsten, molybdenum or ruthenium catalysts (see G. Natta, G. Dallasta, G. Donegani, G. Mazzanti, *Angewandte Chemie-International Edition* 1964, 3, 723; N. Calderon, R. Hinrichs, *Chemtech* 1974, 4, 627-630; R. Tuba, R. Grubbs, *Abstracts of Papers of the American Chemical Society* 2013, 246; E. Ofstead, N. Calderon, *Makromolekulare Chemie* 1972, 154, 21; R. Tuba, R. Grubbs, *Polymer Chemistry* 2013, 4, 3959-3962). While macrocyclic polypentenamers are not yet known, the synthesis of high molecular weight cyclic polyoctenamers (see C. Bielawski, D. Benitez, R. Grubbs, *Science* 2002, 297, 2041-2044; K. Zhang, M. Lackey, J. Cui, G. Tew, *Journal of the American Chemical Society* 2011, 133, 4140-4148), polybutadiene (see C. Bielawski, D. Benitez, R. Grubbs, *Journal of the American Chemical Society* 2003, 125, 8424-8425), and polynorbornene (see K. Zhang, M. Lackey, Y. Wu, G. Tew, *Journal of the American Chemical Society* 2011, 133, 6906-6909; K. Zhang, G. Tew, *Acs Macro Letters* 2012, 1, 574-579) via ruthenium catalyzed ring expansion metathesis polymerization (REMP) has been reported. Although these REMP catalysts (see Y. Xia, A. Boydston, Y. Yao, J. Kornfield, I. Gorodetskaya, H. Spiess, R. Grubbs, *Journal of the American Chemical Society* 2009, 131, 2670-2677) are powerful tools for the synthesis of high molecular weight polymers, they suffer from several drawbacks such as low stability and activity (see A. Boydston, Y. Xia, J. Kornfield, I. Gorodetskaya, R. Grubbs, *Journal of the American Chemical Society* 2008, 130, 12775-12782). Linear impurities inevitably arise from both catalyst decomposition (see Y. Xia, A. Boydston, R. Grubbs, *Angewandte Chemie-International Edition* 2011, 50, 5882-5885) and subsequent ring opening cross-metathesis (ROCM) reactions between the linear impurities and macrocycles (see O. Arjona, A. Csaky, J. Plumet, *Synthesis-Stuttgart* 2000, 857-861; J. Tallarico, M. Randall, M. Snapper, *Tetrahedron* 1997, 53, 16511-16520).

Additionally, ROMP produces a mixture of linear and cyclic polymer chains as a result of ring-chain equilibrium, which depends on number of factors including catalyst type, reaction conditions, monomer ring strain energy, and concentration (see S. Monfette, D. Fogg, *Chemical Reviews* 2009, 109, 3783-3816). Prediction of the critical monomer concentration that gives rise to cyclopolymers at equilibrium is possible with the refinement of Jacobsen—Stockmayer ring-chain equilibria theory (see H. Jacobson, W. Stockmayer, *Journal of Chemical Physics* 1950, 18, 1600-1606). Below the critical concentration, both macrocycles and linear polymers form, however, at higher concentration the macrocyclic polymer remains constant and only the linear polymer content increases (see U. Suter, H. Hocker, *Makromolekulare Chemie-Macromolecular Chemistry and Physics* 1988, 189, 1603-1612; Z. Chen, J. Claverie, R. Grubbs, J. Kornfield, *Macromolecules* 1995, 28, 2147-2154).

Highly active and relatively stable (1,3-bis-(2,4,6-trimethylphenyl)-2-imidazolidinylidene) dichloro(o-isopropoxyphenylmethylene)ruthenium catalyst systems (7) are known to produce low molecular weight macrocyclic oligo(5-acetyloxycyclooct-1-ene) cyclic oligomers via ROMP of 5-acetyloxycoclooct-1-ene (see A. Blencowe, G. Qiao, *Journal of the American Chemical Society* 2013, 135, 5717-5725). We envisioned that the molecular weight and yield of cyclic polymers might become independent of the applied monomer concentration if both termini of the growing polymer chain were held in close proximity during the propagation step (FIG. 10) (i.e. monomer concentration can be higher than the critical monomer concentration and still produce mostly cyclic polymer).

Figure 11:
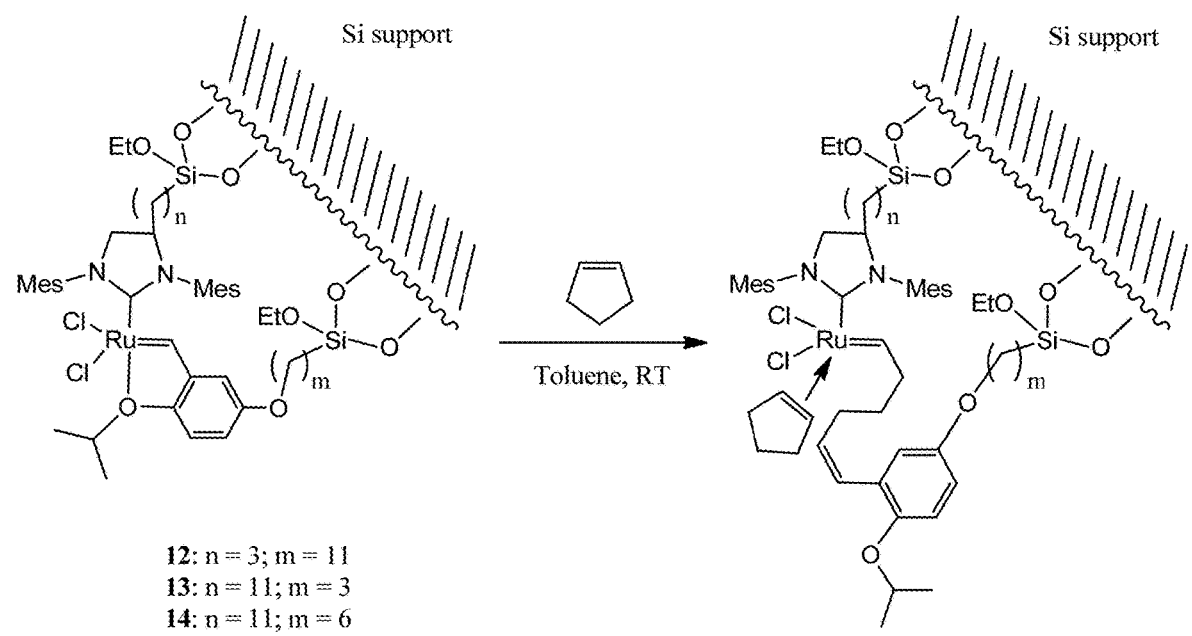
FIG. 11 depicts examples of silica supported 2nd generation Hoveyda-Grubbs catalyst useful for cyclopolymer synthesis.

Thus silica supported catalysts [(1,3-bis-(2,4,6-trimethylphenyl)-2-imidazolidinylidene) dichloro(o-isopropoxyphenylmethylene) ruthenium (12-14)] tethered via isopropoxyaryl and NHC ligands were synthesized and tested for cyclopolymerization of cyclopentene (1) (FIG. 11) (see D. Allen, M. Van Wingerden, R. Grubbs, *Organic Letters* 2009, 11, 1261-1264; D. Allen, M. Giardello, PCT Int'l Pub. No. WO 2011/069134A2). The polymerization reactions were performed in highly concentrated, 20 vol % (0.22 M) cyclopentene (1) solution in toluene at room temperature using 0.01% catalyst loading (M/C=$10^4$).

Soon after the addition of cyclopentene (1) to the suspended silica supported catalyst (12) the greenish mixture became viscous. After one hour, the stirring was stopped and the catalyst slowly settled to the bottom of the flask. The clear supernatant was removed via syringe or alternatively the solution was filtered through filter paper. Following solvent and residual cyclopentene monomer (1) evaporation, a colorless, glue-like polymer remained. The isolated mass of the polymer was 50-55% percent, which agrees with a 45% monomer equilibrium concentration previously reported (see R. Tuba, R. Grubbs, *Polymer Chemistry* 2013, 4, 3959-3962). Catalyst turnover numbers (TONs) as high as $10^4$ were measured. No significant polymer formation observed with lower catalyst loadings. Gel permeation chromatography (GPC) revealed a number average molecular weight ($M_n$) of 27 kDa (Đ=1.3), far below the theoretically calculated value (370 kDa). Interestingly, similar molecular weight linear polymer ($M_n$=36 kDa; Đ=2.0) was synthesized using catalyst (1,3-bis(2,4,6-trimethylphenyl)-2-imidazolidinylidene) dichloro (phenylmethylene)(tricyclohexylphosphine)ruthenium (6) at 450 monomer/catalyst ratio with the same reaction condition (see R. Tuba, R. Grubbs, *Polymer Chemistry* 2013, 4, 3959-3962).

The PDI values of the cyclopolymers are slightly lower than those of the linear polymer. The Mark-Houwink parameters (a, K) have been determined with an intristic viscometer equipped GPC instrument. The "a" value is significantly higher for the cyclic polymers than the linear ones indicating that the cyclic polyolefins are more rigid than the linear ones (Table 2).

TABLE 2

Comparison of cyclic and linear polymer properties.

| Experiments | Polymer type | MW (kDa) | PDI | Mark-Houwink[a] (a) | Mark-Houwink[a] (K) × $10^3$ |
|---|---|---|---|---|---|
| 1 | Linear | 408 | 1.32 | 0.59 ± 0.04 | 43.2 ± 9.0 |
| 2 | | 89.5 | 1.74 | | |
| 3 | | 16.6 | 1.34 | | |
| 4 | Cyclic | 36.0 | 1.34 ± 0.07 | 0.92 ± 0.05 | 3.96 ± 1.79 |

[a]Average of seven runs.

The silica supported catalyst (12) was recycled five times, a lower polymer yield was observed in each subsequent cycle indicating some catalyst decomposition. At the fourth and fifth cycle the polymer quality dropped significantly and a high PDI was observed (see experimental section for details).

The cyclic topology of the prepared polypentenamers was confirmed by a variety of characterization techniques, including melt-state magic angle spinning (MAS) NMR spectroscopy, gel permeation chromatography (GPC), and matrix assisted laser desorption ionization time-of-flight (MALDI-TOF) mass spectroscopy. A series of linear polypentenamers were also synthesized (using previously reported procedures) for comparison.

Figure 12:
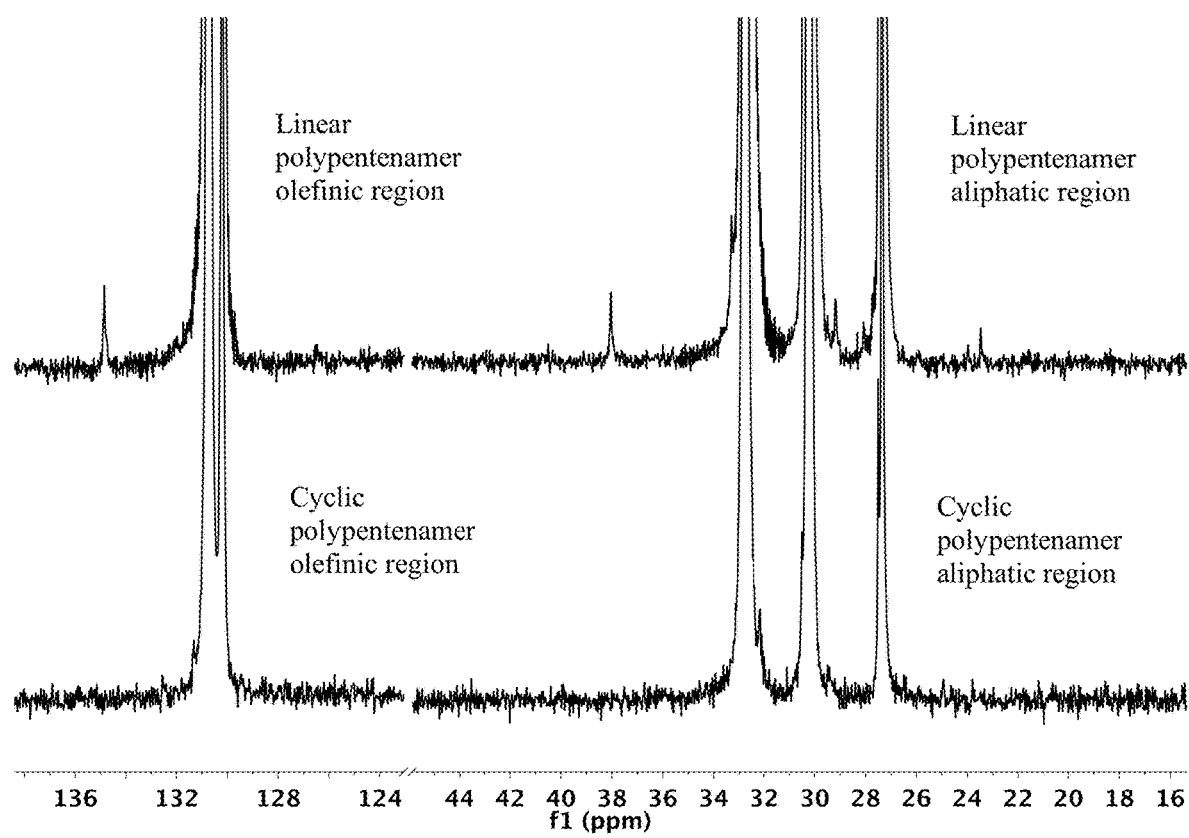
FIG. 12 depicts the melt-state $^{13}$C NMR spectra of linear polypentenamer olefinic region (top left), linear polypentenamer aliphatic region (top right), cyclic polypentenamer olefinic region (bottom left), and cyclic polypentenamer aliphatic region (bottom right). Linear M$_n$=312 kDa; cyclic M$_n$=27.4 kDa.

Melt-state MAS $^{13}$C NMR is a powerful methodology that can provide quantitative and qualitative information about polymer topology, for instance, the quantitative measurement of polyethylene branch content (see K. Klimke, M. Parkinson, C. Piel, W. Kaminsky, H. Spiess, M. Wilhelm, *Macromolecular Chemistry and Physics* 2006, 207, 382-395; M. Pollard, K. Klimke, R. Graf, H. Spiess, M. Wilhelm, O. Sperber, C. Piel, W. Kaminsky, *Macromolecules* 2004, 37, 813-825). We reasoned that application of MAS to cyclic polymers should resolve any linear impurities or polymeric contaminants with end groups. FIG. 12 shows the melt-state MAS $^{13}$C NMR spectra of the linear and cyclic polypentenamer. The macrocyclic polymer double bonds have mainly trans (130.7 ppm; cis: 130.2 ppm) (see O. Derek, B. Duz, Y. Imamoglu, *European Polymer Journal* 2006, 42, 368-374) configuration (cis/trans=18/82%) similarly to the linear analogues (see G. Natta, G. Dallasta, G. Donegani, G. Mazzanti, *Angewandte Chemie-International Edition* 1964, 3, 723; R. Tuba, R. Grubbs, *Polymer Chemistry* 2013, 4, 3959-3962). No end groups were detected for cyclopolypentenamers ($M_n$=27.4 kDa), while clear end groups are present in the significantly higher molecular weight linear polymer sample ($M_n$=312 kDa).

Figure 13:
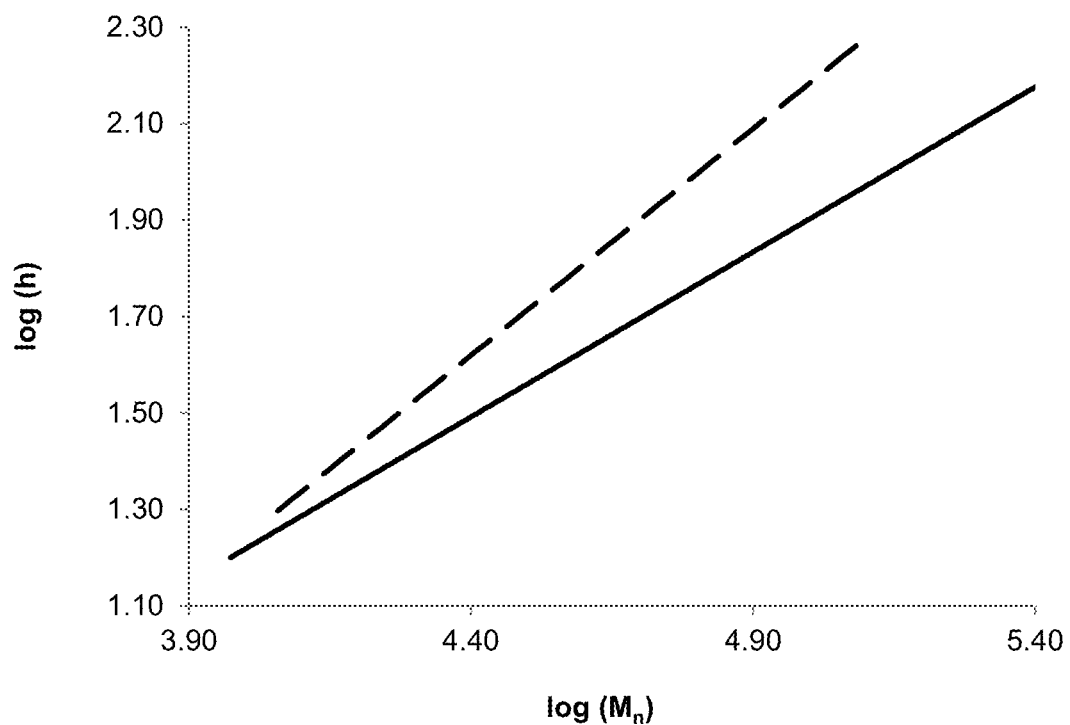
FIG. 13 is a plot of log(□) versus log (M$_n$) (Mark-Houwink-Sakurada plot) comparison of cyclic polypentenamer (dashed line) and linear polypentenamer (solid line).

The Mark-Houwink-Sakurada parameters and intrinsic viscosity moments of the linear and cyclic polypentenamers exhibit marked differences and are summarized in Table 3 and plotted in FIG. 13. The linear (average a=0.61, K=32.5× $10^3$ mL/g) and cyclic (a=0.92±0.05, K=3.96±1.79×$10^3$ mL/g) polypentenamers vary significantly. While the linear polymer 'a' value is consistent with flexible chains dissolved in a relatively good solvent, the cyclic data are suggestive of stiffer, semi-flexible chains. The K value for cyclic polypentenamers is noticeably lower than the linear polypentenamers. Additionally, the intrinsic viscosity measured herein for cyclic polypentenamer is twice as large as linear polypentenamer, an unexpected observation considering macrocyclic polymers generally exhibit a smaller intrinsic viscosity. Subtle differences in topological solvent affinity, chain microstructure, or molecular mass distributions should not be discounted as possible contributors to the observed variance. Similar trends in GPC data observed with polyoctenamers may arise due to related effects.

cationic desorbed chains (z=1), while the minor peaks may be the dicationic (z=2) macrocyclic polymers.

Figure 10:
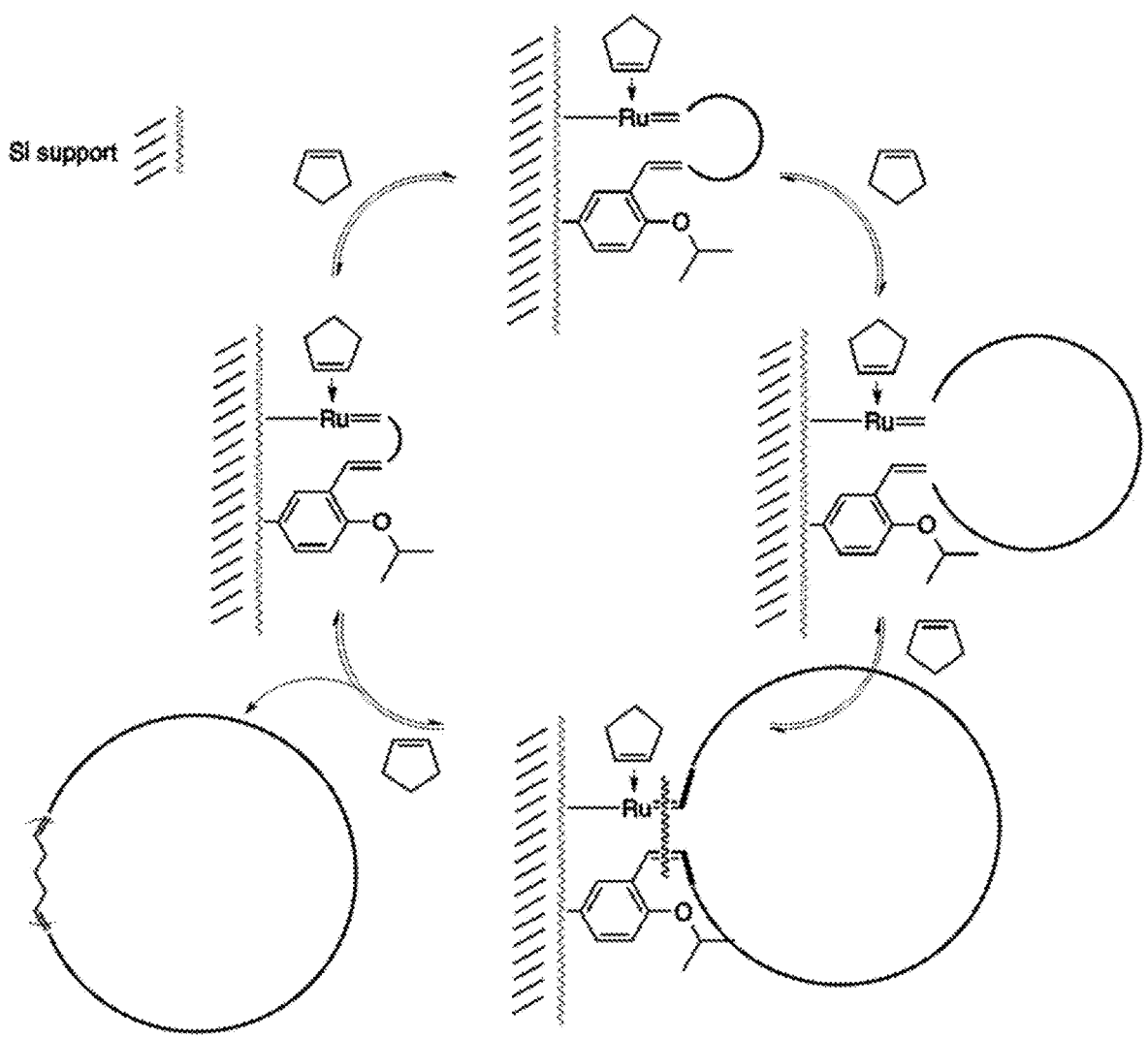
FIG. 10 depicts the synthesis of cyclic polypentenamers with silica supported 2nd generation Hoveyda-Grubbs catalyst.

In summary, ring-opening metathesis polymerization of cyclopentene (1) using silica supported catalyst (12) results in moderate molecular macrocyclic polypentenamers. The tethering of the isopropoxy and NHC ligands to silica ensures that macrocyclic formation remains favored, even at high monomer concentration (FIG. 10). The measured molecular weight of the macrocyclic polypentenamer was one magnitude lower than the theoretically calculated value. In contrast, preliminary investigations indicate polymerization of highly strained cis-cyclooctene results in significantly higher molecular weight cyclopolyoctenamer (>500 kDa; Đ=1.2). The ring strain energy of the monomers thus may determine the size of the macrocycles formed. The cyclopolypentenamer exhibits an apparent semi-flexible molecular architecture and higher intrinsic viscosity than its linear counterparts. The silica-supported catalysts can be recycled at least three times without loss of polymer quality (600 mg cyclopolypentenamer could be synthesized using 40 mg supported catalyst (12)). The unprecedented level of topological control afforded by the silica-supported catalysts

TABLE 3

Mark - Houwink - Sakurada parameters (a, K), and intrinsic viscosities ($h_n$) of linear and cyclic polypentenamers.

| Polymer | $M_n$ (kDa) | Đ[a] | a | K × $10^3$ (mL/g) | ($h_n$) |
|---|---|---|---|---|---|
| Linear | 312 | 1.27 | 0.67 | 39.8 | 175.1 |
| Linear | 60.0 | 1.77 | 0.59 | 39.3 | 24.3 |
| Linear | 42.5 | 1.83 | 0.56 | 49.2 | 19.8 |
| Linear | 12.4 | 1.34 | 0.61 | 60.5 | 19.3 |
| Cyclic[a] | 24.9 ± 3.3 | 1.34 ± 0.11 | 0.92 ± 0.05 | 3.96 ± 1.79 | 46.0 ± 3.9 |

GPC tests were carried out in THF at room temperature.
[a]Average of seven repeated polymerization experiments and GPC runs.

Figure 14:
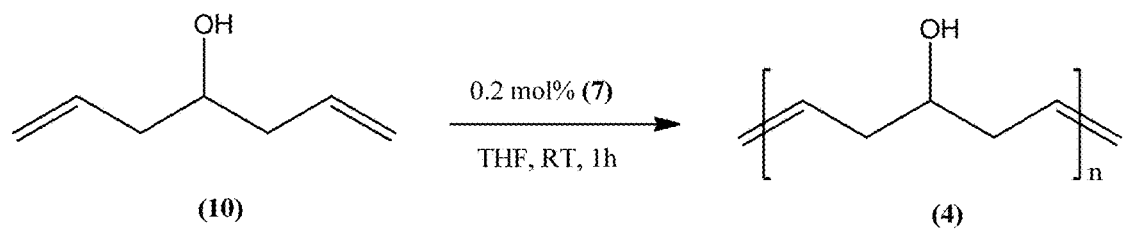
FIG. 14 depicts the ADMET polymerization of linear hydroxyl functionalized polypentenamer (4) and the MALDI-TOF spectra peak table for linear polymer (4).
Figure 15:
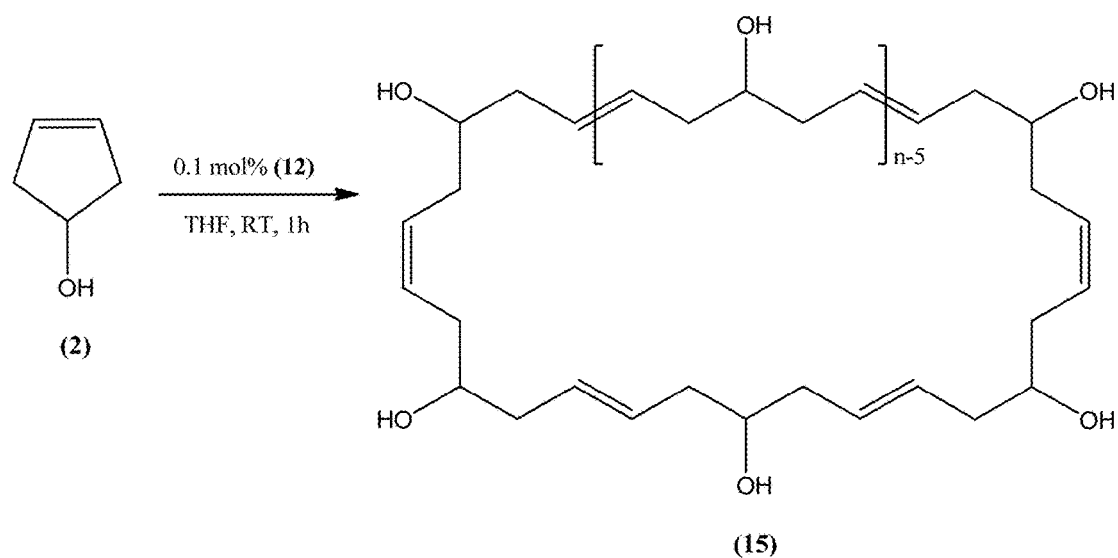
FIG. 15 depicts the synthesis of cyclic hydroxyl functionalized polypentenamer (15) and the MALDI-TOF spectra peak table for cyclic polymer (15).

MALDI-TOF mass spectroscopy analysis of polypentenamers produced with silica-supported catalysts is also consistent with a cyclic topology (see J. Klee, *European Journal of Mass Spectrometry* 2005, 11, 591-610). Since non-polar, high molecular weight synthetic polymers (e.g. polypentenamer) are notoriously difficult to characterize by MALDI-TOF especially if they have high molecular mass dispersity indices (see H. Byrd, C. McEwen, *Analytical Chemistry* 2000, 72, 4568-4576), analogous linear and cyclic hydroxyl-functionalized analogues were synthesized. A well-defined, linear hydroxyl-functionalized polypentenamer, poly(vinylalcohol-alt-propenylene) (4) was synthesized by acyclic diene metathesis (ADMET) polymerization of 1,6-heptadiene-4-ol (10) using catalyst (7) ($M_n$=2.79 kDa; Đ=1.38) (FIG. 14). The hydroxyl-functionalized cyclopolypentenamer analogue (15) was synthesized by polymerization of 3-cyclopentene-1-ol (2) using silica-supported catalyst (12) under similar conditions (FIG. 15). The limited THF solubility of the isolated pale yellow polymer limited GPC analysis, however MALDI-TOF characterization was readily achieved. Comparison of the MALDI-TOF spectra peak tables clearly shows that the linear polymer m/z values are ca. 27.8 g/mol higher than the macrocyclic counterpart (FIG. 14 (linear polymer (4)) and FIG. 15 (cyclic polymer (15))). This difference suggests the presence of two $CH_2$ end groups (exact mass m/z=28.03) present on the linear polymer are absent from the cyclic polymer. Two apparent peak distributions are present in the mass spectra of the macrocyclic polymer. The major peaks are assigned to the monoshould improve the accessibility of cyclic polymers and facilitate the design materials for industrial applications.

Olefin Metathesis Catalysts

An olefin metathesis catalyst that may be used in the invention disclosed herein, is preferably a Group 8 transition metal complex having the structure of formula (I)

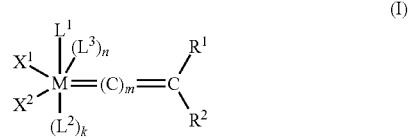

(I)

in which:
M is a Group 8 transition metal;
$L^1$, $L^2$, and $L^3$ are neutral electron donor ligands;
n is 0 or 1, such that $L^3$ may or may not be present;
m is 0, 1, or 2;
k is 0 or 1;
$X^1$ and $X^2$ are anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

Additionally, in formula (I), one or both of $R^1$ and $R^2$ may have the structure $—(W)_n—U^+V^-$, in which W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is zero or 1. Furthermore, $R^1$ and $R^2$ may be taken together to form an indenylidene moiety.

Preferred catalysts contain Ru or Os as the Group 8 transition metal, with Ru particularly preferred.

Numerous embodiments of the catalysts useful in the reactions disclosed herein are described in more detail infra. For the sake of convenience, the catalysts are described in groups, but it should be emphasized that these groups are not meant to be limiting in any way. That is, any of the catalysts useful in the invention may fit the description of more than one of the groups described herein.

A first group of catalysts, then, are commonly referred to as First Generation Grubbs-type catalysts, and have the structure of formula (I). For the first group of catalysts, M is a Group 8 transition metal, m is 0, 1, or 2, and n, $X^1$, $X^2$, $L^1$, $L^2$, $L^3$, $R^1$, and $R^2$ are described as follows.

For the first group of catalysts, n is 0, and $L^1$ and $L^2$ are independently selected from phosphine, sulfonated phosphine, phosphite, phosphinite, phosphonite, arsine, stibine, ether, (including cyclic ethers), amine, amide, imine, sulfoxide, carboxyl, nitrosyl, pyridine, substituted pyridine, imidazole, substituted imidazole, pyrazine, substituted pyrazine and thioether. Exemplary ligands are trisubstituted phosphines. Preferred trisubstituted phosphines are of the formula $PR^{H1}R^{H2}R^{H3}$, where $R^{H1}$, $R^{H2}$, and $R^{H3}$ are each independently substituted or unsubstituted aryl or $C_1$-$C_{10}$ alkyl, particularly primary alkyl, secondary alkyl, or cycloalkyl. In the most preferred, $L^1$ and $L^2$ are independently selected from the group consisting of trimethylphosphine ($PMe_3$), triethylphosphine ($PEt_3$), tri-n-butylphosphine ($PBu_3$), tri(ortho-tolyl)phosphine (P-o-tolyl$_3$), tri-tert-butylphosphine (P-tert-Bu$_3$), tricyclopentylphosphine (PCyclopentyl$_3$), tricyclohexylphosphine ($PCy_3$), triisopropylphosphine (P-i-Pr$_3$), trioctylphosphine (POct$_3$), triisobutylphosphine, (P-i-Bu$_3$), triphenylphosphine ($PPh_3$), tri(pentafluorophenyl)phosphine ($P(C_6F_5)_3$), methyldiphenylphosphine ($PMePh_2$), dimethylphenylphosphine ($PMe_2Ph$), and diethylphenylphosphine ($PEt_2Ph$). Alternatively, $L^1$ and $L^2$ may be independently selected from phosphabicycloalkane (e.g., monosubstituted 9-phosphabicyclo-[3.3.1]nonane, or monosubstituted 9-phosphabicyclo [4.2.1]nonane] such as cyclohexylphoban, isopropylphoban, ethylphoban, methylphoban, butylphoban, pentylphoban and the like).

$X^1$ and $X^2$ are anionic ligands, and may be the same or different, or are linked together to form a cyclic group, typically although not necessarily a five- to eight-membered ring. In preferred embodiments, $X^1$ and $X^2$ are each independently hydrogen, halide, or one of the following groups: $C_1$-$C_{20}$ alkyl, $C_5$-$C_{24}$ aryl, $C_1$-$C_{20}$ alkoxy, $C_5$-$C_{24}$ aryloxy, $C_2$-$C_{20}$ alkoxycarbonyl, $C_6$-$C_{24}$ aryloxycarbonyl, $C_2$-$C_{24}$ acyl, $C_2$-$C_{24}$ acyloxy, $C_1$-$C_{20}$ alkylsulfonato, $C_5$-$C_{24}$ arylsulfonato, $C_1$-$C_{20}$ alkylsulfanyl, $C_5$-$C_{24}$ arylsulfanyl, $C_1$-$C_{20}$ alkylsulfinyl, $NO_3$, $—N=C=O$, $—N=C=S$, or $C_5$-$C_{24}$ arylsulfinyl. Optionally, $X^1$ and $X^2$ may be substituted with one or more moieties selected from $C_1$-$C_{12}$ alkyl, $C_1$-$C_{12}$ alkoxy, $C_5$-$C_{24}$ aryl, and halide, which may, in turn, with the exception of halide, be further substituted with one or more groups selected from halide, $C_1$-$C_6$ alkyl, $C_1$-$C_6$ alkoxy, and phenyl. In more preferred embodiments, $X^1$ and $X^2$ are halide, benzoate, $C_2$-$C_6$ acyl, $C_2$-$C_6$ alkoxycarbonyl, $C_1$-$C_6$ alkyl, phenoxy, $C_1$-$C_6$ alkoxy, $C_1$-$C_6$ alkylsulfanyl, aryl, or $C_1$-$C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethane-sulfonate. In the most preferred embodiments, $X^1$ and $X^2$ are each chloride.

$R^1$ and $R^2$ are independently selected from hydrogen, hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), heteroatom-containing hydrocarbyl (e.g., heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and substituted heteroatom-containing hydrocarbyl (e.g., substituted heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred catalysts, $R^1$ is hydrogen and $R^2$ is selected from $C_1$-$C_{20}$ alkyl, $C_2$-$C_{20}$ alkenyl, and $C_5$-$C_{24}$ aryl, more preferably $C_1$-$C_6$ alkyl, $C_2$-$C_6$ alkenyl, and $C_5$-$C_{14}$ aryl. Still more preferably, $R^2$ is phenyl, vinyl, methyl, isopropyl, or t-butyl, optionally substituted with one or more moieties selected from $C_1$-$C_6$ alkyl, $C_1$-$C_6$ alkoxy, phenyl, and a functional group Fn as defined earlier herein. Most preferably, $R^2$ is phenyl or vinyl substituted with one or more moieties selected from methyl, ethyl, chloro, bromo, iodo, fluoro, nitro, dimethylamino, methyl, methoxy, and phenyl. Optimally, $R^2$ is phenyl or $—CH=C(CH_3)_2$.

Any two or more (typically two, three, or four) of $X^1$, $X^2$, $L^1$, $L^2$, $L^3$, $R^1$, and $R^2$ can be taken together to form a cyclic group, including bidentate or multidentate ligands, as disclosed, for example, in U.S. Pat. No. 5,312,940, the disclosure of which is incorporated herein by reference. When any of $X^1$, $X^2$, $L^1$, $L^2$, $L^3$, $R^1$, and $R^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of catalysts, commonly referred to as Second Generation Grubbs-type catalysts, have the structure of formula (I), wherein L is a carbene ligand having the structure of formula (II)

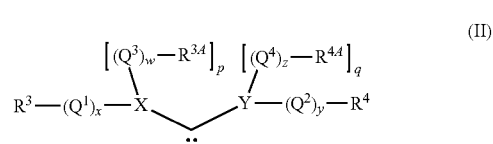

such that the complex may have the structure of formula (III)

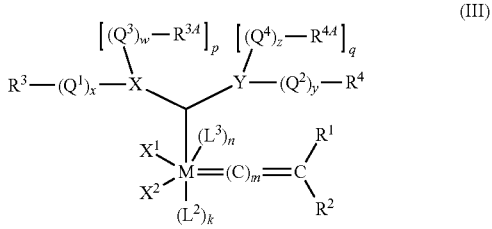

(III)

wherein M, m, n, $X^1$, $X^2$, $L^2$, $L^3$, $R^1$, and $R^2$ are as defined for the first group of catalysts, and the remaining substituents are as follows;

X and Y are heteroatoms typically selected from N, O, S, and P. Since O and S are divalent, p is necessarily zero when X is O or S, q is necessarily zero when Y is O or S, and k is zero or 1. However, when X is N or P, then p is 1, and when Y is N or P, then q is 1. In a preferred embodiment, both X and Y are N;

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within $Q^1$, $Q^2$, $Q^3$, and $Q^4$ may be linked to form an additional cyclic group; and $R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl. In addition, X and Y may be independently selected from carbon and one of the heteroatoms mentioned above, preferably no more than one of X or Y is carbon. Also, $L^2$ and $L^3$ may be taken together to form a single bidentate electron-donating heterocyclic ligand. Furthermore, $R^1$ and $R^2$ may be taken together to form an indenylidene moiety. Moreover, $X^1$, $X^2$, $L^2$, $L^3$, X and Y may be further coordinated to boron or to a carboxylate.

In addition, any two or more of $X^1$, $X^2$, $L^1$, $L^2$, $L^3$, $R^1$, $R^2$, $R^3$, $R^{3A}$, $R^4$, $R^{4A}$, $Q^1$, $Q^2$, $Q^3$, and $Q^4$ can be taken together to form a cyclic group, and any one or more of $X^1$, $X^2$, $L^2$, $L^3$, Q $Q^2$, $Q^3$, $Q^4$, R, $R^2$, $R^3$, $R^{3A}$, $R^4$, and $R^{4A}$ may be attached to a support. Any two or more of $X^1$, $X^2$, $L^1$, $L^2$, $L^3$, $R^1$, $R^2$, $R^3$, $R^{3A}R^4$, and $R^{4A}$ can also be taken to be -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein hetero atoms and/or functional groups may be present in either the aryl or the alkyl portions of the alkylene and arylalkylene groups, and Fn is a functional group, or together to form a cyclic group, and any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support.

A particular class of carbene ligands having the structure of formula (II), where $R^{3A}$ and $R^{4A}$ are linked to form a cyclic group and at least one of X or Y is a nitrogen, or at least one of $Q^3$ or $Q^4$ is a heteroatom-containing hydrocarbylene or substituted heteroatom-containing hydrocarbylene, where at least one heteroatom is a nitrogen, are commonly referred to as N-heterocyclic carbene (NHC) ligands.

Preferably, $R^{3A}$ and $R^{4A}$ are linked to form a cyclic group so that the carbene ligand has the structure of formula (IV)

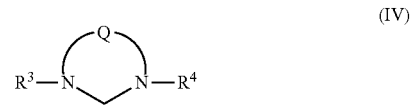

(IV)

wherein $R^3$ and $R^4$ are as defined for the second group of catalysts above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although not necessarily, a two-atom linkage or a three-atom linkage.

Examples of N-heterocyclic carbene (NHC) ligands and acyclic diaminocarbene ligands suitable as $L^1$ thus include, but are not limited to, the following where DIPP or DiPP is diisopropylphenyl and Mes is 2,4,6-trimethylphenyl:

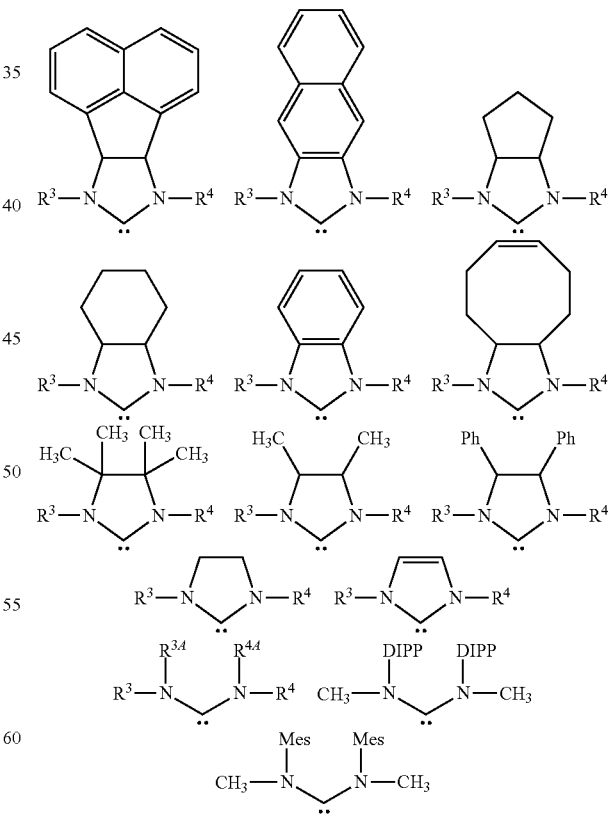

Additional examples of N-heterocyclic carbene (NHC) ligands and acyclic diaminocarbene ligands suitable as $L^1$ thus include, but are not limited to the following:

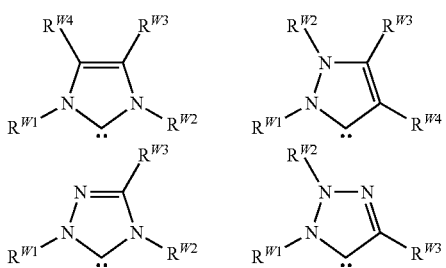

wherein $R^{W1}$, $R^{W2}$, $R^{W3}$, $R^{W4}$ are independently hydrogen, unsubstituted hydrocarbyl, substituted hydrocarbyl, or heteroatom containing hydrocarbyl, and where one or both of $R^{W3}$ and $R^{W4}$ may be in independently selected from halogen, nitro, amido, carboxyl, alkoxy, aryloxy, sulfonyl, carbonyl, thio, or nitroso groups.

Additional examples of N-heterocyclic carbene (NHC) ligands suitable as $L^1$ are further described in U.S. Pat. Nos. 7,378,528; 7,652,145; 7,294,717; 6,787,620; 6,635,768; and 6,552,139 the contents of each are incorporated herein by reference.

Additionally, thermally activated N-Heterocyclic Carbene Precursors as disclosed in U.S. Pat. No. 6,838,489, the contents of which are incorporated herein by reference, may also be used with the present invention.

When M is ruthenium, then, the preferred complexes have the structure of formula (V)

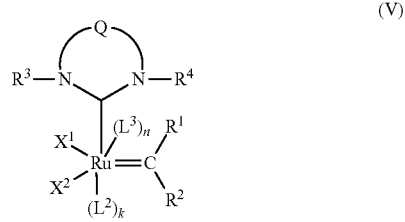

(V)

In a more preferred embodiment, Q is a two-atom linkage having the structure $-CR^{11}R^{12}-CR^{13}R^{14}-$ or $-CR^{11}=CR^{13}-$, preferably $-CR^{11}R^{12}-CR^{13}R^4-$, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include without limitation carboxyl, $C_1$-$C_{20}$ alkoxy, $C_5$-$C_{24}$ aryloxy, $C_2$-$C_{20}$ alkoxycarbonyl, $C_5$-$C_{24}$ alkoxycarbonyl, $C_2$-$C_{24}$ acyloxy, $C_1$-$C_{20}$ alkylthio, $C_5$-$C_{24}$ arylthio, $C_1$-$C_{20}$ alkylsulfonyl, and $C_1$-$C_{20}$ alkylsulfinyl, optionally substituted with one or more moieties selected from $C_1$-$C_{12}$ alkyl, $C_1$-$C_{12}$ alkoxy, $C_5$-$C_{14}$ aryl, hydroxyl, sulfhydryl, formyl, and halide. $R^{11}$, $R^{12}$, $R^{13}$, and $R^{14}$ are preferably independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl. Alternatively, any two of $R^{11}$, $R^{12}$, $R^{13}$, and $R^{14}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents. In one further aspect, any one or more of $R^{11}$, $R^2$, $R^{13}$, and $R^4$ comprises one or more of the linkers. Additionally, $R^3$ and $R^4$ may be unsubstituted phenyl or phenyl substituted with one or more substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Furthermore, $X^1$ and $X^2$ may be halogen.

When $R^3$ and $R^4$ are aromatic, they are typically although not necessarily composed of one or two aromatic rings, which may or may not be substituted, e.g., $R^3$ and $R^4$ may be phenyl, substituted phenyl, biphenyl, substituted biphenyl, or the like. In one preferred embodiment, $R^3$ and $R^4$ are the same and are each unsubstituted phenyl or phenyl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Preferably, any substituents present are hydrogen, $C_1$-$C_{12}$ alkyl, $C_1$-$C_{12}$ alkoxy, $C_5$-$C_{14}$ aryl, substituted $C_5$-$C_{14}$ aryl, or halide. As an example, $R^3$ and $R^4$ are mesityl (i.e., Mes as defined herein).

In a third group of catalysts having the structure of formula (I), M, m, n, $X^1$, $X^2$, $R^1$, and $R^2$ are as defined for the first group of catalysts, $L^1$ is a strongly coordinating neutral electron donor ligand such as any of those described for the first and second group of catalysts, and $L^2$ and $L^3$ are weakly coordinating neutral electron donor ligands in the form of optionally substituted heterocyclic groups. Again, n is zero or 1, such that $L^3$ may or may not be present. Generally, in the third group of catalysts, $L^2$ and $L^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of catalysts, examples of $L^2$ and $L^3$ include, without limitation, heterocycles containing nitrogen, sulfur, oxygen, or a mixture thereof.

Examples of nitrogen-containing heterocycles appropriate for $L^2$ and $L^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole. Additionally, the nitrogen-containing heterocycles may be optionally substituted on a non-coordinating heteroatom with a non-hydrogen substituent.

Examples of sulfur-containing heterocycles appropriate for $L^2$ and $L^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for $L^2$ and $L^3$ include 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for $L^2$ and $L^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred $L^2$ and $L^3$ ligands are aromatic nitrogen-containing and oxygen-containing heterocycles, and particularly preferred $L^2$ and $L^3$ ligands are monocyclic N-heteroaryl ligands that are optionally substituted with 1 to 3, preferably 1 or 2, substituents. Specific examples of particularly preferred $L^2$ and $L^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on $L^2$ and/or $L^3$ are selected from halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ arylcarbonyl, $C_2$-$C_{20}$ alkylcarbonyloxy, $C_6$-$C_{24}$ arylcarbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl), N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di($C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

In certain embodiments, $L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of formula (VI)

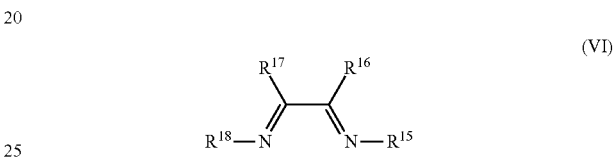

(VI)

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and $R^{18}$, (3) $R^{16}$ and $R^{17}$, or (4) both $R^{15}$ and $R^{16}$, and $R^{17}$ and $R^{18}$, may be taken together to form a ring, i.e., an N-heterocycle. Preferred cyclic groups in such a case are five- and six-membered rings, typically aromatic rings.

In a fourth group of catalysts that have the structure of formula (I), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$-, —As(Ph)$_2$CH$_2$CH$_2$As(Ph$_2$)—, —P(Ph)$_2$CH$_2$CH$_2$C(CF$_3$)$_2$O—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$CH$_2$CH$_2$P(Ph)$_2$- and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N(CH$_3$)$_2$. Other preferred tridentate ligands are those in which any three of $X^1$, $X^2$, $L^1$, $L^2$, $L^3$, $R^1$, and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, $C_1$-$C_{20}$ alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to $O_2C(CH_2)_2P(Ph)(CH_2)_2P(Ph)(CH_2)_2CO_2$, phthalocyanines, and porphyrins.

Complexes wherein Y is coordinated to the metal are examples of a fifth group of catalysts, and are commonly called "Grubbs-Hoveyda" catalysts. Grubbs-Hoveyda metathesis-active metal carbene complexes may be described by the formula (VII)

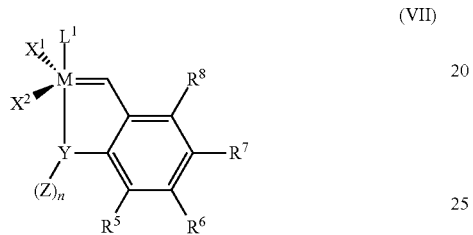

(VII)

wherein,

M is a Group 8 transition metal, particularly Ru or Os, or, more particularly, Ru;

$X^1$, $X^2$, and $L^1$ are as previously defined herein for the first and second groups of catalysts;

Y is a heteroatom selected from N, O, S, and P; preferably Y is O or N;

$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, borate, or -A-Fn, wherein "A" and Fn have been defined above; and any combination of Y, Z, $R^5$, $R^6$, $R^7$, and $R^8$ can be linked to form one or more cyclic groups;

n is 0, 1, or 2, such that n is 1 for the divalent heteroatoms O or S, and n is 2 for the trivalent heteroatoms N or P; and Z is a group selected from hydrogen, alkyl, aryl, functionalized alkyl, functionalized aryl where the functional group(s) may independently be one or more or the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl; and wherein any combination or combinations of $X^1$, $X^2$, $L^1$, Y, Z, $R^5$, $R^6$, $R^7$, and $R^8$ may be linked to a support. Additionally, $R^5$, $R^6$, $R^7$, $R^8$, and Z may independently be thioisocyanate, cyanato, or thiocyanato.

Examples of complexes comprising Grubbs-Hoveyda ligands suitable in the invention include:

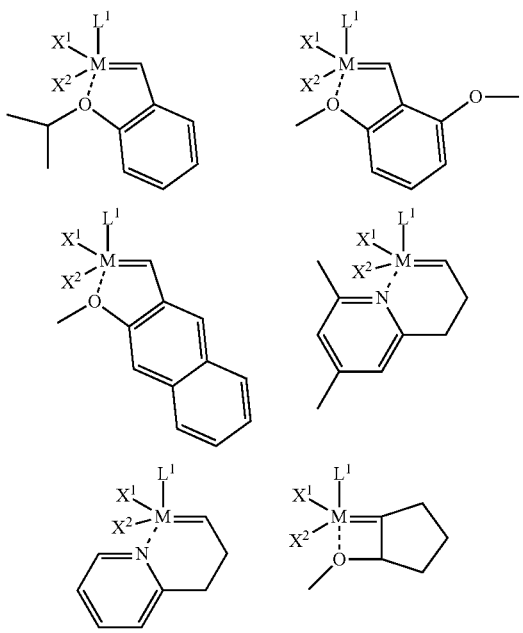

wherein, $L^1$, $X^1$, $X^2$, and M are as described for any of the other groups of catalysts. Suitable chelating carbenes and carbene precursors are further described by Pederson et al. (U.S. Pat. Nos. 7,026,495 and 6,620,955, the disclosures of both of which are incorporated herein by reference) and Hoveyda et al. (U.S. Pat. No. 6,921,735 and WO0214376, the disclosures of both of which are incorporated herein by reference).

Other useful complexes include structures wherein $L^2$ and $R^2$ according to formulae (I), (III), or (V) are linked, such as styrenic compounds that also include a functional group for attachment to a support. Examples in which the functional group is a trialkoxysilyl functionalized moiety include, but are not limited to, the following:

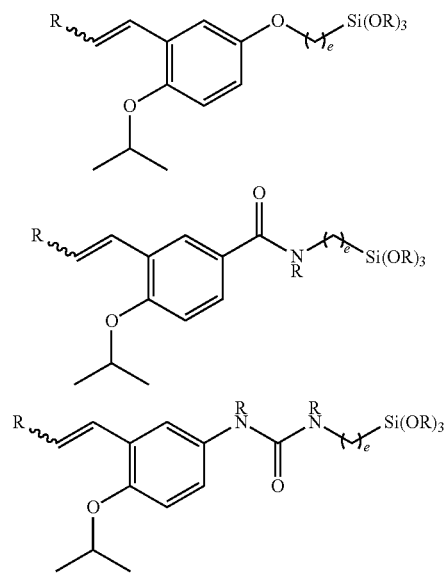

29
-continued

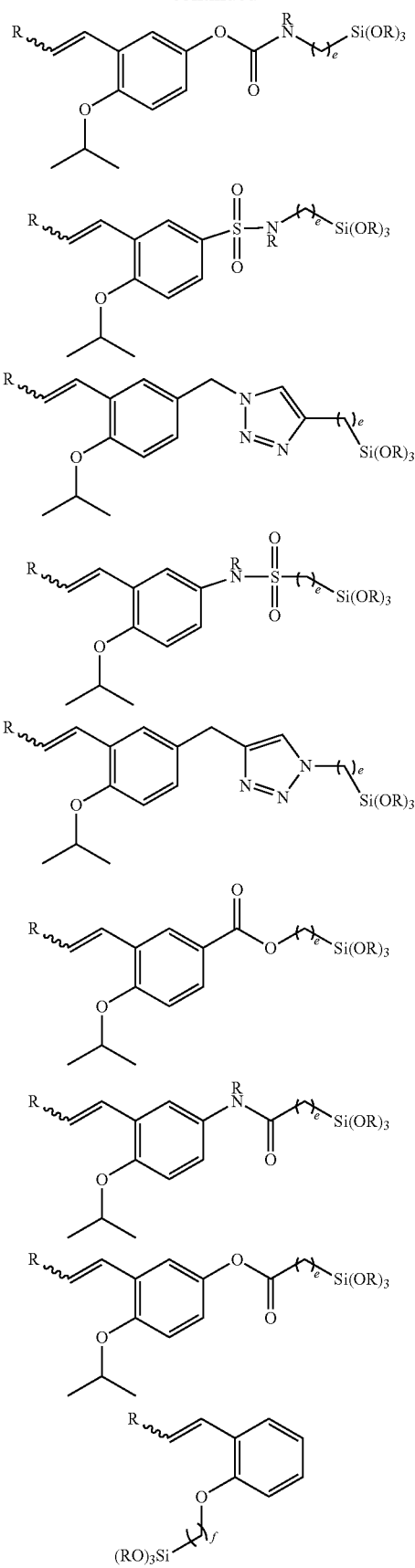

30
-continued

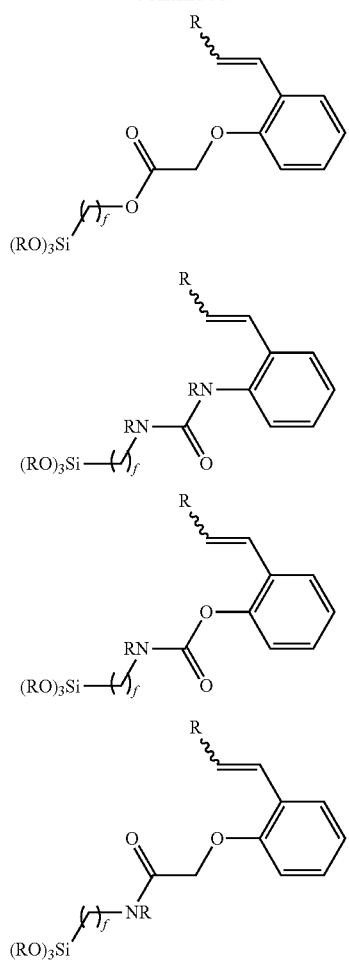

Further examples of complexes having linked ligands include those having linkages between a neutral NHC ligand and an anionic ligand, a neutral NHC ligand and an alkylidine ligand, a neutral NHC ligand and an L² ligand, a neutral NHC ligand and an L³ ligand, an anionic ligand and an alkylidine ligand, and any combination thereof. While the possible structures are too numerous to list herein, some suitable structures based on formula (III) include:

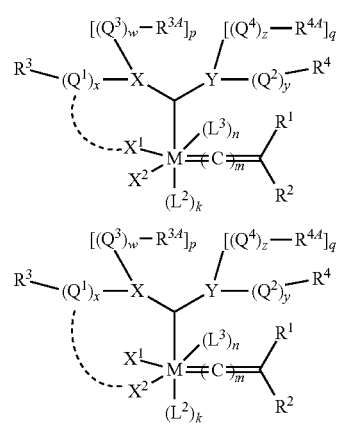

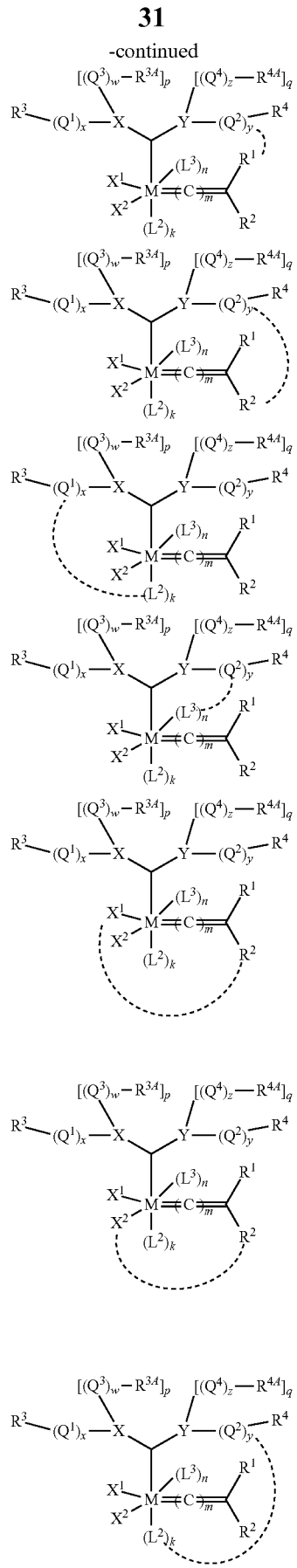

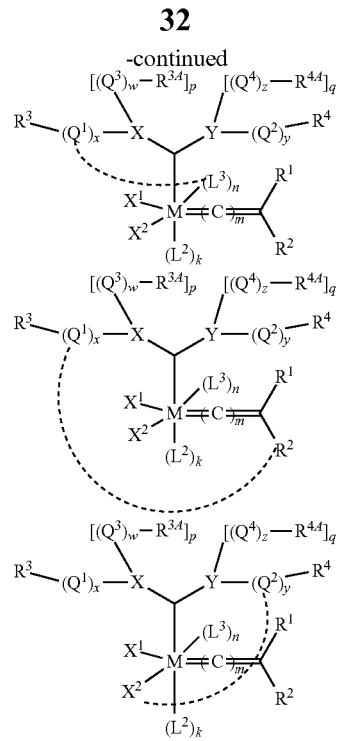

In addition to the catalysts that have the structure of formula (I), as described above, other transition metal carbene complexes include, but are not limited to:

neutral ruthenium or osmium metal carbene complexes containing metal centers that are formally in the +2 oxidation state, have an electron count of 16, are penta-coordinated, and are of the general formula (IX);

neutral ruthenium or osmium metal carbene complexes containing metal centers that are formally in the +2 oxidation state, have an electron count of 18, are hexa-coordinated, and are of the general formula (X);

cationic ruthenium or osmium metal carbene complexes containing metal centers that are formally in the +2 oxidation state, have an electron count of 14, are tetra-coordinated, and are of the general formula (XI); and cationic ruthenium or osmium metal carbene complexes containing metal centers that are formally in the +2 oxidation state, have an electron count of 14 or 16, are tetra-coordinated or penta-coordinated, respectively, and are of the general formula (XII)

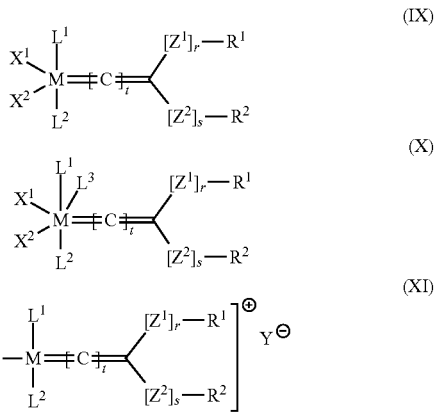

-continued

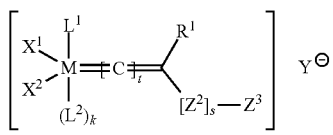
(XII)

wherein:

M, $X^1$, $X^2$, $L^1$, $L^2$, $L^3$, $R^1$, and $R^2$ are as defined for any of the previously defined four groups of catalysts;

r and s are independently zero or 1;

t is an integer in the range of zero to 5;

k is an integer in the range of zero to 1;

Y is any non-coordinating anion (e.g., a halide ion, $BF_4$—, etc.);

$Z^1$ and $Z^2$ are independently selected from —O—, —S—, —$NR^2$—, —$PR^2$—, —P(=O)$R^2$—, —P(O$R^2$)—P(=O)(O$R^2$)—, —C(=O)—, —C(=O)O—, —OC(=O)—, —OC(=O)O—, —S(=O)—, —S(=O)$_2$—, —, and an optionally substituted and/or optionally heteroatom-containing $C_1$-$C_{20}$ hydrocarbylene linkage;

$Z^3$ is any cationic moiety such as —P($R^2$)$_3$+ or —N($R^2$)$_3$+; and any two or more of $X^1$, $X^2$, $L^1$, $L^2$, $L^3$, $Z^1$, $Z^2$, $Z^3$, $R^1$, and $R^2$ may be taken together to form a cyclic group, e.g., a multidentate ligand, and wherein any one or more of $X^1$, $X^2$, $L^1$, $L^2$, $L^3$, $Z^1$, $Z^2$, $Z^3$, $R^1$, and $R^2$ may be attached to a support.

Additionally, another group of olefin metathesis catalysts that may be used in the invention disclosed herein, is a Group 8 transition metal complex having the structure of formula (XIII):

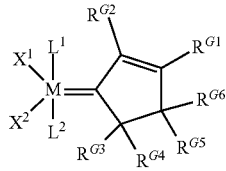
(XIII)

wherein M is a Group 8 transition metal, particularly ruthenium or osmium, or more particularly, ruthenium;

$X^1$, $X^2$, $L^1$ and $L^2$ are as defined for the first and second groups of catalysts defined above; and $R^{G1}$, $R^{G2}$, $R^{G3}$, $R^{G4}$, $R^{G5}$, and $R^{G6}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{G1}$, $R^{G2}$, $R^{G3}$, $R^{G4}$, $R^{G5}$, and $R^{G6}$ may be linked together to form a cyclic group, or any one or more of the $R^{G1}$, $R^{G2}$, $R^{G3}$, $R^{G4}$, $R^{G5}$, and $R^{G6}$ may be attached to a support.

Additionally, one preferred embodiment of the Group 8 transition metal complex of formula XIII is a Group 8 transition metal complex of formula (XIV):

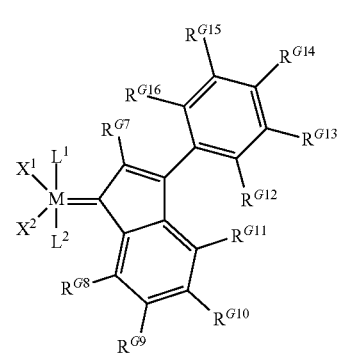
(XIV)

wherein M, $X^1$, $X^2$, $L^1$, $L^2$, are as defined above for Group 8 transition metal complex of formula XIII; and $R^{G7}$, $R^{G8}$, $R^{G9}$, $R^{G10}$, $R^{G11}$, $R^{G12}$, $R^{G13}$, $R^{G14}$, $R^{G15}$ and $R^{G16}$ are as defined above for $R^{G1}$, $R^{G2}$, $R^{G3}$, $R^{G4}$, $R^{G5}$, and $R^{G6}$ for Group 8 transition metal complex of formula XIII or any one or more of the $R^{G7}$, $R^{G8}$, $R^{G9}$, $R^{G10}$, $R^{G11}$, $R^{G12}$, $R^{G13}$, $R^{G14}$, $R^{G15}$ and $R^{G16}$ may be linked together to form a cyclic group, or any one or more of the $R^{G7}$, $R^{G8}$, $R^{G9}$, $R^{G10}$, $R^{G11}$, $R^{G12}$, $R^{G13}$, $R^{G14}$, $R^{G15}$ and $R^{G16}$ may be attached to a support.

Additionally, another preferred embodiment of the Group 8 transition metal complex of formula XIII is a Group 8 transition metal complex of formula (XV):

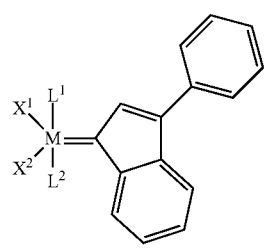
(XV)

wherein M, $X^1$, $X^2$, $L^1$, $L^2$, are as defined above for Group 8 transition metal complex of formula XIII.

Additionally, another group of olefin metathesis catalysts that may be used in the invention disclosed herein, is a Group 8 transition metal complex comprising a Schiff base ligand having the structure of formula (XVI):

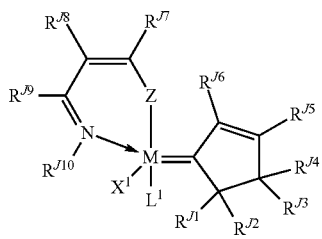

(XVI)

wherein M is a Group 8 transition metal, particularly ruthenium or osmium, or more particularly, ruthenium;

$X^1$, and $L^1$ are as defined for the first and second groups of catalysts defined above;

Z is selected from the group consisting of oxygen, sulfur, selenium, $NR^{J11}$, $PR^{J11}$, $AsR^{J11}$, and $SbR^{J11}$; and $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be linked together to form a cyclic group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be attached to a support.

Additionally, one preferred embodiment of the Group 8 transition metal complex of formula (XVI) is a Group 8 transition metal complex comprising a Schiff base ligand having the structure of formula (XVII):

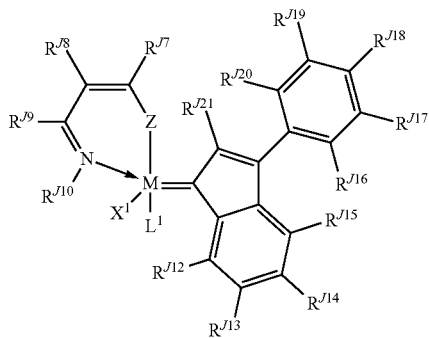

(XVII)

wherein M, $X^1$, $L^1$, Z, $R^{J7}$, $R^{J8}$, $R^{J9}$, $R^{J10}$, and $R^{J11}$ are as defined above for Group 8 transition metal complex of formula XVI; and $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ are as defined above for $R^{J1}$, $R^{J2}$, $R^{J3}$, $R^{J4}$, $R^{J5}$, and $R^{J6}$ for Group 8 transition metal complex of formula XVI, or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be linked together to form a cyclic group, or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be attached to a support.

Additionally, another preferred embodiment of the Group 8 transition metal complex of formula (XVI) is a Group 8 transition metal complex comprising a Schiff base ligand having the structure of formula (XVIII):

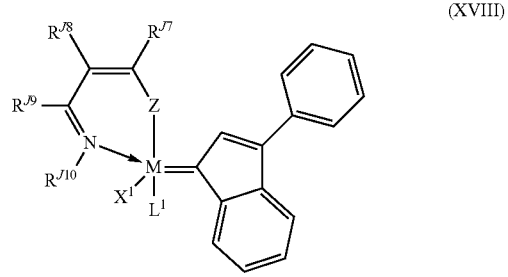

(XVIII)

wherein M, $X^1$, $L^1$, Z, $R^{J7}$, $R^{J8}$, $R^{J9}$, $R^{J10}$, and $R^{J11}$, are as defined above for Group 8 transition metal complex of formula (XVI).

Additionally, another group of olefin metathesis catalysts that may be used in the invention disclosed herein, is a Group 8 transition metal complex comprising a Schiff base ligand having the structure of formula (XIX):

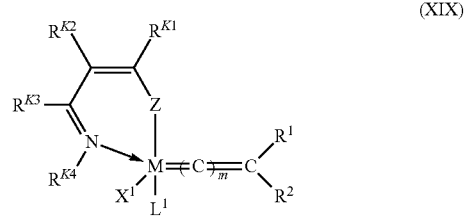

(XIX)

wherein M is a Group 8 transition metal, particularly ruthenium or osmium, or more particularly, ruthenium;

$X^1$, $L^1$, $R^1$, and $R^2$ are as defined for the first and second groups of catalysts defined above;

Z is selected from the group consisting of oxygen, sulfur, selenium, $NR^{K5}$, $PR^{K5}$, $AsR^{K5}$, and $SbR^{K5}$;

m is 0, 1, or 2; and $R^{K1}$, $R^{K2}$, $R^{K3}$, $R^{K4}$, and $R^{K5}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{K1}$, $R^{K2}$, $R^{K3}$, $R^{K4}$, and $R^{K5}$ may be linked together to form a cyclic group, or any one or more of the $R^{K1}$, $R^{K2}$, $R^{K3}$, $R^{K4}$, and $R^{K5}$ may be attached to a support.

In addition, catalysts of formulas (XVI) to (XIX) may be optionally contacted with an activating compound, where at least partial cleavage of a bond between the Group 8 transition metal and at least one Schiff base ligand occurs, wherein the activating compound is either a metal or silicon compound selected from the group consisting of copper (I) halides; zinc compounds of the formula $Zn(R^{Y1})_2$, wherein $R^{Y1}$ is halogen, $C_1$-$C_7$ alkyl or aryl; tin compounds represented by the formula $SnR^{Y2}R^{Y3}R^{Y4}R^{Y5}$ wherein each of $R^{Y2}$, $R^{Y3}$, $R^{Y4}$ and $R^{Y5}$ is independently selected from the group consisting of halogen, $C_1$-$C_{20}$ alkyl, $C_3$-$C_{10}$ cycloalkyl, aryl, benzyl and $C_2$-$C_7$ alkenyl; and silicon compounds represented by the formula $SiR^{Y6}R^{Y7}R^{Y8}R^{Y9}$ wherein each of $R^{Y6}$, $R^{Y7}$, $R^{Y8}$, $R^{Y9}$ is independently selected from the group consisting of hydrogen, halogen, $C_1$-$C_{20}$ alkyl, halo, $C_1$-$C_7$ alkyl, aryl, heteroaryl, and vinyl. In addition, catalysts of formulas (XVI) to (XIX) may be optionally contacted with an activating compound where at least partial cleavage of a bond between the Group 8 transition metal and at least one Schiff base ligand occurs, wherein the activating compound is an inorganic acid such as hydrogen iodide, hydrogen bromide, hydrogen chloride, hydrogen fluoride, sulfuric acid, nitric acid, iodic acid, periodic acid, perchloric acid, $HOClO$, $HOClO_2$ and $HOIO_3$. In addition, catalysts of formulas (XVI) to (XIX) may be optionally contacted with an activating compound where at least partial cleavage of a bond between the Group 8 transition metal and at least one Schiff base ligand occurs, wherein the activating compound is an organic acid such as sulfonic acids including but not limited to methanesulfonic acid, aminobenzenesulfonic acid, benzenesulfonic acid, napthalenesulfonic acid, sulfanilic acid and trifluoromethanesulfonic acid; monocarboxylic acids including but not limited to acetoacetic acid, barbituric acid, bromoacetic acid, bromobenzoic acid, chloroacetic acid, chlorobenzoic acid, chlorophenoxyacetic acid, chloropropionic acid, cis-cinnamic acid, cyanoacetic acid, cyanobutyric acid, cyanophenoxyacetic acid, cyanopropionic acid, dichloroacetic acid, dichloroacetylacetic acid, dihydroxybenzoic acid, dihydroxymalic acid, dihydroxytartaric acid, dinicotinic acid, diphenylacetic acid, fluorobenzoic acid, formic acid, furancarboxylic acid, furoic acid, glycolic acid, hippuric acid, iodoacetic acid, iodobenzoic acid, lactic acid, lutidinic acid, mandelic acid, α-naphtoic acid, nitrobenzoic acid, nitrophenylacetic acid, o-phenylbenzoic acid, thioacetic acid, thiophene-carboxylic acid, trichloroacetic acid, and trihydroxybenzoic acid; and other acidic substances such as but not limited to picric acid and uric acid.

In addition, other examples of catalysts that may be used with the present invention are located in the following disclosures, each of which is incorporated herein by reference, U.S. Pat. Nos. 7,687,635; 7,671,224; 6,284,852; 6,486,279; and 5,977,393; International Publication Number WO2010/037550; and U.S. patent application Ser. Nos. 12/303,615; 10/590,380; 11/465,651 (Publication No.: US 2007/0043188); and Ser. No. 11/465,651 (Publication No.: US 2008/0293905 Corrected Publication); and European Pat. Nos. EP1757613B1 and EP1577282B1.

Non-limiting examples of catalysts that may be used to prepare supported complexes and in the reactions disclosed herein include the following, some of which for convenience are identified throughout this disclosure by reference to their molecular weight:

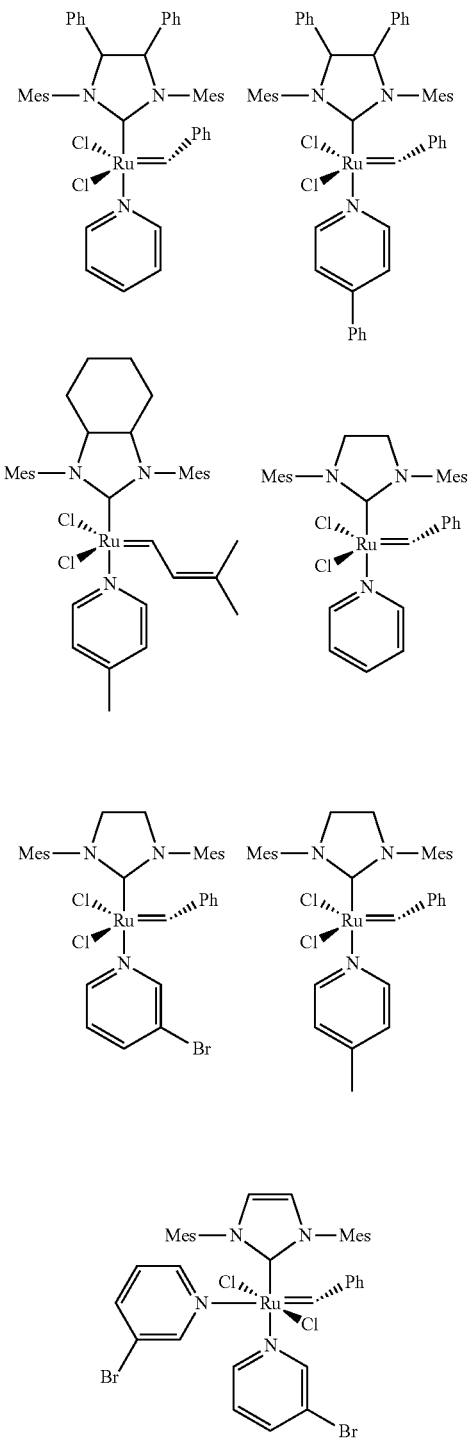

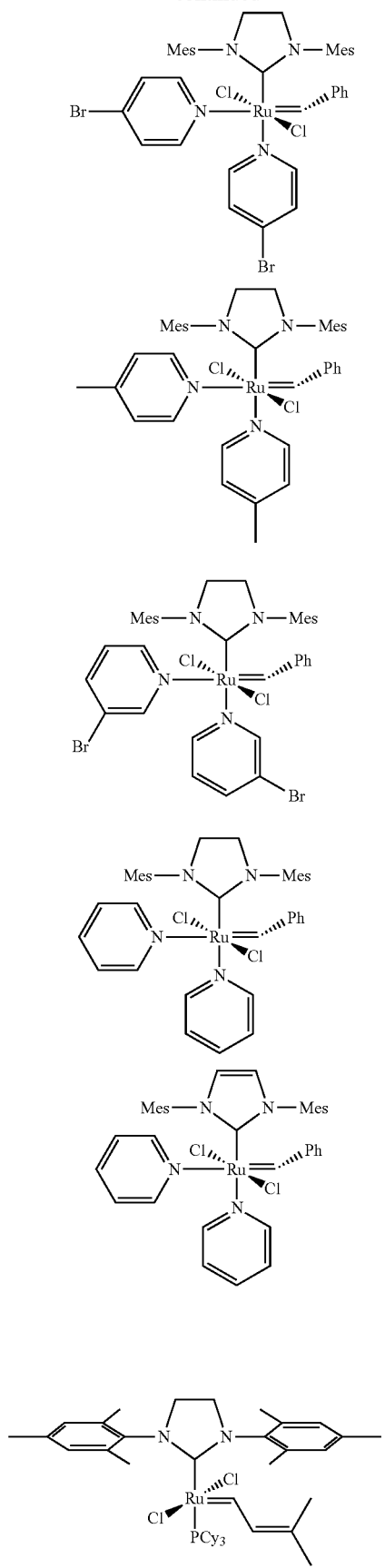
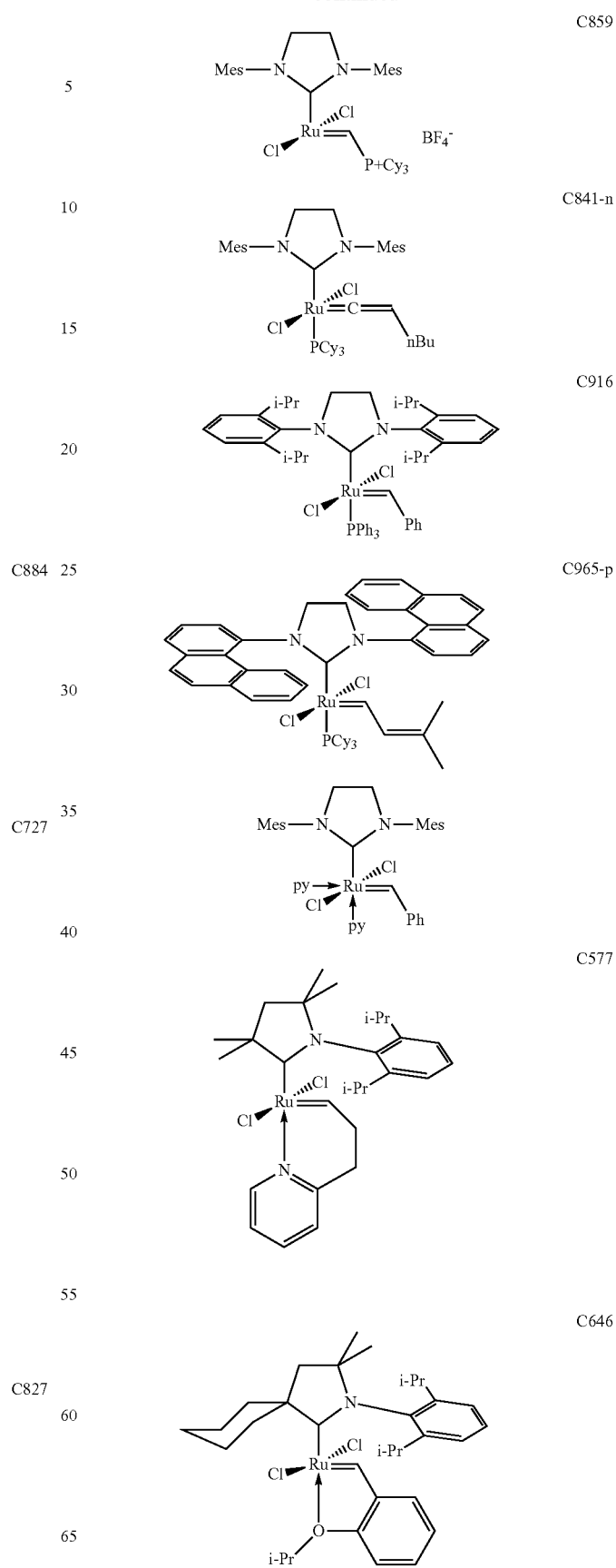

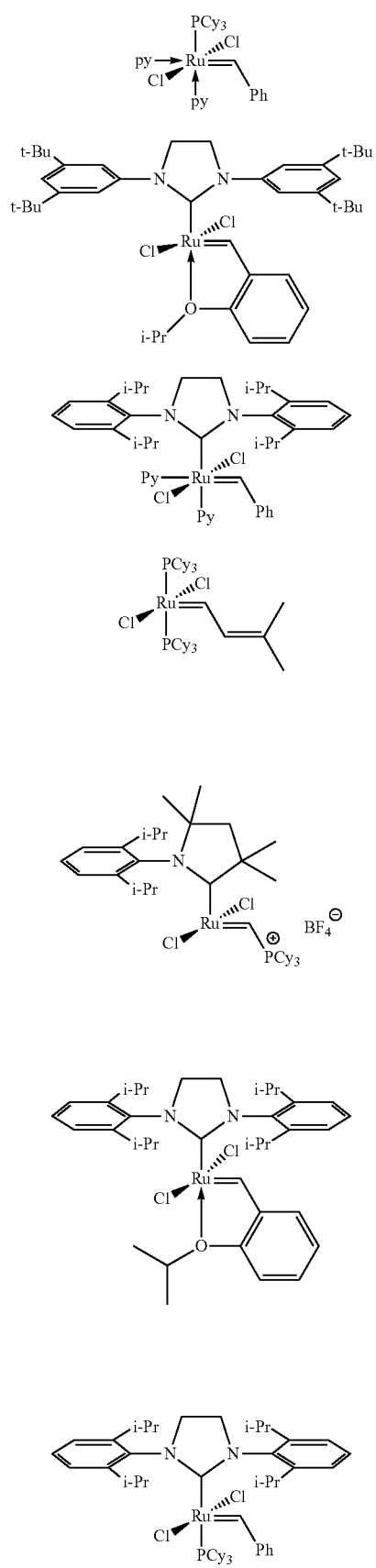

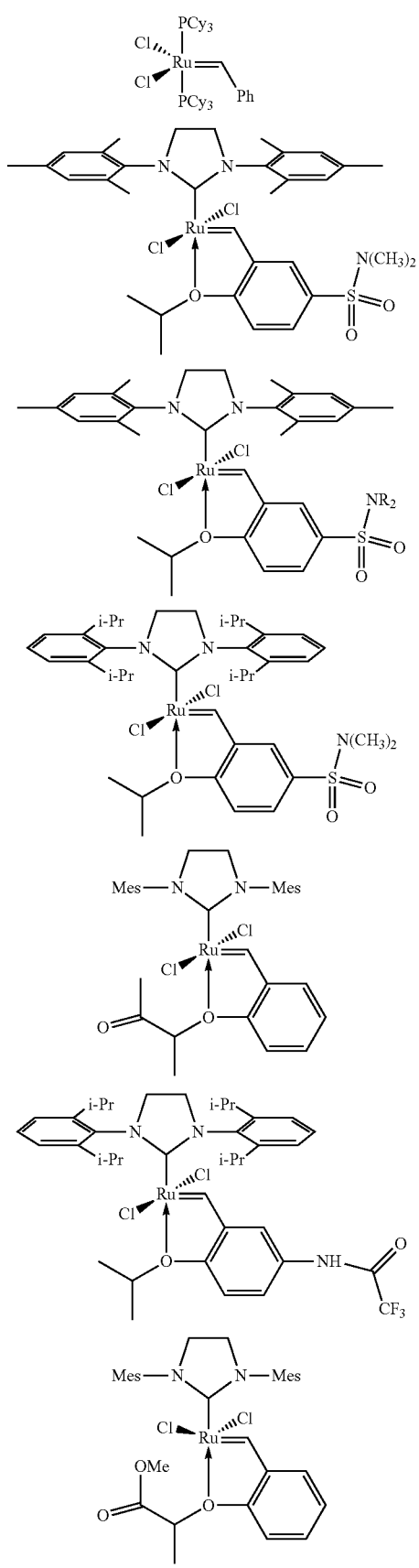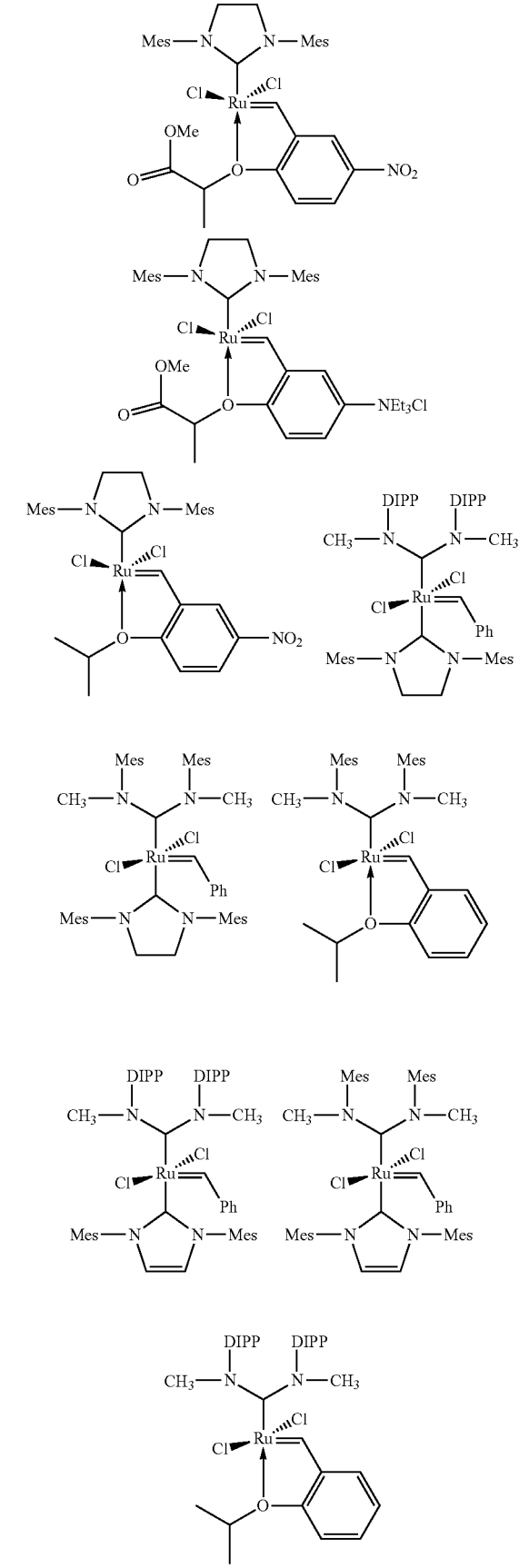

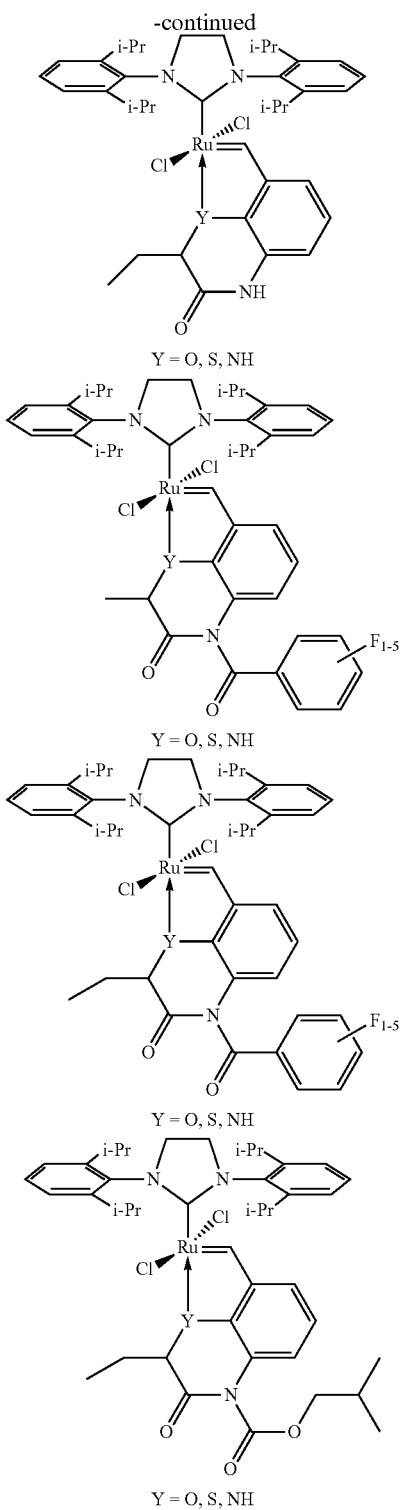

Y = O, S, NH

Y = O, S, NH

Y = O, S, NH

Y = O, S, NH

In the foregoing molecular structures and formulae, Ph represents phenyl, Cy represents cyclohexyl, Cp represents cyclopentyl, Me represents methyl, Bu represents n-butyl, t-Bu represents tert-butyl, i-Pr represents isopropyl, py represents pyridine (coordinated through the N atom), Mes represents mesityl (i.e., 2,4,6-trimethylphenyl), DiPP and DIPP represents 2,6-diisopropylphenyl, and MiPP represents 2-isopropylphenyl.

Further examples of catalysts useful to prepare supported complexes and in the reactions disclosed herein include the following: ruthenium (II) dichloro (3-methyl-2-butenylidene) bis(tricyclopentylphosphine) (C716); ruthenium (II) dichloro (3-methyl-2-butenylidene) bis(tricyclohexylphosphine) (C801); ruthenium (II) dichloro(phenylmethylene) bis(tricyclohexylphosphine) (C823); ruthenium (II) (1,3-bis-(2,4,6-trimethylphenyl)-2-imidazolidinylidene) dichloro (phenylmethylene) (triphenylphosphine) (C830); ruthenium (II) dichloro (phenylvinylidene) bis(tricyclohexylphosphine) (C835); ruthenium (II) dichloro (tricyclohexylphosphine) (o-isopropoxyphenylmethylene) (C601); ruthenium (II) (1,3-bis-(2,4,6-trimethylphenyl)-2-imidazolidinylidene) dichloro (phenylmethylene) bis(3-bromopyridine) (C884); [1,3-bis-(2,4,6-trimethylphenyl)-2-imidazolidinylidene]dichloro(o-isopropoxyphenylmethylene) ruthenium(II) (C627); [1,3-bis-(2,4,6-trimethylphenyl)-2-imidazolidinylidene] dichloro (benzylidene) (triphenylphosphine) ruthenium(II) (C831); [1,3-bis-(2,4,6-trimethylphenyl)-2-imidazolidinylidene] dichloro (benzylidene)(methyldiphenylphosphine)ruthenium(II) (C769); [1,3-bis-(2,4,6-trimethylphenyl)-2-imidazolidinylidene]dichloro(benzylidene)(tricyclohexylphosphine)ruthenium(II) (C848); [1,3-bis-(2,4,6-trimethylphenyl)-2-imidazolidinylidene] dichloro(benzylidene) (diethylphenylphosphine) ruthenium(II) (C735); [1,3-bis-(2,4,6-trimethylphenyl)-2-imidazolidinylidene]dichloro(benzylidene)(tri-n-butylphosphine)ruthenium(II) (C771); [1,3-bis-(2,4,6-trimethylphenyl)-2-imidazolidinylidene]dichloro(3-methyl-2-butenylidene)(triphenylphosphine)ruthenium(II) (C809); [1,3-bis-(2,4,6-trimethylphenyl)-2-imidazolidinylidene]dichloro(3-methyl-2-butenylidene)(methyldiphenylphosphine)ruthenium(II) (C747); [1,3-bis-(2,4,6-trimethylphenyl)-2-imidazolidinylidene]dichloro(3-methyl-2-butenylidene) (tricyclohexylphosphine) ruthenium(II) (C827); [1,3-bis-(2,4,6-trimethylphenyl)-2-imidazolidinylidene]dichloro(3-methyl-2-butenylidene)(diethylphenylphosphine)ruthenium(II) (C713); [1,3-bis-(2,4,6-trimethylphenyl)-2-imidazolidinylidene] dichloro (3-methyl-2-butenylidene) (tri-n-butylphosphine)ruthenium(II) (C749); [1,3-bis-(2,4,6-trimethylphenyl)-2-imidazolidinylidene]dichloro(phenylindenylidene)(tripenylphosphine)ruthenium (II) (C931); [1,3-bis-(2,4,6-trimethylphenyl)-2-imidazolidinylidene] dichloro (phenylindenylidene) (methylphenylphosphine) ruthenium(II) (C869); [1,3-bis-(2,4,6-trimethylphenyl)-2-imidazolidinylidene] dichloro (phenylindenylidene) (tricyclohexylphosphine) ruthenium(II) (C949); [1,3-bis-(2,4,6-trimethylphenyl)-2-imidazolidinylidene]dichloro(phenylindenylidene)(diethylphenylphosphine)ruthenium(II) (C835); and [1,3-bis-(2,4,6-trimethylphenyl)-2-imidazolidinylidene]dichloro (phenylindenylidene)(tri-n-butylphosphine)ruthenium(II) (C871).

Still further catalysts useful in ROMP reactions, and/or in other metathesis reactions, such as ring-closing metathesis, cross metathesis, ring-opening cross metathesis, self-metathesis, ethenolysis, alkenolysis, acyclic diene metathesis polymerization, and combinations thereof, include the following structures:

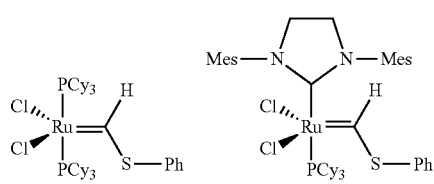

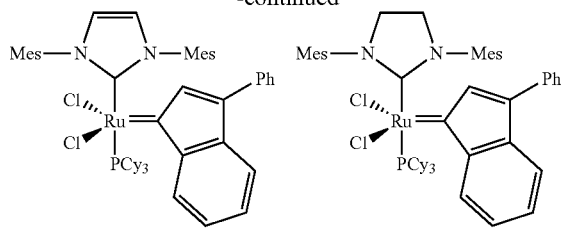
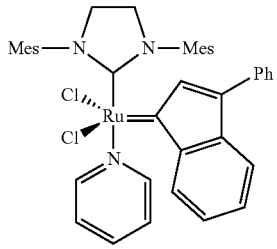
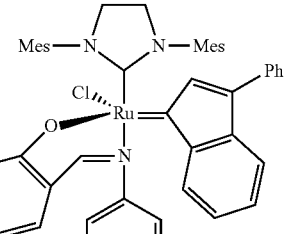
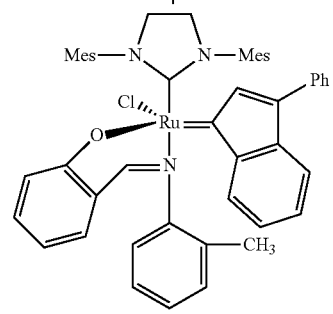
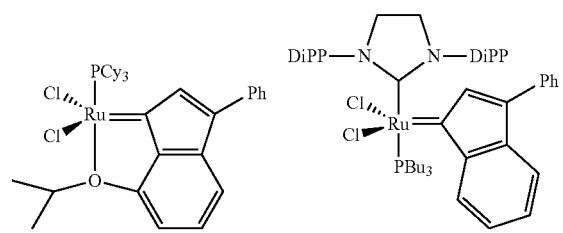
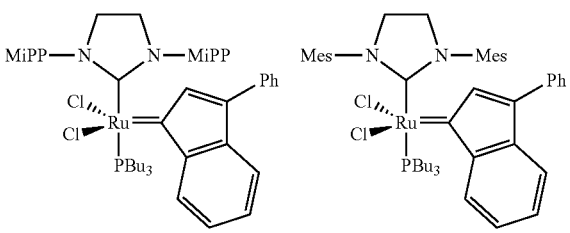

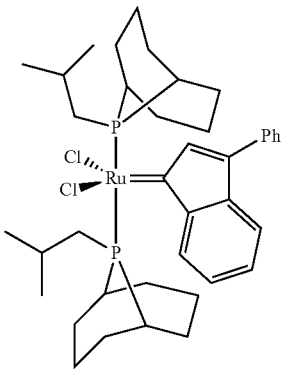
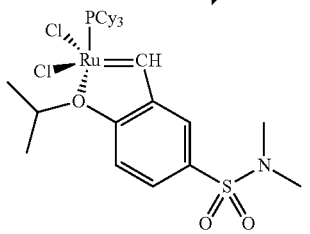
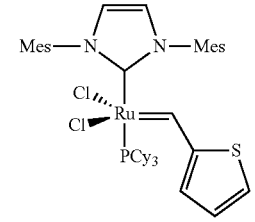
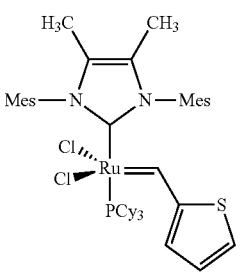
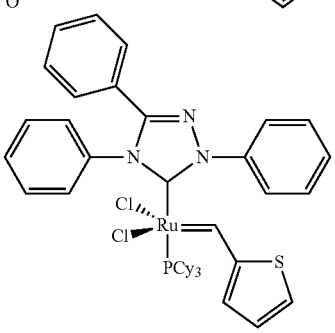

In general, the transition metal complexes used as catalysts herein can be prepared by several different methods, such as those described by Schwab et al. (1996) *J Am. Chem. Soc.* 118:100-110, Scholl et al. (1999) *Org. Lett.* 6:953-956, Sanford et al. (2001) *J. Am. Chem. Soc.* 123:749-750, U.S. Pat. Nos. 5,312,940, and 5,342,909, the disclosures of each of which are incorporated herein by reference. Also see U.S. Pat. Pub. No. 2003/0055262 to Grubbs et al., WO 02/079208, and U.S. Pat. No. 6,613,910 to Grubbs et al., the disclosures of each of which are incorporated herein by reference. Preferred synthetic methods are described in WO 03/11455A1 to Grubbs et al., the disclosure of which is incorporated herein by reference.

Preferred olefin metathesis catalysts are Group 8 transition metal complexes having the structure of formula (I) commonly called "First Generation Grubbs" catalysts, formula (III) commonly called "Second Generation Grubbs" catalysts, or formula (VII) commonly called "Grubbs-Hoveyda" catalysts.

More preferred olefin metathesis catalysts have the structure of formula (I)

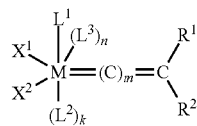
(I)

in which:
M is a Group 8 transition metal;
L, L², and L³ are neutral electron donor ligands;
n is 0 or 1;
m is 0, 1, or 2;
k is 0 or 1;
$X^1$ and $X^2$ are anionic ligands;
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support;
and formula (VII)

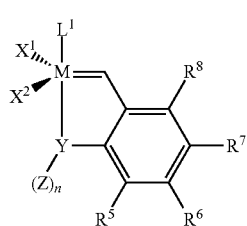
(VII)

wherein,
M is a Group 8 transition metal;
$L^1$ is a neutral electron donor ligand;
$X^1$ and $X^2$ are anionic ligands;
Y is a heteroatom selected from O or N;
$R^5$, $R^6$, $R^7$, and $R^8$ are independently selected from hydrogen, hydrocarbyl, substituted hydrocarbyl, heteroatom-containing hydrocarbyl, substituted heteroatom-containing hydrocarbyl, and functional groups;
n is 0, 1, or 2; and
Z is selected from hydrogen, hydrocarbyl, substituted hydrocarbyl, heteroatom-containing hydrocarbyl, substituted heteroatom-containing hydrocarbyl, and functional groups, wherein any combination of Y, Z, $R^5$, $R^6$, $R^7$, and $R^8$ can be linked to form one or more cyclic groups, and further wherein any combination of $X^1$, $X^2$, $L^1$, Y, Z, $R^5$, $R^6$, $R^7$, and $R^8$ may be attached to a support.

Most preferred olefin metathesis catalysts have the structure of formula (I)

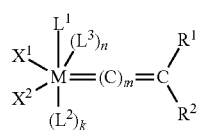
(I)

in which:
M is ruthenium;
n is 0;
m is 0;
k is 1;
$L^1$ and $L^2$ are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
$X^1$ and $X^2$ are chloride;
$R^1$ is hydrogen and $R^2$ is phenyl or —CH=C(CH₃)₂ or thienyl; or $R^1$ and $R^2$ are taken together to form 3-phenyl-1H-indene;
and formula (VII)

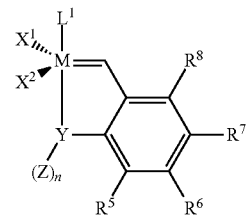
(VII)

wherein,
M is ruthenium;
$L^1$ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene;
$X^1$ and $X^2$ are chloride;
Y is oxygen;
$R^5$, $R^6$, $R^7$, and $R^8$ are each hydrogen;
n is 1; and
Z is isopropyl.

Suitable supports for any of the catalysts described herein may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect. Indirect covalent linkages are typically, though not necessarily, through a functional group on a support surface. Ionic attachments are also suitable, including combinations of one or more anionic groups on the metal complexes coupled with supports containing cationic groups, or combinations of one or more cationic groups on the metal complexes coupled with supports containing anionic groups.

When utilized, suitable supports may be selected from silicas, silicates, aluminas, aluminum oxides, silica-aluminas, aluminosilicates, zeolites, titanias, titanium dioxide, magnetite, magnesium oxides, boron oxides, clays, zirconias, zirconium dioxide, carbon, polymers, cellulose, cellulosic polymers amylose, amylosic polymers, or a combination thereof. The support preferably comprises silica, a silicate, or a combination thereof.

In certain embodiments, it is also possible to use a support that has been treated to include functional groups, inert moieties, and/or excess ligands. Any of the functional groups described herein are suitable for incorporation on the support, and may be generally accomplished through techniques known in the art. Inert moieties may also be incorporated on the support to generally reduce the available attachment sites on the support, e.g., in order to control the placement, or amount, of a complex linked to the support.

The metathesis catalysts that are described infra may be utilized in olefin metathesis reactions according to techniques known in the art. The catalyst is typically added to the resin composition as a solid, a solution, or as a suspension. When the catalyst is added to the resin composition as a suspension, the catalyst is suspended in a dispersing carrier such as mineral oil, paraffin oil, soybean oil, tri-isopropyl-benzene, or any hydrophobic liquid which has a sufficiently high viscosity so as to permit effective dispersion of the catalyst, and which is sufficiently inert and which has a sufficiently high boiling point so that is does not act as a low-boiling impurity in the olefin metathesis reaction. It will be appreciated that the amount of catalyst that is used (i.e., the "catalyst loading") in the reaction is dependent upon a variety of factors such as the identity of the reactants and the reaction conditions that are employed. It is therefore understood that catalyst loading may be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of an olefinic substrate.

The catalyst will generally be present in an amount that ranges from a low of about 0.00001 mol %, 0.0001 mol %, or 0.0005 mol %, to a high of about 0.001 mol %, 0.0015 mol %, 0.0025 mol %, 0.005 mol %, 0.01 mol %, 0.02 mol %, 0.05 mol %, 0.1 mol %, 0.25 mol %, 0.50 mol %, 0.75 mol %, 1.0 mol %, 1.5 mol %, 2.0 mol %, 3.0 mol %, 4.0 mol %, or 5.0 mol % relative to the olefinic substrate.

When expressed as the molar ratio of monomer to catalyst, the catalyst (the "monomer to catalyst ratio"), loading will generally be present in an amount that ranges from a low of about 10,000,000:1, 1,000,000:1, or 200,00:1, to a high of about 100,000:1 66,667:1, 40,000:1, 20,000:1, 10,000:1, 5,000:1, or 1,000:1.

Supported olefin metathesis catalysts for use in the present invention are disclosed in PCT Int'l Pat. Appl. International Publication Number WO 2011/069134, the contents of which is incorporated herein by reference. Examples of supported olefin metathesis catalysts for use in the present invention are of the formula (XX):

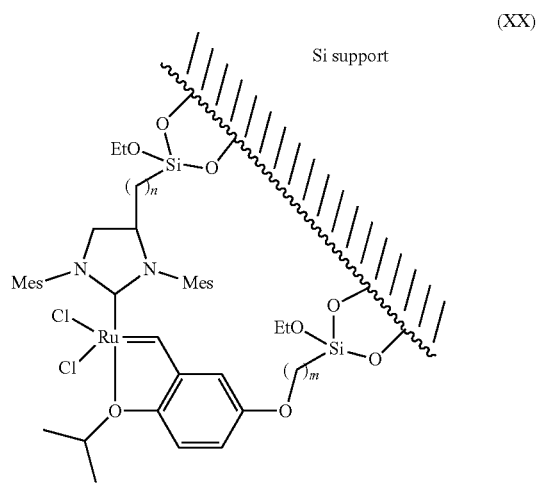

where n is 3 and m is 11, or n is 11 and m is 3, or n is 11 and m is 6. Further examples of supported olefin metathesis catalysts for use in the present invention are of the formula (XX), where n is 3 and m is 11. Further examples of supported olefin metathesis catalysts for use in the present invention are of the formula (XX), where n is 11 and m is 3. Further examples of supported olefin metathesis catalysts for use in the present invention are of the formula (XX), where n is 11 and m is 6.

Olefin Monomers

An example of an olefin monomer for use in the present invention may be represented by the structure of formula (A*):

where $R^{41*}$ is selected from H, OH, $NH_2$, $CH_2OH$, $C(CH_3)_3$, or $Si(CH_3)_3$.

In another embodiment, an olefin monomer for use in the present invention may be represented by the structure of formula (A*), where $R^{41*}$ is selected from H or OH. In another embodiment, an olefin monomer for use in the present invention may be represented by the structure of formula (A*), where $R^{41*}$ is H. In another embodiment, an olefin monomer for use in the present invention may be represented by the structure of formula (A*), where $R^{41*}$ is OH. In another embodiment, an olefin monomer for use in the present invention may be represented by the structure of formula (A*), where $R^{41*}$ is selected from OH, $NH_2$, $CH_2OH$. In another embodiment, an olefin monomer for use in the present invention may be represented by the structure of formula (A*), where $R^{41*}$ is selected from OH or $CH_2OH$. In another embodiment, an olefin monomer for use in the present invention may be represented by the structure of formula (A*), where $R^{41*}$ is selected from $C(CH_3)_3$ or $Si(CH_3)_3$.

An example of an olefin monomer for use in the present invention may be represented by the structure of formula (B*):

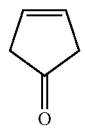

(B*)

An example of an olefin monomer for use in the present invention may be represented by the structure of formula (C*):

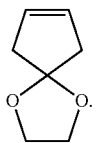

(C*)

An example of an olefin monomer for use in the present invention may be represented by the structure of formula (D*):

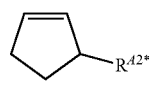

(D*)

where $R^{42*}$ is selected from H, OH, NH$_2$, CH$_2$OH, C(CH$_3$)$_3$, or Si(CH$_3$)$_3$.

In another embodiment, an olefin monomer for use in the present invention may be represented by the structure of formula (D*), where $R^{42*}$ is selected from H, C(CH$_3$)$_3$, or Si(CH$_3$)$_3$. In another embodiment, an olefin monomer for use in the present invention may be represented by the structure of formula (D*), where $R^{42*}$ is H. In another embodiment, an olefin monomer for use in the present invention may be represented by the structure of formula (D*), where $R^{42*}$ is selected from OH, NH$_2$, CH$_2$OH. In another embodiment, an olefin monomer for use in the present invention may be represented by the structure of formula (D*), where $R^{42*}$ is selected from OH or CH$_2$OH. In another embodiment, an olefin monomer for use in the present invention may be represented by the structure of formula (D*), where $R^{42*}$ is CH$_2$OH.

An example of an olefin monomer for use in the present invention may be represented by the structure of formula (E*):

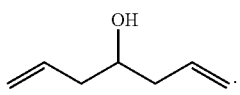

(E*)

Linear and Cyclic Polymers

For example, linear polymers of the invention (i.e., linear olefinic polymers and hydrogenated linear polymers, including homopolymers and copolymers) may have molecular weights in the range of 0.4 kDa to 500 kDa; 0.4 kDa to 400 kDa; 0.4 kDa to 300 kDa; 0.4 kDa to 200 kDa; 0.4 kDa to 100 kDa; 0.4 kDa to 75 kDa; 0.4 kDa to 50 kDa; 0.4 kDa to 25 kDa; 0.4 kDa to 10 kDa; 0.4 kDa to 5 kDa; 0.4 kDa to 2.5 kDa; 0.4 kDa to 1.0 kDa.

For example, linear polymers of the invention (i.e., linear olefinic polymers and hydrogenated linear polymers, including homopolymers and copolymers) may have molecular weights in the range of 0.3 kDa to 500 kDa; 0.3 kDa to 400 kDa; 0.3 kDa to 300 kDa; 0.3 kDa to 200 kDa; 0.3 kDa to 100 kDa; 0.3 kDa to 75 kDa; 0.3 kDa to 50 kDa; 0.3 kDa to 25 kDa; 0.3 kDa to 10 kDa; 0.3 kDa to 5 kDa; 0.3 kDa to 2.5 kDa; 0.3 kDa to 1.0 kDa.

For example, cyclic polymers of the invention may have molecular weights in the range of 0.13 kDa to 10 kDa; 0.13 kDa to 9 kDa; 0.13 kDa to 8 kDa; 0.13 kDa to 7 kDa; 0.13 kDa to 6 kDa; 0.13 kDa to 5 kDa; 0.13 kDa to 4 kDa; 0.13 kDa to 3 kDa; 0.13 kDa to 2 kDa; 0.13 kDa to 1 kDa; 0.13 kDa to 0.8 kDa; 0.13 kDa to 0.6 kDa.

For example, cyclic polymers of the invention may have molecular weights in the range of 0.16 kDa to 10 kDa; 0.16 kDa to 9 kDa; 0.16 kDa to 8 kDa; 0.16 kDa to 7 kDa; 0.16 kDa to 6 kDa; 0.16 kDa to 5 kDa; 0.16 kDa to 4 kDa; 0.16 kDa to 3 kDa; 0.16 kDa to 2 kDa; 0.16 kDa to 1 kDa; 0.16 kDa to 0.8 kDa; 0.16 kDa to 0.6 kDa.

Embodiments

In one embodiment, the invention provides a composition comprising, a first olefin monomer and an olefin metathesis catalyst.

In another embodiment, the invention provides a composition comprising, a first olefin monomer and an olefin metathesis catalyst, wherein the first olefin monomer is selected from the formula (A*):

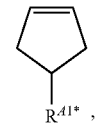

where $R^{41*}$ is selected from H, OH, NH$_2$, CH$_2$OH, C(CH$_3$)$_3$, or Si(CH$_3$)$_3$ or the formula (E*):

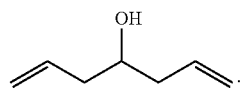

In another embodiment, the invention provides a composition comprising, a first olefin monomer and an olefin metathesis catalyst, wherein the first olefin monomer is of the formula (A*):

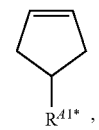

where $R^{41*}$ is selected from H, OH, NH$_2$, CH$_2$OH, C(CH$_3$)$_3$, or Si(CH$_3$)$_3$.

In another embodiment, the invention provides a composition comprising, a first olefin monomer and an olefin metathesis catalyst, wherein the first olefin monomer is of the formula (E*):

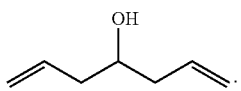

In another embodiment, the invention provides a composition comprising, a first olefin monomer and an olefin metathesis catalyst, wherein the first olefin monomer is of the formula (D*):

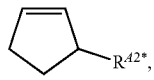

where $R^{A2*}$ is selected from H, OH, $NH_2$, $CH_2OH$, $C(CH_3)_3$, or $Si(CH_3)_3$.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the first olefin monomer is selected from the formula (A*):

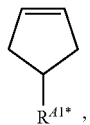

where $R^{A1*}$ is selected from H, OH, $NH_2$, $CH_2OH$, $C(CH_3)_3$, or $Si(CH_3)_3$ or the formula (E*):

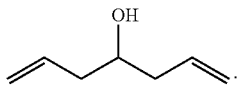

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the first olefin monomer is of the formula (A*):

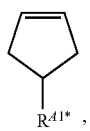

where $R^{A1*}$ is selected from H, OH, $NH_2$, $CH_2OH$, $C(CH_3)_3$, or $Si(CH_3)_3$.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the first olefin monomer is of the formula (E*):

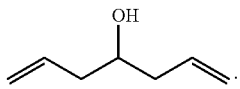

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the first olefin monomer is of the formula (D*):

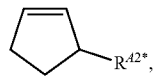

where $R^{A2*}$ is selected from H, OH, $NH_2$, $CH_2OH$, $C(CH_3)_3$, or $Si(CH_3)_3$.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the first olefin monomer is selected from the formula (A*):

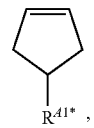

where $R^{A1*}$ is selected from H, OH, $NH_2$, $CH_2OH$, $C(CH_3)_3$, or $Si(CH_3)_3$ or the formula (E*):

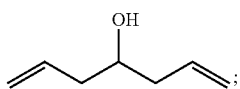

and subjecting the linear olefinic polymer to conditions effective to promote hydrogenation of the linear olefinic polymer to form a hydrogenated linear polymer.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the first olefin monomer is of the formula (A*):

where $R^{41*}$ is selected from H, OH, NH$_2$, CH$_2$OH, C(CH$_3$)$_3$; and subjecting the linear olefinic polymer to conditions effective to promote hydrogenation of the linear olefinic polymer to form a hydrogenated linear polymer, wherein the hydrogenated linear polymer has the structure:

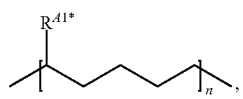

where $R^{41*}$ is selected from H, OH, NH$_2$, CH$_2$OH, C(CH$_3$)$_3$, or Si(CH$_3$)$_3$; and n is an integer such that the linear olefinic polymer has a molecular weight in the range of 0.3 kDa to 500 kDa.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the first olefin monomer is of the formula (A*):

where $R^{41*}$ is selected from H, OH, NH$_2$, CH$_2$OH, C(CH$_3$)$_3$, or Si(CH$_3$)$_3$; and subjecting the linear olefinic polymer to conditions effective to promote hydrogenation of the linear olefinic polymer to form a hydrogenated linear polymer.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the first olefin monomer is of the formula (E*):

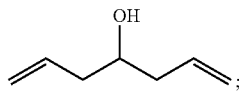

and subjecting the linear olefinic polymer to conditions effective to promote hydrogenation of the linear olefinic polymer to form a hydrogenated linear polymer.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the first olefin monomer is of the formula (E*):

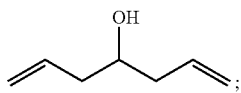

and subjecting the linear olefinic polymer to conditions effective to promote hydrogenation of the linear olefinic polymer to form a hydrogenated linear polymer, wherein the hydrogenated linear polymer has the structure:

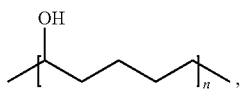

and n is an integer such that the linear olefinic polymer has a molecular weight in the range of 0.4 kDa to 500 kDa.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the first olefin monomer is selected from the formula (A*):

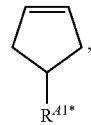

where $R^{41*}$ is selected from H, OH, NH$_2$, CH$_2$OH, C(CH$_3$)$_3$, or Si(CH$_3$)$_3$ or the formula (E*):

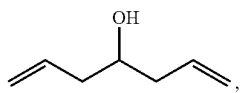

where the first olefin metathesis reaction is selected from a ROMP reaction or an ADMET polymerization reaction.

In another embodiment, the invention provides a method for making a linear olefinic polymer comprising, contacting a first olefin monomer and a second olefin monomer with an olefin metathesis catalyst; and subjecting the first olefin monomer and the second olefin monomer and the olefin metathesis catalyst to conditions effective to promote a first olefin metathesis reaction and a second olefin metathesis reaction, wherein the first olefin monomer is of the formula (A*):

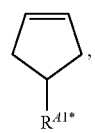

where $R^{41*}$ is selected from H, OH, NH$_2$, CH$_2$OH, C(CH$_3$)$_3$, or Si(CH$_3$)$_3$ and the second olefin monomer is of the formula (E*):

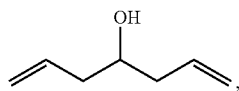

where the first olefin metathesis reaction is selected from a ROMP reaction or an ADMET polymerization reaction, where the second olefin metathesis reaction is selected from a ROMP reaction or an ADMET polymerization reaction; and the second olefin metathesis reaction is different than the first olefin metathesis reaction.

In another embodiment, the invention provides a method for making a linear olefinic polymer comprising, contacting a first olefin monomer and a second olefin monomer with an olefin metathesis catalyst; and subjecting the first olefin monomer and the second olefin monomer and the olefin metathesis catalyst to conditions effective to promote a first olefin metathesis reaction, wherein the first olefin monomer and the second olefin monomer are of the formula (A*):

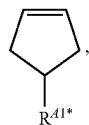

where $R^{A1*}$ is selected from H, OH, $NH_2$, $CH_2OH$, $C(CH_3)_3$, or $Si(CH_3)_3$ and the second olefin monomer is of the formula (E*): where the first olefin metathesis reaction is selected from a ROMP reaction, where the first olefin monomer and the second olefin monomer are the same or different.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the linear olefinic polymer comprises repeat units of the structure:

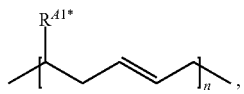

where $R^{A1*}$ is selected from H, OH, $NH_2$, $CH_2OH$, $C(CH_3)_3$, or $Si(CH_3)_3$; and n=12 to 30.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction, wherein the linear olefinic polymer comprises repeat units of the structure:

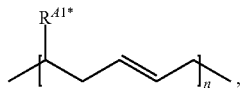

where $R^{A1*}$ is selected from H, OH, $NH_2$, $CH_2OH$, $C(CH_3)_3$, or $Si(CH_3)_3$; and n is an integer such that the linear olefinic polymer has a molecular weight in the range of 0.4 kDa to 500 kDa.

In another embodiment, the invention provides a method for making a linear olefinic polymer comprising, contacting a first olefin monomer with an olefin metathesis catalyst; and subjecting the first olefin monomer and the olefin metathesis catalyst to conditions effective to promote a first olefin metathesis reaction. wherein the first olefin monomer is of the formula (A*):

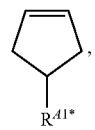

where $R^{A1*}$ is selected from H, OH, $NH_2$, $CH_2OH$, $C(CH_3)_3$, or $Si(CH_3)_3$, wherein the linear olefinic polymer comprises repeat units of the structure:

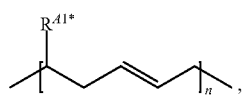

where $R^{A1*}$ is selected from H, OH, $NH_2$, $CH_2OH$, $C(CH_3)_3$, or $Si(CH_3)_3$; and n is an integer such that the linear olefinic polymer has a molecular weight in the range of 0.4 kDa to 500 kDa.

In another embodiment, the invention provides a method for making a cyclic olefinic polymer comprising, contacting an olefin monomer with a silica supported olefin metathesis catalyst; and subjecting the olefin monomer and the silica supported olefin metathesis catalyst to conditions effective to promote an olefin metathesis reaction.

In another embodiment, the invention provides a method for making a cyclic olefinic polymer comprising, contacting an olefin monomer with a silica supported olefin metathesis catalyst; and subjecting the olefin monomer and the silica supported olefin metathesis catalyst to conditions effective to promote an olefin metathesis reaction, wherein the silica supported olefin metathesis catalyst is of the formula (XX):

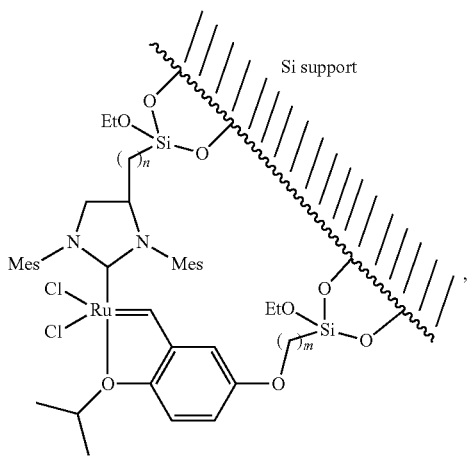

where n is 3 and m is 11, or n is 11 and m is 3, or n is 11 and m is 6.

In another embodiment, the invention provides a method for making a cyclic olefinic polymer comprising, contacting an olefin monomer with a silica supported olefin metathesis catalyst; and subjecting the olefin monomer and the silica supported olefin metathesis catalyst to conditions effective to promote an olefin metathesis reaction, wherein the silica supported olefin metathesis catalyst is of the formula (XX):

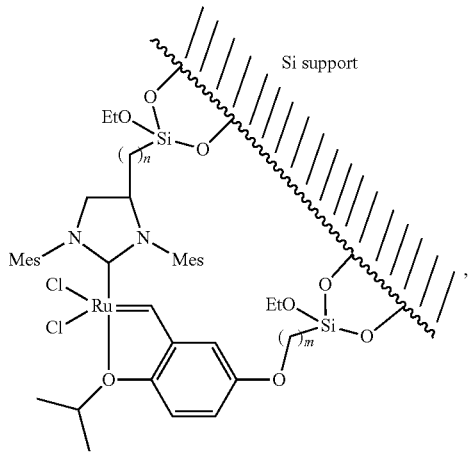

where n is 3 and m is 11.

In another embodiment, the invention provides a method for making a cyclic olefinic polymer comprising, contacting an olefin monomer with a silica supported olefin metathesis catalyst; and subjecting the olefin monomer and the silica supported olefin metathesis catalyst to conditions effective to promote an olefin metathesis reaction, wherein the silica supported olefin metathesis catalyst is of the formula (XX):

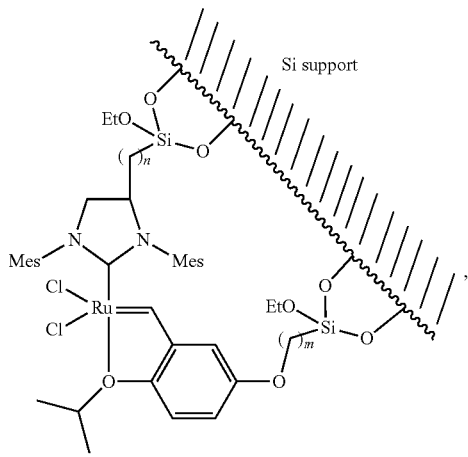

where n is 11 and m is 3.

In another embodiment, the invention provides a method for making a cyclic olefinic polymer comprising, contacting an olefin monomer with a silica supported olefin metathesis catalyst; and subjecting the olefin monomer and the silica supported olefin metathesis catalyst to conditions effective to promote an olefin metathesis reaction, wherein the silica supported olefin metathesis catalyst is of the formula (XX):

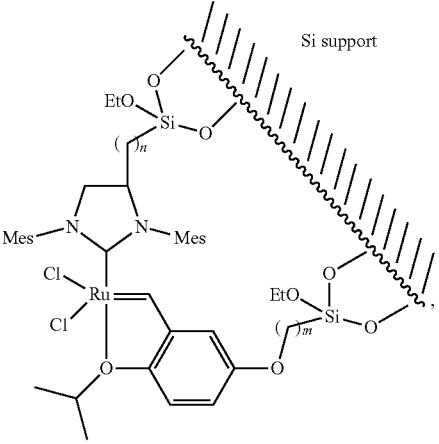

where n is 11 and m is 6.

In another embodiment, the invention provides a method for making a cyclic olefinic polymer comprising, contacting an olefin monomer with a silica supported olefin metathesis catalyst; and subjecting the olefin monomer and the silica supported olefin metathesis catalyst to conditions effective to promote an olefin metathesis reaction, wherein the cyclic olefinic polymer has the structure:

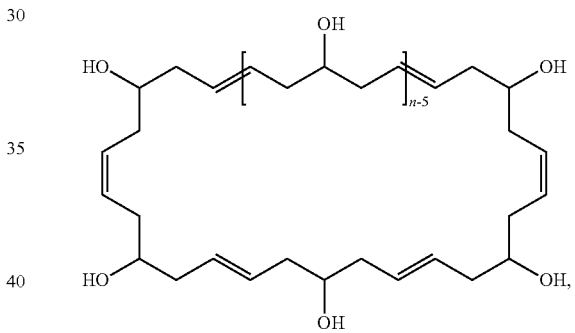

where n=12 to 49.

In another embodiment, the invention provides a method for making a cyclic olefinic polymer comprising, contacting an olefin monomer with a silica supported olefin metathesis catalyst; and subjecting the olefin monomer and the silica supported olefin metathesis catalyst to conditions effective to promote an olefin metathesis reaction, wherein the cyclic olefinic polymer has the structure:

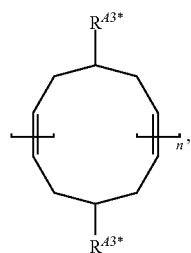

where $R^{43*}$ is selected from H or OH, and where n is an integer such that the cyclic olefinic polymer has a molecular weight in the range of 0.13 kDa to 10 kDa.

In another embodiment, the invention provides a method for making a cyclic olefinic polymer comprising, contacting an olefin monomer with a silica supported olefin metathesis catalyst; and subjecting the olefin monomer and the silica supported olefin metathesis catalyst to conditions effective to promote an olefin metathesis reaction, wherein the cyclic olefinic polymer has the structure:

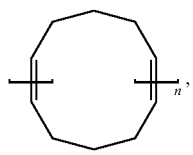

where n is an integer such that the cyclic olefinic polymer has a molecular weight in the range of 0.13 kDa to 10 kDa.

In another embodiment, the invention provides a method for making a cyclic olefinic polymer comprising, contacting an olefin monomer with a silica supported olefin metathesis catalyst; and subjecting the olefin monomer and the silica supported olefin metathesis catalyst to conditions effective to promote an olefin metathesis reaction, wherein the cyclic olefinic polymer has the structure:

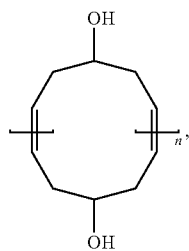

where n is an integer such that the cyclic olefinic polymer has a molecular weight in the range of 0.16 kDa to 10 kDa.

In another embodiment, the invention provides a method for making a linear olefinic polymer, comprising: contacting a first olefin monomer and a second olefin monomer with an olefin metathesis catalyst; and subjecting the first olefin monomer and the second olefin monomer to conditions effective to promote a first olefin metathesis reaction A method for making a linear olefinic polymer, comprising: contacting a first olefin monomer and a second olefin monomer with an olefin metathesis catalyst; and subjecting the first olefin monomer and the second olefin monomer and the olefin metathesis catalyst to conditions effective to promote a first olefin metathesis reaction, wherein the linear olefinic polymer is a copolymer.

A method for making a linear olefinic polymer, comprising: contacting a first olefin monomer and a second olefin monomer with an olefin metathesis catalyst; and subjecting the first olefin monomer and the second olefin monomer and the olefin metathesis catalyst to conditions effective to promote a first olefin metathesis reaction, wherein the linear olefinic polymer has the structure:

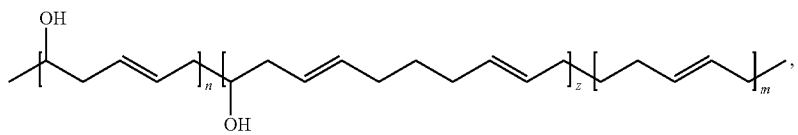

where
n is an integer;
z is an integer; and
m is an integer, such that such that the linear olefinic polymer has a molecular weight in the range of 0.4 kDa to 500 kDa.

It is to be understood that while the invention has been described in conjunction with specific embodiments thereof, that the description above as well as the examples that follow are intended to illustrate and not limit the scope of the invention. Other aspects, advantages, and modifications within the scope of the invention will be apparent to those skilled in the art to which the invention pertains.

EXPERIMENTAL

General Information—Materials and Methods

In the following examples, efforts have been made to ensure accuracy with respect to numbers used (e.g., amounts, temperature, etc.) but some experimental error and deviation should be accounted for. The examples are to be considered as not being limiting of the invention described herein.

All reactions were conducted under argon atmosphere in a glovebox. Ruthenium catalysts (6) and (7) (Materia, Inc.), silica supported catalysts (12), (13) and (14) (supplied by Materia, Inc. and prepared as described in D. Allen, M. Giardello, PCT Int'l Pub. No. WO 2011/069134A2), cyclopentene (1) (Aldrich), ethyl vinyl ether (Aldrich), 3-cyclopentene-1-ol (2), 1,6-heptadiene-4-ol (10) (Aldrich), palladium on carbon (Aldrich), THF-$d_8$ (Cambridge Isotope or Aldrich) and other solvents, were used as received.

NMR experiments were performed at 10-40° C. All NMR samples were stabilized at the given temperature for 10 min before data collection. All the NMR tubes were flame dried and evacuated in vacuo in advance. The $^1$H and $^{13}$C NMR spectra were recorded on a Bruker Avance II 400 and Bruker Avance II 600 spectrometer in THF-$d_8$ and Toluene-$d_8$ and referenced to residual internal THF ($\delta$=1.73 ppm $^1$H and 25.4 ppm $^{13}$C) and toluene ($\delta$=2.09 ppm $^1$H and 20.4 ppm $^{13}$C). The quantitative $^{13}$C NMR spectra for cis/trans bond ratio determination were recorded with inverse gated decoupling at 10 s relaxation delay.

GPC analyses were carried out using a Viscotek GPC Max VE 2001 instrument with a Viscotek TDA 302 triple array detector and Viscotek Org Guard column with three (in series) Mixed Medium columns (LT5000L) at 35° C. and a flow rate of 1.0 mL/min. A 12-point Universal Calibration Standard calibration curve was recorded.

Examples

Polyhydroxy-Polypentenamer Synthesis

Representative Synthetic Procedure for the Synthesis of Polyhydroxy Polypentenamer:

In a glove box a 10 mL vial was charged with 4.4 mg (0.00518 mmol) $2^{nd}$ generation Grubbs catalyst (6) and 0.7 mL THF. The homogeneous solution was stirred for 3 min then 0.30 mL (2.26 mmol) of 1,6-heptadien-4-ol (10) was added using a 1.0 mL Hamilton glass syringe. The vial was open and the pink, homogeneous mixture was stirred for 2 hours at room temperature. Then the vial was closed brought out of the glovebox and 0.1 mL of ethyl vinyl ether was added. The mixture was stirred for addition 10 minutes than 5 mL of n-pentane was added. A heterogeneous mixture formed, the supernatant was removed using a syringe, and the gelish residue was dried under oil-pump vacuum giving an orange-brown waxy solid (143 mg, 1.70 mmol, 74%—considering that the reaction is in equilibrium the theoretical expected yield is 78%). NMR (δ, THF-$d_8$): $^1$H 2.14 (m, 4H, CH$_2$CHOHCH$_2$), 3.53 (br s, 2H, CH$_2$CHOHCH$_2$, and CH$_2$CHOHCH$_2$), 5.52 (br s, 2H, CH); $^{13}$C{$^1$H} 36.1 (br s, cis-CH$_2$CHOHCH$_2$), 41.6 (br s, trans-CH$_2$CHOHCH$_2$), 71.7 (br s, CH$_2$CHOHCH$_2$), 128.9 (br s, cis-CH), 130.3 (br s, trans-CH). Polymer MW: 16.6 kDa (MW$_{theor.}$: 29.1 kDa), PDI: 1.54; Mark-Houwink a: 0.592, K: 77.8×10$^{-3}$ mL/g.

Representative Synthetic Procedure for the Co-Polymerization of 1,6-Heptadien-4-Ol (10) with Cyclopentene (1):

In a glove box a 10 mL vial was charged with 4.5 mg (0.00530 mmol) $2^{nd}$ generation Grubbs catalyst (6) and 0.7 mL THF-$d_8$. The homogeneous solution was stirred for 3 min then 0.15 mL (1.13 mmol) of 1,6-heptadien-4-ol (10) and 0.10 mL (1.13 mmol) of cyclopentene (1) were added using a 1.0 mL Hamilton glass syringe. The vial was open and the pink, homogeneous mixture was stirred for 1 hour at room temperature. Then the content of the vial was transferred into a screw cap supplied NMR tube. Then $^1$H NMR was recorded. NMR (δ, THF-$d_8$): $^1$H 1.42 (m, 2H, CH$_2$CH$_2$CH$_2$), 1.98-2.19 (m, 8H, CH$_2$CHOHCH$_2$ and CH$_2$CH$_2$CH$_2$), 3.53 (br s, 2H, CH$_2$CHOHCH$_2$, and CH$_2$CHOHCH$_2$), 5.39-5.50 (br m, 4H, CH).

Theoretical Calculations.

The ring strain energy of a series of substituted cyclopentenes have been calculated with density functional theory studies performed with RB3LYP method at 6-31G (D) basis set using SPARTAN '10 MECHANICS PROGRAM: PC/x86 1.1.0.software. Example for cyclopentene ΔE (kcal/mol) calculation:

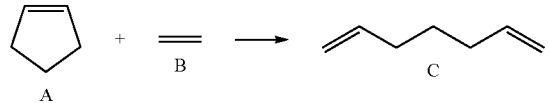

Energy (Hartree):
A: −195.333677; B: −78.588104; C: −273.930443

$\Delta E = E_c - (E_a + E_b)$

ΔE (Hartree)=−273.930443−(−195.333677−78.588104)=−0.008662 Hartree

1 Hartree=627.5 kcal/mol

ΔE(kcal/mol)=−0.008662*627.5=−5.44 kcal/mol

TABLE 4a

Calculated ring strain energy, atomic charge values on C0 and C4 carbon atoms (Electrostatic, Mulliken and Natural) and double bond orders for different cyclopentene derivatives. Solvation: toluene [SM8].*

| cyclopentene derivatives | Atomic charges (C0) | | | Atomic charges (C4) | | | Atomic charges (average) | | |
|---|---|---|---|---|---|---|---|---|---|
| | Electrostatic | Mulliken | Natural | Electrostatic | Mulliken | Natural | Electrostatic | Mulliken | Natural |
| 2-OH | −0.172 | −0.118 | −0.229 | −0.160 | −0.116 | −0.224 | −0.166 | −0.117 | −0.227 |
| 3-OH | −0.094 | −0.112 | −0.199 | −0.258 | −0.110 | −0.250 | −0.176 | −0.111 | −0.225 |
| 2-ethyleneketal | −0.215 | −0.123 | −0.226 | −0.217 | −0.122 | −0.225 | −0.216 | −0.123 | −0.226 |
| CP | −0.192 | −0.121 | −0.229 | −0.192 | −0.121 | −0.229 | −0.192 | −0.121 | −0.229 |
| 3-NH$_2$ | −0.141 | −0.124 | −0.216 | −0.306 | −0.106 | −0.234 | −0.224 | −0.115 | −0.225 |
| 2-NH$_2$ | −0.289 | −0.120 | −0.225 | −0.120 | −0.124 | −0.228 | −0.205 | −0.122 | −0.227 |
| 2-CH$_2$OH | −0.077 | −0.121 | −0.227 | −0.338 | −0.126 | −0.224 | −0.208 | −0.124 | −0.226 |
| 3-Cl | −0.142 | −0.105 | −0.187 | −0.210 | −0.088 | −0.253 | −0.176 | −0.097 | −0.220 |
| 3-ethyleneketal | −0.069 | −0.126 | −0.191 | −0.465 | −0.112 | −0.268 | −0.267 | −0.119 | −0.230 |
| 2-Cl | −0.181 | −0.119 | −0.222 | −0.181 | −0.119 | −0.222 | −0.181 | −0.119 | −0.222 |
| 3-CH$_2$OH | −0.054 | −0.129 | −0.217 | −0.388 | −0.119 | −0.232 | −0.221 | −0.124 | −0.225 |
| 3-TMS | −0.187 | −0.133 | −0.240 | −0.254 | −0.131 | −0.226 | −0.221 | −0.132 | −0.233 |
| 2-on | −0.201 | −0.118 | −0.225 | −0.201 | −0.118 | −0.225 | −0.201 | −0.118 | −0.225 |
| 2-TMS | −0.209 | −0.127 | −0.227 | −0.209 | −0.126 | −0.227 | −0.209 | −0.126 | −0.227 |
| 3-on | −0.046 | −0.094 | −0.124 | −0.362 | −0.151 | −0.338 | −0.204 | −0.123 | −0.231 |
| 3-tBu | −0.116 | −0.133 | −0.217 | −0.406 | −0.117 | −0.230 | −0.261 | −0.125 | −0.224 |
| 2-tBu | −0.228 | −0.124 | −0.223 | −0.228 | −0.124 | −0.223 | −0.228 | −0.124 | −0.223 |

TABLE 4b

Calculated ring strain energy, atomic charge values on C0 and C4 carbon atoms (Electrostatic, Mulliken and Natural) and double bond orders for different cyclopentene derivatives. Solvation: toluene [SM8].*

| cyclopentene derivatives | Bond order | Cyclopentene derivative | Ethylene | 1,6-heptadiene derivative | ΔH (kcal/mol) |
|---|---|---|---|---|---|
| 2-OH | 1.958 | −270.54342 | −78.588104 | −349.142307 | −6.77 |
| 3-OH | 1.937 | −270.542879 | −78.588104 | −349.141346 | −6.50 |
| 2-ethyleneketal | 1.947 | −423.179218 | −78.588104 | −501.777224 | −6.21 |
| CP | 1.959 | −195.333677 | −78.588104 | −273.930443 | −5.44 |
| 3-NH$_2$ | 1.959 | −250.675658 | −78.588104 | −329.272346 | −5.39 |
| 2-NH$_2$ | 1.947 | −250.676942 | −78.588104 | −329.273352 | −5.21 |

TABLE 4b-continued

Calculated ring strain energy, atomic charge values on C0 and C4 carbon atoms (Electrostatic, Mulliken and Natural) and double bond orders for different cyclopentene derivatives. Solvation: toluene [SM8].*

| cyclopentene derivatives | Bond order | Cyclopentene derivative | Ethylene | 1,6-heptadiene derivative | ΔH (kcal/mol) |
|---|---|---|---|---|---|
| 2-CH$_2$OH | 1.954 | −309.855058 | −78.588104 | −388.450968 | −4.90 |
| 3-Cl | 1.918 | −654.934246 | −78.588104 | −733.529339 | −4.39 |
| 3-ethyleneketal | 1.904 | −423.180589 | −78.588104 | −501.774674 | −3.75 |
| 2-Cl | 1.945 | −654.93254 | −78.588104 | −733.526580 | −3.72 |
| 3-CH$_2$OH | 1.938 | −309.855564 | −78.588104 | −388.448664 | −3.13 |
| 3-TMS | 1.926 | −604.005309 | −78.588104 | −682.597818 | −2.76 |
| 2-on | 1.942 | −269.350053 | −78.588104 | −347.940244 | −1.31 |
| 2-TMS | 1.957 | −604.004267 | −78.588104 | −682.592563 | −0.12 |
| 3-on | 1.796 | −269.359531 | −78.588104 | −347.947446 | 0.12 |
| 3-tBu | 1.934 | −352.587818 | −78.588104 | −431.174221 | 1.07 |
| 2-tBu | 1.953 | −352.586957 | −78.588104 | −431.170272 | 3.01 |

*Based on the software report, the cyclopentene species in Tables 4a & 4b are named according to the following structure:

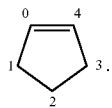

TABLE 5

Calculation report example for cyclopentene (1).

SPARTAN '10 MECHANICS PROGRAM: PC/x86 1.1.0
Frequency Calculation
Reason for exit: Successful completion
Mechanics CPU Time: .02
Mechanics Wall Time: .05
SPARTAN '10 Quantum Mechanics Program: (PC/x86) Release 1.1.0v4
Job type: Geometry optimization.
Method: RB3LYP
Basis set: 6-31G(D)
Number of shells: 36
Number of basis functions: 91
Multiplicity: 1
SCF model:
A restricted hybrid HF-DFT SCF calculation will be performed using Pulay DIIS + Geometric Direct Minimization
Solvation: toluene [SM8]
Optimization:
Step Energy Max Grad. Max Dist.
1 −195.331799 0.021925 0.086707
2 −195.333632 0.004196 0.035797
3 −195.333677 0.000269 0.000540
Reason for exit: Successful completion
Quantum Calculation CPU Time: 38.00
Quantum Calculation Wall Time: 38.48
SPARTAN '10 Properties Program: (PC/x86) Release 1.1.0
Atomic Charges:
Electrostatic Mulliken Natural
1 C0: −0.192 −0.121 −0.229
2 C1: −0.017 −0.307 −0.488
3 C2: −0.210 −0.286 −0.459
4 C3: −0.017 −0.307 −0.488
5 C4: −0.192 −0.121 −0.229
6 H1: +0.124 +0.131 +0.232
7 H2: +0.060 +0.147 +0.237
8 H3: +0.050 +0.147 +0.241
9 H4: +0.069 +0.144 +0.240
10 H5: +0.093 +0.147 +0.235
11 H6: +0.060 +0.147 +0.237
12 H7: +0.050 +0.147 +0.241
13 H8: +0.124 +0.131 +0.232
Bond Orders Mulliken
1 C0 C1: 1.011
2 C0 C4: 1.959
3 C0 H1: 0.929
4 C1 C2: 1.000
5 C1 H2: 0.930
6 C1 H3: 0.936

TABLE 5-continued

Calculation report example for cyclopentene (1).

7 C2 C3: 1.000
8 C2 H4: 0.944
9 C2 H5: 0.948
10 C3 C4: 1.011
11 C3 H6: 0.930
12 C3 H7: 0.936
13 C4 H8: 0.929
Reason for exit: Successful completion
Properties CPU Time: .22
Properties Wall Time: .22

Thermodynamic Investigation of Equilibrium Ring Opening Metathesis Polymerization (ROMP) of 3-Cyclopentene-1-Ol (2).

An NMR tube was charged with catalyst (6) (4.5 mg; 0.00530 mmol) or catalyst (7) (3.3 mg; 0.00564 mmol) and 3-cyclopentene-1-ol (2) in a 2.275 M THF-d$_8$ stock solution (1.0 mL solution; 2.275 mmol (2)). Then the NMR sample was inserted into the precooled (10° C.) NMR instrument. Following equilibration time (60-90 min) $^1$H NMR was recorded. The temperature increased with 5° C. or 10° C. increments. The measurement was repeated up to 40° C. $^1$H NMR spectra were recorded for each reaction temperature and the conversion was determined according to the ratio of the integrals of the peaks at 5.56 ppm ((2), CH, s) and 5.46 ppm ((4), CH, br, s).

Thermodynamic Data Calculation.

(See also Table 1 and FIG. 5) According to the equilibrium polymerization theory, the thermodynamic data were calculated from the following relationships:

$$\ln[M] = \frac{\Delta H}{R*T} - \frac{\Delta S}{R} \quad (1)$$

where [M] is the monomer equilibrium concentration, ΔH is the activation enthalpy (kJ mol$^{-1}$) during the polymerization, R is the universal gas constant (8.3144 J·mol$^{-1}$·K$^{-1}$), T is the absolute temperature in degrees Kelvin (K) and ΔS is the activation entropy (J·mol$^{-1}$·K$^{-1}$). ΔH can be calculated from the slope of the line in FIG. 1. (m=−3.12·10$^3$ K) according to the following equation (1 kcal=4.184 kJ):

$$\Delta H = m \cdot R$$

$$\Delta H = -3.12 \cdot 10^3 K \cdot 8.31 \text{ J} \cdot \text{mol}^{-1} \cdot K^{-1} = -25.93 \text{ kJ} \cdot \text{mol}^{-1}$$

$$\Delta H = -6.2 \text{ kcal} \cdot \text{mol}^{-1} \quad (2)$$

The standard entropy change can be calculated by the rearrangement of equation (1):

$$\Delta S = \frac{\Delta H}{T} - R \cdot \ln[M] \quad (3)$$

$$\Delta S = \frac{-27008 \, J \cdot \text{mol}^{-1}}{293 \, K} - 8.31 \cdot \ln[0.460] = -82.02 \, J \cdot \text{mol}^{-1} \cdot K^{-1}$$

$$\Delta S = -19.6 \text{ cal} \cdot \text{mol}^{-1} \cdot K^{-1}$$

Synthesis of Poly(Vinylalcohol-Alt-Propenylene) (4) by ROMP of 3-Cyclopentene-1-Ol (2).

Following the thermodynamic investigation above, the catalyst was allowed to decompose on standing. The decomposition mixture was suspended in MeOH (1.0 mL) and transferred into a vial (20 mL). The solvent was concentrated in vacuo, and the remaining waxy orange solid was dissolved in THF (1.5 mL). The THF solution was poured into n-hexane (5.0 mL), which precipitated the orange polymer. The supernatant was removed by a syringe and washed with additional hexane (2×2 mL). Then the polymer was concentrated in vacuo giving a waxy orange solid (119.4 mg; 63.2%—assuming the 17.4% monomer equilibrium concentration at 25° C. the isolated yield is 76.7%). $^1$H NMR (THF-d$_8$): δ 5.52 (s, 2H, =CH—), 3.60-3.30 (br multiple peaks, 2H, CH and OH), 2.15 (br s, 4H, CH$_2$). $^{13}$C{$^1$H}NMR (THF-d$_8$): δ 130.20 (trans, =CH—), 129.14 (cis, =CH—), 71.76 (trans, CH—OH), 71.13 (cis, CH—OH), 42.44 (cis, CH$_2$), 41.57 (trans, CH$_2$). MW=5.90 kDa, PDI=1.57.

Synthesis of Poly(Vinylalcohol-Alt-Propenylene) (4) by ADMET of 1,6-Heptadien-4-Ol (10).

In a glove box a vial (7 mL) was charged with catalyst (7) (10.0 mg; 0.016 mmol) and THF (3.70 mL). Then 1,6-heptadien-4-ol (10) (1.6 mL; 12.27 mmol) was added by syringe. The reaction was carried out in an open vial. Following the addition of 1,6-heptadien-4-ol (10), immediate ethylene evolution was observed. The solution was transparent and had an intense orange color. After two hours reaction time, 0.3 mL ethyl vinyl ether was added. The mixture was stirred for additional 10 minutes and transferred to vessel charged with n-hexane (5 mL), which precipitated the orange polymer. The supernatant was removed by syringe. The remaining waxy solid was washed with n-hexane (2×2 mL) and concentrated in vacuo giving a waxy orange solid. This solid was dissolved in THF with gentle heating and poured into n-hexane (5.0 mL). This precipitation procedure was repeated four times. The remaining precipitate was then concentrated in vacuo, giving an orange solid (714.9 mg; 68.0%—assuming the 17.4% monomer equilibrium concentration at 25° C., the isolated yield is 82.4%). MW=3.84 kDa, PDI=1.38.

Hydrogenation of Poly(Vinylalcohol-Alt-Propenylene) (4).

A Schlenk vessel (50 mL) was charged with poly(vinylalcohol-alt-propenylene) (4) (124.37 mg) and methanol (5 mL). Once the polymer was solubilized, Pd/C (85.2 mg) was added (5% palladium per double bond). The black suspension-containing vessel was flushed with Ar three times and then placed under vacuum. Then a balloon filled with hydrogen was connected to the vessel. After 2 hours reaction time the orange supernatant became colorless. The mixture was stirred for an additional 22 h at room temperature. Then the black suspension was filtered through a double filter paper. The vessel and filter paper were washed with hot methanol (250 mL). The collected filtrate was concentrated in vacuo, giving poly(vinylalcohol-alt-propylene) (11) as a white powder (90.3 mg, 73%).

Copolymerization of Cyclopentene (1) with 3-Cyclopentene-1-Ol (2).

A screw-capped NMR tube was charged with THF-d$_8$ (0.4 mL), cyclopentene (1) (0.1 mL; 1.085 mmol) and 3-cyclopentene-1-ol (2) (0.09 mL; 1.139 mmol). Then THF-d$_8$ solution (0.4 mL) of catalyst (7) (3.3 mg; 0.00527 mmol) was added. The green catalyst solution gradually turned orange and became more viscous. $^1$H NMR spectra were recorded at 0.5, 1 and 3 h reaction times. Then 0.1 mL ethyl vinyl ether was added. The contents of the NMR tube were poured into a vial (15 mL) and precipitated with n-hexane (4 mL) with immediate polymer precipitation observable. The supernatant was removed by syringe and the remaining precipitate was dried in vacuo giving a yellow solid (111.23 mg; 64.0%—assuming a 31.7% monomer equilibrium concentration at 25° C., the isolated yield is 93.7%). MW=18.9 kDa, PDI=1.71. $^1$H NMR (THF-d$_8$): δ 5.7-5.2 (br multiple peaks, 2H, =CH—), 3.60-3.30 (br multiple peaks, 2H, CH and OH), 1.80-2.30 (br multiple peaks, 4H, CH$_2$), 1.20-1.50 (br multiple peaks, 0.5H, CH$_2$). $^{13}$C{$^1$H}NMR (THF-d$_8$): δ 133.02 (C5), 131.33 (C8), 130.33 (C3), 128.47 (C4), 71.86 (br, C1 and C1*), 41.51 (br, C2 and C2*), 33.26 (C7*), 33.15 (C7), 30.69 (br, C6 and C6*).

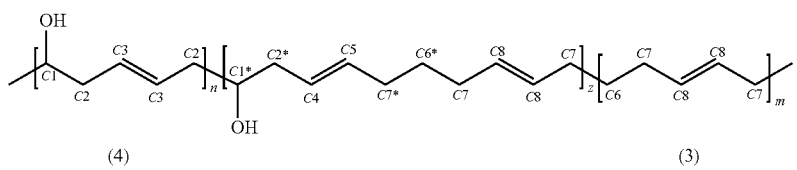

(4)　　　(3)

TABLE 6

Conversion, MW and PDI data for the homopolymers and copolymers. [M] = 2.17M; 0.23 mol % catalyst; t$_r$ = 1 h, 27-30° C., THF or toluene.

| Polymer | Catalyst | Monomer | Conversion [1] (%) | MW (kDa) | PDI |
|---|---|---|---|---|---|
| 3 | 6 | 1 | 50.0 | 31.8 | 2.07 |
| 3 + 4 | 7 | 1 + 2$^a$ | 68.3 | 18.9 | 1.71 |
| 4 | 7 | 2 | 81.2 | 5.90 | 1.57 |

$^a$The 1:2 monomer ratio was 50:50, the overall concentration was 2.17M.

In-Situ $^1$H NMR Investigation of Copolymerization of 1,6-Heptadiene-4-Ol (10) with Cyclopentene (1).

In a glovebox, a vial was charged with THF-d$_8$ (0.4 mL), cyclopentene (1) (0.1 mL; 1.130 mmol) and 1,6-heptadiene-4-ol (10) (0.15 mL; 1.150 mmol). Then THF-d$_8$ solution (0.4 mL) of catalyst (6) (4.5 mg; 0.00530 mmol) was added. The mixture was stirred for one hour in an open vial. Rapid formation of ethylene gas was observed as the purple catalyst solution gradually turned to orange and became more viscous. Then the mixture was transferred into a screw-capped NMR tube and $^1$H NMR spectra were recorded.

Representative Synthetic Procedure for Cyclopolypentenamers with Catalyst (12).

In a glove box a 10 mL vial was charged with 45.7 mg (0.000914 mmol) catalyst (12) and 3.2 mL toluene. The mixture was stirred for 3 min then 0.80 mL (9.04 mmol) of cyclopentene (1) was added by a 1.0 mL Hamilton glass syringe. The greenish, heterogeneous mixture was stirred for 50 min then the stirrer was switched off and the silica-supported catalyst settled after 10 min, 3.0 mL of clear and transparent supernatant was removed with a 5.0 mL Hamilton glass syringe. The supernatant was put in another 10 mL vial and brought out of the glovebox. The solvent evaporated overnight by oil pump vacuum giving a clean, colorless highly dense gel (234 mg, 3.45 mmol, 51%—considering that the reaction is in equilibrium the theoretical expected yield is 55%). Melt state MAS-NMR (δ): $^1$H 0.96 (br s, 2H, CH$_2$CH$_2$CH$_2$), 1.54 (br s, 4H, CH$_2$CH$_2$CH$_2$), 4.92 (br s, 2H, CH); $^{13}$C{H} 27.4 (s, cis-CH$_2$CH$_2$CH$_2$), 30.2 (s, trans-CH$_2$CH$_2$CH$_2$), 32.8 (s, CH$_2$CH$_2$CH$_2$), 130.2 (s, cis-CH), 130.8 (s, trans-CH). (No end groups detected.) Polymer MW: 36.0 kDa (MW$_{theor.}$: 343 kDa), PDI: 1.31; Mark-Houwink a: 0.871, K: 5.97×10$^{-3}$ mL/g.

Representative Synthetic Procedure for Cyclopolypentenamers with Catalyst (13).

In a glove box a 10 mL vial was charged with 22.7 mg (0.000454 mmol) of catalyst (13) and 1.6 mL toluene. The mixture was stirred for 3 min then 0.40 mL (4.52 mmol) of cyclopentene (1) was added using a 1.0 mL Hamilton glass syringe. The greenish, heterogeneous mixture was stirred for 50 min then the stirrer was switched off and the silica-supported catalyst separated. In 10 min, a 1.3 mL clear and transparent supernatant was removed by a 5.0 mL Hamilton glass syringe. The supernatant was put in another 10 mL vial and brought out of the glovebox. The solvent evaporated overnight by oil pump vacuum to give a clean, colorless highly dense gel (101.8 mg, 1.50 mmol, 51%—considering that the reaction is in equilibrium the theoretically expected yield is 55%). Polymer MW: 32.9 kDa (MW$_{theor.}$: 343 kDa), PDI: 1.24; Mark-Houwink a: 0.967, K: 2.15×10$^{-3}$ mL/g.

Representative Synthetic Procedure for Cyclopolypentenamers with Catalyst (14).

In a glove box a 10 mL vial was charged with 22.4 mg (0.000448 mmol) of catalyst (14) and 1.6 mL toluene. The mixture was stirred for 3 min then 0.40 mL (4.52 mmol) of cyclopentene (1) was added using a 1.0 mL Hamilton glass syringe. The greenish, heterogeneous mixture was stirred for 50 min then the stirrer was switched off and the silica-supported catalyst separated. In 10 min, a 1.3 mL clear and transparent supernatant was removed by a 5.0 mL Hamilton glass syringe. The supernatant was put in another 10 mL vial and brought out of the glovebox. The solvent evaporated overnight by oil pump vacuum to give a clean, colorless highly dense gel (97.9 mg, 1.44 mmol, 49%—considering that the reaction is in equilibrium the theoretically expected yield is 55%). Polymer MW: 37.8 kDa (MW$_{theor.}$: 343 kDa), PDI: 1.46; Mark-Houwink a: 0.967, K: 2.15×10$^{-3}$ mL/g.

Representative Synthetic Procedure for the Catalyst Recycling in the Synthesis of Cyclopolypentenamers.

The reaction with catalyst (12) described above with the same catalyst was reproduced with repeated addition of 2.4 mL of toluene and 0.6 mL (6.78 mml) of cyclopentene (1) for five times. The reaction conditions were the same at each cycle described above. At each cycle 3.0 mL supernatant was removed using a Hamilton syringe and dried under oil pump vacuum to give a clean, colorless highly dense gel (cycle 2: 201.8 mg, 3.45 mmol, 44%, Polymer MW: 31.7 kDa, PDI: 1.31; Mark-Houwink a: 0.963, K: 2.63×10$^{-3}$ mL/g; cycle 3: 162.9 mg, 35; Polymer MW: 35.8 kDa, PDI: 1.18; Mark-Houwink a: 0.976, K: 2.21×10$^{-3}$ mL/g; cycle 4: 106.3 mg, 23%, Polymer MW: 22.9 kDa, PDI: 2.13; Mark-Houwink a: 0.852, K: 8.42×10$^{-3}$ mL/g cycle 5: 58 mg, 13%, Polymer MW: 10.7 kDa, PDI: 2.31; Mark-Houwink a: 1.03, K: 10.8×10$^{-3}$ mL/g)

The claimed invention is:

1. A method for making a linear polypentenamer, contacting a first olefin monomer with an olefin metathesis catalyst; and subjecting the first olefin monomer and the olefin metathesis catalyst to conditions effective to promote a first olefin metathesis reaction, wherein, the first olefin monomer is of the formula (A*):

where $R^{41*}$ is selected from H, OH, NH$_2$, CH$_2$OH, C(CH$_3$)$_3$, or Si(CH$_3$)$_3$; the linear polypentenamer is of formula:

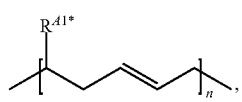

where n is an integer;

such that the linear polypentenamer has a number average molecular weight Mn in the range of 0.4 kDa to 500 kDa;

and wherein the method further comprises contacting a second olefin monomer with the first olefin monomer and the olefin metathesis catalyst wherein the second olefin monomer is of formula (E*):

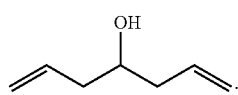

2. The method of claim 1, wherein linear polypentenamer is a polyhydroxy-polypentenamer of structure

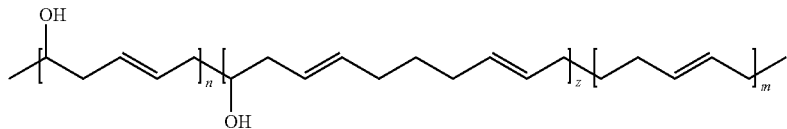

wherein,
n is an integer;
z is an integer; and
m is an integer, such that the linear polyhydroxy-polypentenamer has a number average molecular weight $M_n$ in the range of 0.4 kDa to 500 kDa.

3. The method of claim 2, wherein the olefin metathesis catalyst is a Group 8 transition metal complex of formula (I)

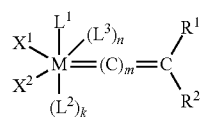

in which:
M is ruthenium;
n is 0;
m is 0;
k is 1;
$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride; and
$R^1$ is hydrogen and $R^2$ is phenyl or CH=C(CH$_3$)$_2$ or thienyl; or $R^1$ and $R^2$ are taken together to form 3-phenyl-1H-indene.

* * * * *